United States Patent [19]

Dummermuth

[11] Patent Number: 4,510,565
[45] Date of Patent: Apr. 9, 1985

[54] PROGRAMMABLE CONTROLLER WITH INTELLIGENT POSITIONING I/O MODULES

[75] Inventor: Ernst Dummermuth, Chesterland, Ohio

[73] Assignee: Allen-Bradley Company, Milwaukee, Wis.

[21] Appl. No.: 420,561

[22] Filed: Sep. 20, 1982

[51] Int. Cl.³ ............................................. G06F 15/46
[52] U.S. Cl. .................................. 364/136; 364/167; 364/174; 364/200
[58] Field of Search ............... 364/131, 132, 133, 134, 364/136, 140–147, 200, 900, 474, 475, 167–171, 174

[56] References Cited

U.S. PATENT DOCUMENTS

| | | | |
|---|---|---|---|
| 3,727,191 | 4/1973 | McGee | 340/172.5 |
| 4,038,533 | 7/1977 | Dummermuth | 364/136 X |
| 4,228,495 | 10/1980 | Bernhard et al. | 364/136 |
| 4,293,294 | 10/1981 | Struger et al. | 364/900 |

OTHER PUBLICATIONS

7100 CNC System commercially offered by Allen–Bradley Co., as illustrated in Publication 7100-1.1-Oct. 1980.
1771-M1 Master Positioning I/O Module and 1771-OJ Stepper Control Satellite I/O Module commercially offered by the Allen-Bradley Co.
"This is ... Programmable Motion", Gould, Inc., Modicon Division, date unknown.
Lytle, Vincent A., "Closed Loop Position Control with a Programmable Controller", 25th IEEE Machine Tools Conference, Oct. 20-22, 1981, pp. 23-38.
Jurgen, Ronald K., "Industry's Workhorse Gets Smarter", *IEEE Spectrum,* vol. 19, No. 2, (Feb. 1982), pp. 34-38.

*Primary Examiner*—Joseph F. Ruggiero
*Attorney, Agent, or Firm*—Quarles & Brady

[57] ABSTRACT

A programmable controller for closed-loop positioning control has a main processor unit, and an I/O interface rack in which a master I/O positioning module and three satellite I/O modules are mounted and connected to servomechanisms to control motion along three axes of a controlled machine. Move data is transmitted from the main processor unit to the master I/O positioning module in data blocks, with the number of transmissions varying, depending upon a mode of axis coupling that is used in controlling the particular machine. The master I/O positioning module converts move data from a user program format to a binary format and transfers it to the satellite I/O modules, each of which performs closed-loop positioning control of a respective axis of motion. The processor on each satellite I/O module also determines a position prior to the end of each move to apply a user-programmed deceleration when needed to blend moves having different velocities.

18 Claims, 38 Drawing Figures

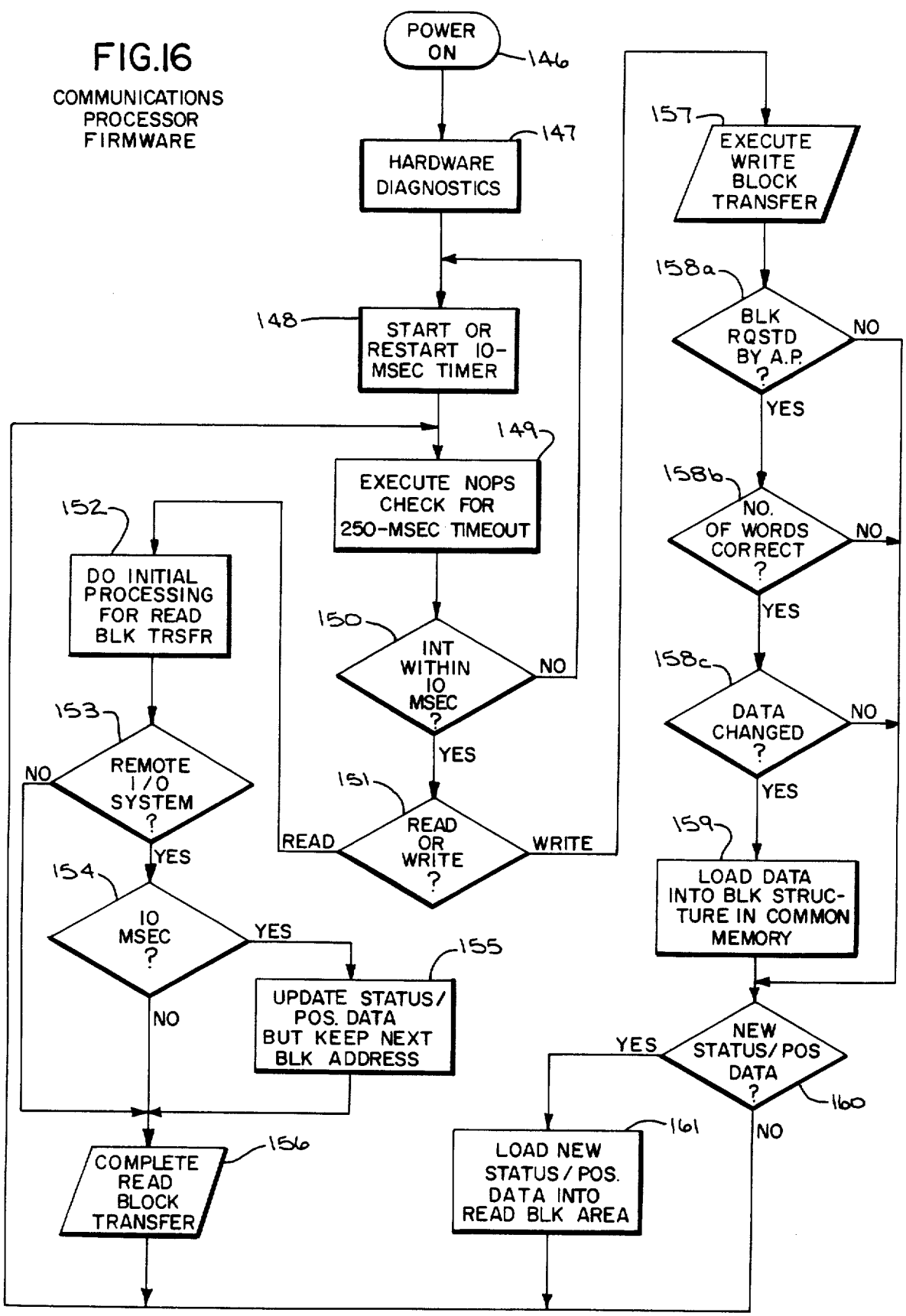

MAP OF COMMUNICATIONS
SCRATCHPAD MEMORY

FIG.17

| Addr | Contents |
|---|---|
| C00 | R / 0 / BLOCK SIZE (READ) |
| C01 | I.D. CODE-REQUESTED WRITE BLOCK |
| C02 | MSW – REQUESTED WRITE BLOCK |
| C03 | MSW – WRITE BLOCK REC'D |
| C20 | S/P BLOCK 0, BLOCK POINTER |
|  | S/P BLOCK 0, AXIS 1 DATA (8 BYTES) |
|  | S/P BLOCK 0, AXIS 2 DATA (8 BYTES) |
|  | S/P BLOCK 0, AXIS 3 DATA (8 BYTES) |
| C37 |  |
| C40–C59 | S/P BLOCK 1 (26 BYTES) |
| D00–D7F | WRITE BLOCK DATA AREA 0 (128 BYTES) |
| D80–DFF | WRITE BLOCK DATA AREA 1 (128 BYTES) |

(brace labeled 52 spans C20–C59)

MAP OF MASTER POSITIONING I/O MODULE COMMON MEMORY

MAP OF ARITHMETIC SCRATCHPAD MEMORY

MAP OF MASTER-SATELLITE COMMON MEMORY

FIG. 20

| | |
|---|---|
| 800 | FIRST SATELLITE CONTROL WORD |
| | SECOND SATELLITE CONTROL WORD |
| | CONTROL WORD CHECKSUM |
| BANK 0 | MOVE DATA |
| | MOVE CHECKSUM |
| 840 | |
| | FIRST SATELLITE STATUS WORD |
| | SECOND SATELLITE STATUS WORD |
| | ACTUAL POSITION |
| BANK 1 | FOLLOWING ERROR |
| | STATUS CHECKSUM |
| 880 | |
| BANK 2 | PARAMETER BLOCK (A) (FIRST 18 WORDS IN TABLE I IN BINARY FORMAT) |
| 8C0 | |
| BANK 3 | PARAMETER BLOCK (A) (NEXT 7 WORDS IN TABLE I AND CHECKSUM IN BINARY FORMAT) |

112

ARITHMETIC PROCESSOR
POWER UP RESET ROUTINE

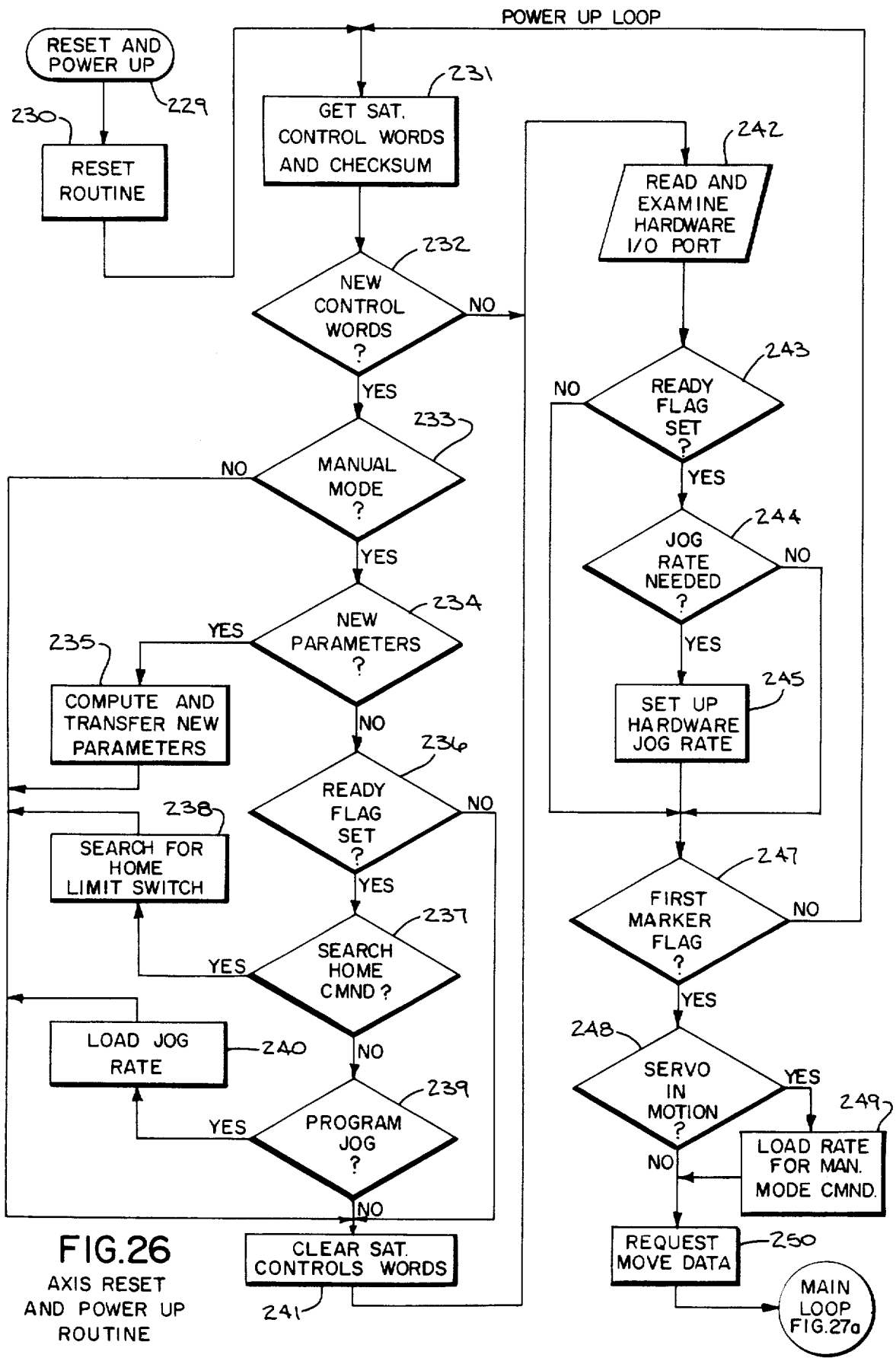
FIG.26 AXIS RESET AND POWER UP ROUTINE

SATELLITE MAIN LOOP

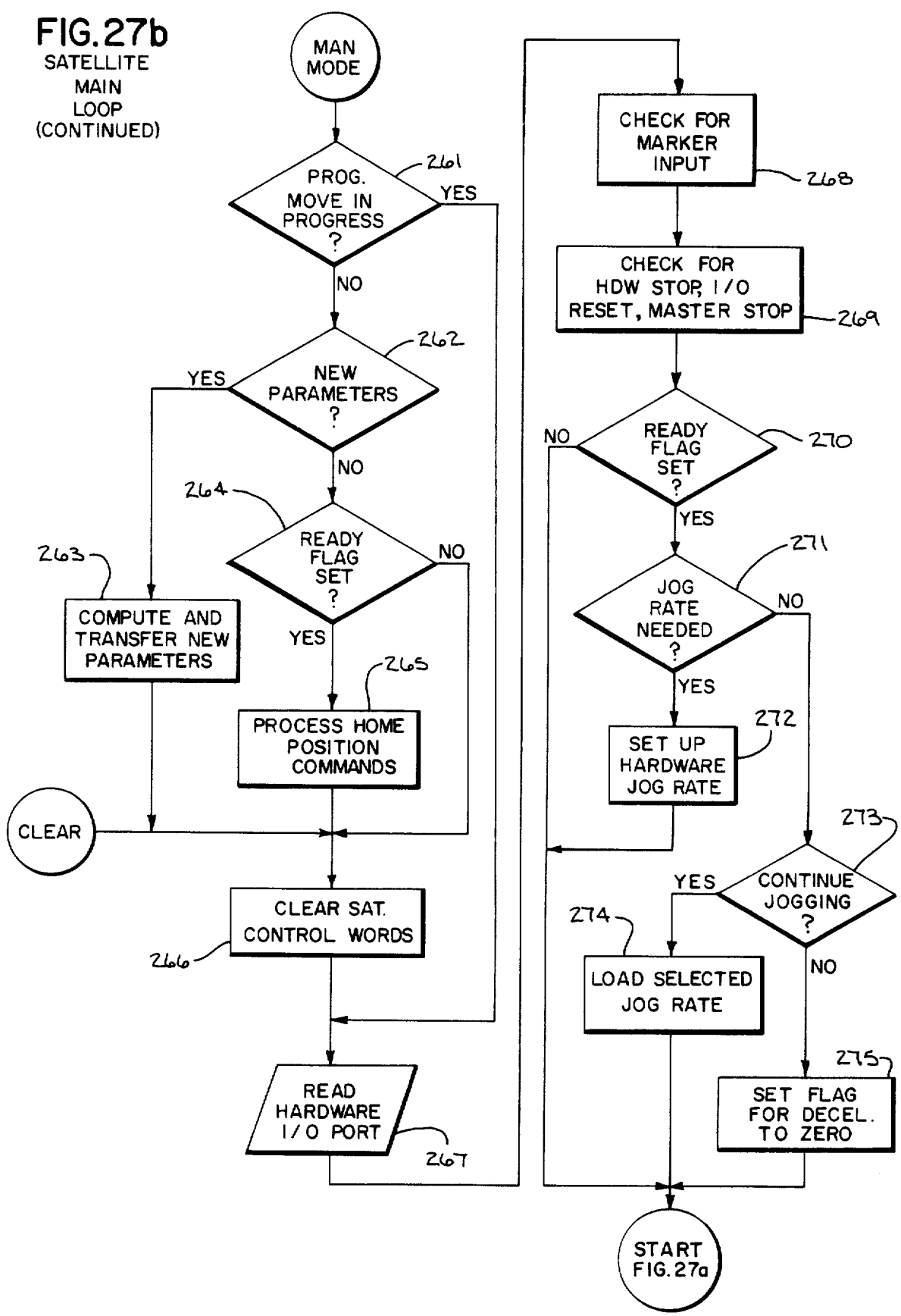
FIG. 27b SATELLITE MAIN LOOP (CONTINUED)

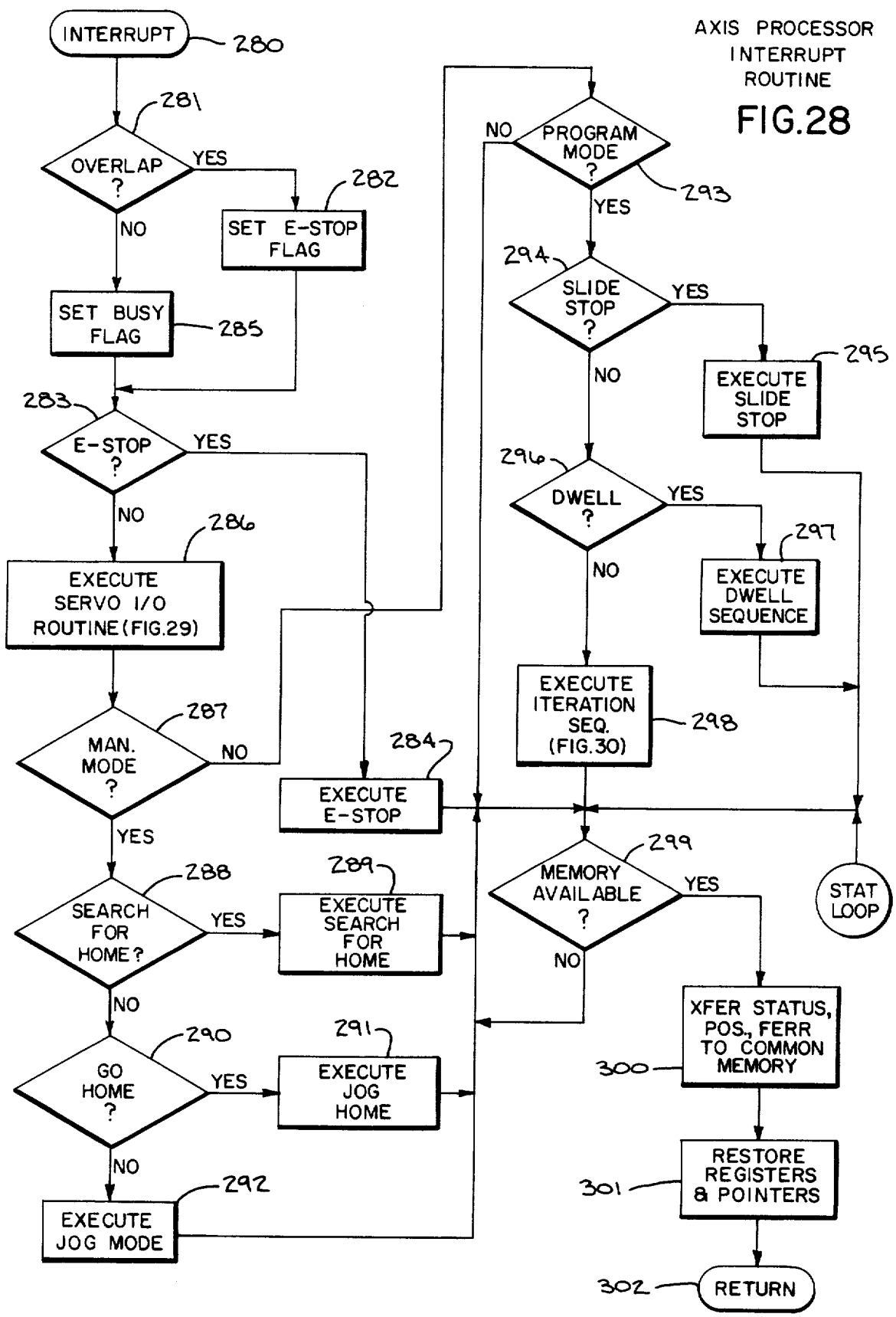
FIG.28 AXIS PROCESSOR INTERRUPT ROUTINE

ITERATION SEQUENCE

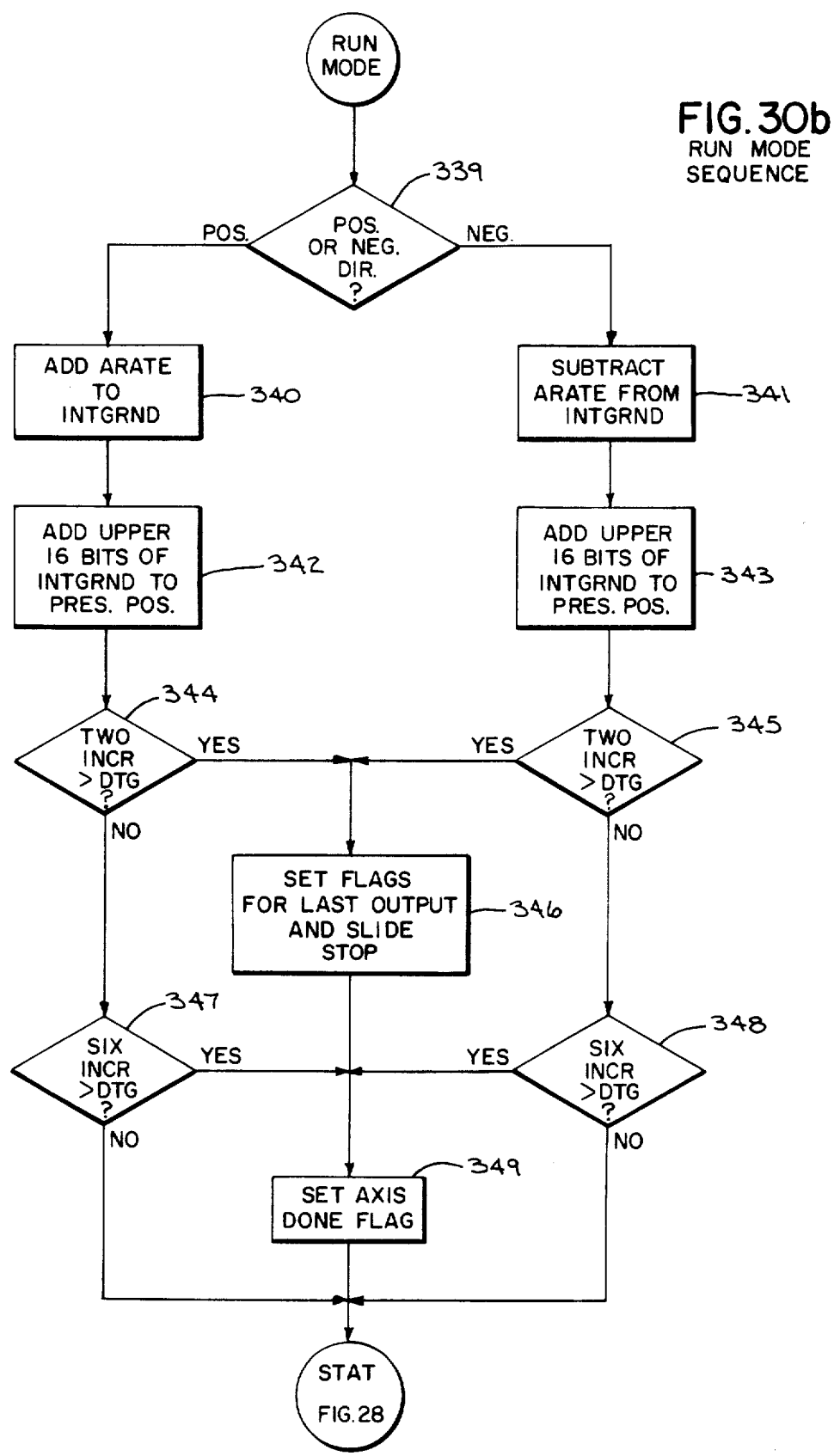

CASE 1
NEW RATE > ACTUAL RATE
(SAME DIRECTION)

CASE 2
NEW RATE < ACTUAL RATE
(SAME DIRECTION)

CASE 3
NEW RATE < ACTUAL RATE
(OPPOSITE DIRECTION)

PROGRAMMABLE CONTROLLER WITH INTELLIGENT POSITIONING I/O MODULES

BACKGROUND OF THE INVENTION

1. Field of the Invention

The field of the invention is digital controllers of the type for controlling the motion of a power tool and a workpiece support along selected axes of motion.

2. Description of the Prior Art

Positioning control has been associated primarily with numerical controls for metal-cutting machine tools. State of-the-art computer-based numerical controls (CNCs) are shown and described in Dummermuth et al, U.S. Pat. No. 4,038,533, issued July 26, 1977, and Bernhard et al, U.S. Pat. No. 4,228,495, issued Oct. 14, 1980. These controls provide full contouring control for a cutting tool as it moves along a complex path determined by a "part program." Numerical controls of the prior art can also be used for point-to-point positioning—drilling operations are one example of this type of positioning control.

Earlier numerical controls consisted primarily of a general purpose digital computer with collections of electronic hardware that interfaced the computer to the servomechanisms on the controlled system. Performance has been improved and real costs reduced for numerical controls by using large scale integrated (LSI) processor components. These LSI processors, however, require their own machine language programs. As programming development costs increase and hardware technology advances, one approach to improving positioning controls is to employ improved hardware circuits in the axis modules interfacing a central numerical control processor to the servomechanisms governing motion along the respective axes.

With the microelectronics revolution of the late 1960's and early 1970's, a new type of digital controller, known as the programmable controller (PC), was developed for simpler control tasks. The programmable controller had a central processing unit (CPU) and an I/O interface. The I/O interface was connected to electromechanical I/O devices on a machine or assembly line. While the I/O devices on machines retained their electromechanical character after the introduction of the PC's, the CPU of the PC replaced other electromechanical devices with its electronic hardware and programming. PC programming had its roots in the ladder diagrams which plant engineers had used prior to PC's to organize collections of electromechanical devices into control systems. It was thus different than the part programs of numerical controls which had to be developed in the applicable part program language by NC specialists.

As industry moves toward still a higher level of automation, there appears to be a number of tasks, including positioning tasks that can be advantageously performed by programmable controllers. PC's are less expensive than CNC's or other numerical controls. PC's use smaller central processing units and are adaptable to distributed processing. Programmable controllers can be programmed in the familiar ladder diagram format rather than in the part programming languages of numerical controls. And in the case of point-to-point positioning tasks, PC's can be more efficiently matched with control tasks than CNC's, which must be much more sophisticated and more expensive to provide contouring functions.

SUMMARY OF THE INVENTION

The invention is provided by a programmable controller which is responsive to a programmed mode of axis coupling to alter the amount and the organization of data that is transferred between a PC processor and a plurality of intelligent I/O positioning modules. The invention minimizes the amount of data exchanged between the PC processor unit and the I/O positioning modules, which maximizes the speed of the PC processor unit in responding to changed conditions in the controlled system. The invention also conserves main memory space, as well as processing time for several I/O processors.

In an NC system for controlling the path of tool motion in three dimensions, the three axes of motion are said to be coupled. Where a positioning control is used to control motion of three separate tools such as three grinding wheels, the axes of motion are said to be independent. The programmable controller of the present invention operates in both of these modes, and as described in the detailed description herein, also provides positioning control where two axes of motion are coupled and a third axis of motion is independent of the first two. In addition, this programmable controller can be operated in still other modes of axis coupling for machines with a different number of axes.

According to the invention, motion is controlled through the transmission of "move data" structures from a PC processing unit to the I/O positioning modules. The PC processing unit has a main processor which is responsive to main processor instructions that are stored in a main memory to sense the mode of axis coupling and to transmit move data in a number of data structures determined by the mode of axis coupling. Thus, if the mode of axis coupling provides for three coupled axes, move data is transmitted via a single data structure containing move data for all three axes. If the mode of axis coupling provides for three independent axes, three data structures are transmitted, each containing move data for a respective axis. And, if two axes are coupled, while the third is independent, two data structures are transmitted, one containing move data for the two coupled axes, while the third contains move data for the independent axis.

Each data structure requires processor time for transmission and a space in the main memory for storage. The invention therefore matches the programmable controller with a number of control tasks while building in the flexibility that prevents excessive use of memory or an unnecessary increase in the interval between transmissions of move data.

The CPU transmits move data structures to the I/O modules only when requested by the I/O modules. At other times it transmits a motion control data structure, which is also requested by the I/O modules, and which contains command data for operator commands such as start, stop, jog forward, jog reverse and feedrate override. By repeatedly transmitting this data structure between times that move data is requested, the programmable controller provides the necessary response to those commands which must be executed quickly in "real time." It also overcomes a problem that required overwriting of move data to execute a feedrate override.

The use of the motion control data structure with the I/O image table structure in a PC central processor unit provides a flexibility not seen in prior controllers. Rather than buying a system with a hardwired control panel, a user of the controller described herein can provide his own operator controls. From a user programming viewpoint these controls can be assigned many different addresses whereas a hardwired control panel will always be accessed at the same address. Using remote I/O equipment available for programmable controllers these controls can be located virtually anywhere in a plant. Command data can be coupled over transmission lines to the I/O image table in the main memory and then transferred to the motion control data structure, which is then transmitted to the I/O positioning modules.

In addition to move data and motion control data structures, the main processor also transmits a parameter data structure to the I/O positioning modules, and receives status data structures in response to all data structures transmitted to such I/O modules. The parameter data structure contains pointers to the motion control data structure and to the move data structures and by selecting these pointers for inclusion in the status data structure, a master I/O positioning module selects the data structure that will be transmitted next by the main processor. The size and content of these data structures is variable according to the mode of axis coupling, however, the parameter and motion control structures remain integrated and do not increase in number in the manner of the move data structures. Each data structure, whether it is of the parameter, motion control or move data type, is transmitted by executing a block transfer or high density transfer of the type described in Struger et al, U.S. Pat. No. 4,293,924, issued Oct. 6, 1981. More recently, this type of transfer had been extended to systems with remotely located I/O interface racks, so that the present invention provides the capability for remotely controlled positioning systems.

Another aspect of the invention is a satellite I/O module which functions as a closed-loop servomechanism controller. This module generates analog output signals to the servomechanism and reads position feedback on a 2.0 millisecond time base. The module operates on commands that have been generated from a ladder diagram program and preprocessed to a binary data format. The satellite I/O module is responsive to a user programmed deceleration to look ahead and calculate the correct point to apply the deceleration factor. In prior NC systems acceleration/deceleration was calculated by CPU and implemented in increments by axis modules. The present invention transfers all acceleration/deceleration control functions to the I/O modules for greater efficiency at lower cost.

The general object of the invention is to provide a low cost system for positioning control that is flexible and easily adapted to a wide variety of positioning control tasks. For example, the invention provides a positioning control that is suited for operation of several sections of a transfer line. An NC system operable in a single mode, with motion coupled along three axes, would not be suited for this task.

Another object of the invention is to provide a programmable controller with positioning control modules that can be mounted in an I/O interface rack in the general locality of a central processing unit, or if desired, at a location that is remote from the central processing unit. Another object of the invention is to provide the first intelligent I/O modules for positioning control. The advantages of intelligent or processor-based I/O modules are discussed in Jurgen, Ronald K., "Industry's Workhorse Gets Smarter," *IEEE Spectrum*, Volume 19, Number 2 (February, 1982) pp. 34–38.

Another object of the invention is to provide a controller for closed-loop positioning control that can be programmed with ladder diagram user programs.

The foregoing and other objects and advantages of the invention will appear in the following description. Reference is made to the accompanying drawings which form a part hereof, and in which there is shown by way of illustration a preferred embodiment of the invention. Such embodiment does not necessarily represent the full scope of the invention, however, and reference is made to the claims at the end of the description for determining the scope of the invention.

BRIEF DESCRIPTION OF THE DRAWINGS

FIG. 16 is a flow chart illustrating operation of a communications processor shown in FIG. 10;

FIG. 17 is a map of a communications scratchpad memory shown in FIG. 10;

FIG. 20 is a map of a common memory on the satellite I/O module that is also represented in FIG. 12;

FIGS. 26-30b are flow charts illustrating the operation of the axis processors, one of which is seen in FIG. 12.

DETAILED DESCRIPTION OF THE PREFERRED EMBODIMENT

1. The Programmable Controller and Its Controlled System

Figure 1:
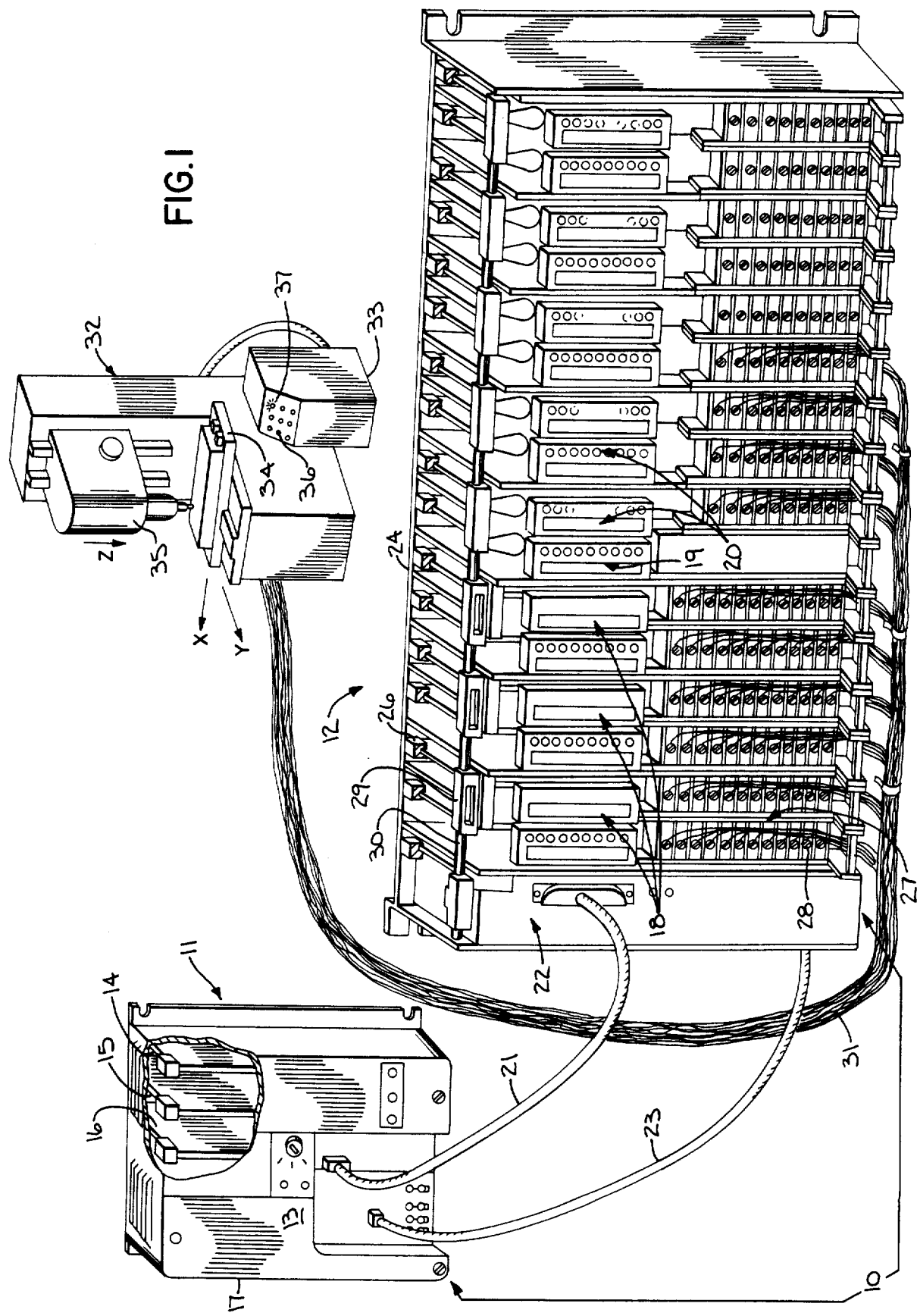
FIG. 1 is a perspective view of a programmable controller of the present invention that is connected to a controlled machine.

Referring to FIG. 1, a programmable controller 10 that incorporates the present invention has a PC processor unit 11 and an I/O interface rack 12. In this example, the PC processor unit hardware is provided by a PLC-2/30 ™ Processor comercially offered by the Allen-Bradley Company, the assignee of the present invention. This equipment is described in Struger et al, U.S. Pat. No. 4,266,281, issued May 5, 1981. The PC processor unit 11 includes a system power supply 13 in its left one-third portion and three circuit board modules 14-16 in its remaining portion, the power supply 13 and circuit modules 14-16 being housed in an enclosure 17 for the PC processing unit 11. The circuit board modules 14-16 include a memory module 14, a processor control module 15 and a processor interface module 16. Physically speaking, the circuit board modules 14-16 are comprised of DIP-packaged integrated circuits (IC's) and other electrical components, which are soldered to circuit boards that have etched circuit paths connecting the integrated circuits (IC's) and other components to each other and to edge termination areas. The IC's are commonly called "chips" even though such terminology does not describe the insulating packages that are formed around the silicon wafer chips. The primary functional units formed by the circuit board modules 14-16 are described in U.S. Pat. No. 4,266,281, and include a processor of bit-slice architecture, a main memory for storing user macroinstructions and a microprogram memory for storing microinstruction code. Each macroinstruction is executed by executing a sequence of microinstructions. The main memory is a read/write memory, which is formed of semiconductor random access memory (RAM) chips. A core-type read/write memory can also be used. The microprogram memory is preferably comprised of programmable read-only memory (PROM) chips.

The main memory stores an image table of input/output (I/0) status data and a control program of user macroinstructions. The I/O status data represents the status of input and output devices on a controlled machine 32 and its associated control panel 33. These user macroinstructions correspond to relay-type functions, which have been expressed for many years in the industrial control field in the form of ladder diagrams.

Figure 2A:
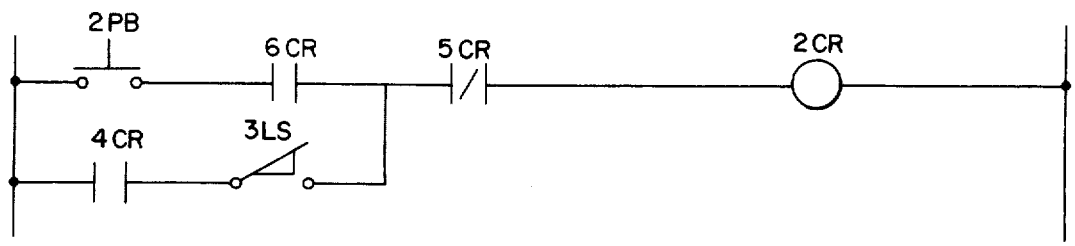
FIG. 2a is a portion of a typical user control program in ladder diagram format.

As seen in FIG. 2a, the input devices to be sensed are represented in a sequence called a rung, along with output devices which are to be energized or deenergized upon certain conditions for the input devices. In the rung in FIG. 2a, there are the following inputs: a pushbutton 2PB, two normally open sets of relay contacts 6CR and 4CR, a normally open limit switch 3LS and a normally closed set of relay contacts 5CR. The energizing of an output in the form of a relay coil 2CR is dependent upon the energizing of a 5CR relay coil to open the 5CR contacts and one of the following two combinations: either the pushbutton contacts 2PB and the relay contacts 6CR must be closed to complete a first branch of the rung; or the relay contacts 4CR and the limit switch 3LS contacts must be closed to complete a second branch.

Figure 2B:
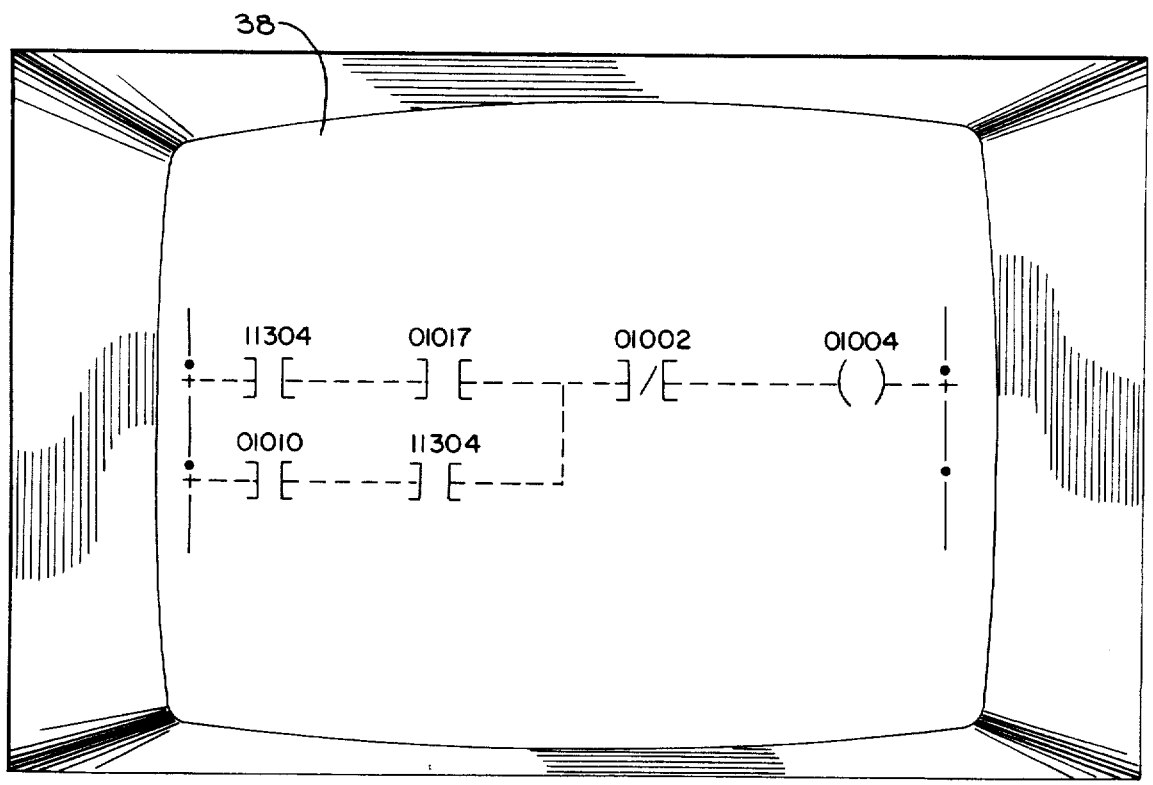
FIG. 2b is the portion of the user control program of FIG. 2a as it would be displayed on the screen of a programming terminal.

FIG. 2b shows how this ladder diagram would appear on the screen 38 of a programming terminal. These instructions can be translated into coded equivalents by the programming terminal and loaded into the main memory of the PC processor unit 11. The PC processor unit 11 is not directly connected to the I/O devices represented in the ladder diagram, so as the control program is executed, bits are examined and set in the I/O image table of the main memory. The five-place octal numbers are I/O addresses of the input and output devices as seen by the user. These numbers also correspond to memory locations in the I/O image table in the main memory expressed in octal notation. The first user instruction appearing in FIG. 2b may be expressed "XIC 11304" or "examine the data in the data table for an input device ('1') at rack 1 ('1'), slot 3 ('3') bit 4 ('04') to determine if its contacts are closed." The "XIO 01002" instruction examines status data in the data table for an output device ("0") at rack 1 ("1"), slot 0 ("0"), bit 2 ("02") to determine if the contacts of the device are open. And, the "OTE 01004" instruction sets a bit ("0") at rack 1 ("1"), slot 0 ("0"), bit 4 ("04") in the data table to energize an output device when a path of true conditions can be traced between the two vertical portions, which represent power supply lines, at opposite sides of the ladder diagram.

After the I/O image table is examined and manipulated through execution of the control program, the status data is coupled to and from the I/O devices to complete the control circuit. This is accomplished through execution of an I/O scan routine, which is executed after each cycle of execution of the control program. In other embodiments it would also be feasible to interrupt the control program at specified time intervals, whether or not a complete cycle of the control program had been executed. During the I/O scan routine, the bit-slice processor reads fresh input status data from any I/O modules that are coupled to input devices on the machine 32 and its associated control panel 33 and writes fresh output data to any I/O modules coupled to output devices on the machine 32. The I/O image table is basically a record of the data transferred during the I/O scan routine.

FIG. 1 is an example of a local I/O configuration in which I/O modules 18-20 are inserted in the I/O interface rack 12 and positioned no more than fifty feet from the PC processor unit 11. An I/O interconnect cable 21 couples the PC processing unit modules 14-16 to an I/O adapter module 22 in the leftmost slot of the I/O interface rack 12. Communication signals are coupled through the I/O interconnect cable 21, and due to the relatively short length of the cable, a parallel data bus is provided by a group of wires within the cable. A power cable 23, also seen in FIG. 1, connects the system power supply 13 to a socket (not shown) on a backplane motherboard 24 that extends across the back of the I/O rack 12. Other racks 12 can be connected to the cable through the lower communication socket 25 on the adapter module 22, and auxiliary power supplies (not shown) can be added to the controller system to power these other racks.

The invention can also be employed in a remote I/O system in which a remote I/O adapter module (not shown) is positioned in the leftmost slot of the I/O interface rack 12 and connected to the PC processor unit 11 through a serial data communication cable. If located further than fifty feet from the PC processor unit 11, such I/O racks 12 would also be powered by auxiliary or remote power supplies.

Although a stand-alone PC processor unit 11 has been selected for the preferred embodiment, the invention also contemplates other system configurations, including those in which a processor module is supported in the I/O interface rack 12, as disclosed in Struger, U.S. Pat. No. 4,250,563, issued Feb. 10, 1981.

The I/O interface rack 12 provides a physical frame to support the I/O modules 18–20, and the backplane motherboard 24, which provides electrical circuit paths to the I/O modules 18–20 from the adapter module 22. The I/O modules 18–20 each include at least one printed circuit board on which packaged IC's and other electrical components have been soldered. More than one board can be included within an I/O module as is the case for the three "double" I/O modules 18 seen immediately to the right of the adapter I/O module 22 in FIG. 1. The I/O modules 18–20 include plastic covers (not shown), however, the edges of the circuit boards project from the modules to slide into guide rails 26 at the top and bottom of the I/O interface rack 12 and into edge connectors (not shown) on the backplane motherboard 24. Front edge connectors are provided by swing arm connectors 27, which carry vertical columns of screw-type wire terminals 28. The swing arm connectors 27 are pivotably connected to a lower support rod (not shown) and the I/O modules 18–20 are held in place by latches 29 which pivot around an upper support rod 30 mounted transversely between the flanged sidewalls at opposite ends of the rack 12. To the right of the three "double" I/O modules 18 are single I/O modules, 19 and 20 only five of which are connected in the present embodiment. Wires 31 which connect the terminals 28 to I/O devices on a controlled machine 32, are bundled along the lower front edge of the I/O interface rack 22 and extend from the I/O rack to the controlled machine 32 and its associated control panel 33.

Programmable controllers were first applied to controlling single input devices such as relays and solenoids, and to sensing the state of single bit input devices such as relays, pushbuttons and limit switches. Machines such as the automatic drill press 32 in FIG. 1 have typically been controlled by numerical controls, which involve a great deal more electrical hardware than that seen in the programmable controller 10 of FIG. 1. It will be apparent from the remainder of the description herein, that the controller of the present invention forms a smaller and more efficient unit for controlling such a machine.

The automatic drill press 32 has a worktable 34 that is movable along an X axis or a Y axis or both, and a drill head 35 which is movable along a Z axis. This presents an example in which point-to-point positioning in the plane of the worktable 34 is resolved into motion along two coupled axes (X and Y) while the motion along the third axis (Z) is the independent of the first two. The coupled axes may start, move, and stop together, however, the path of motion is not controlled to the same extent as in a contouring operation. The control panel 33, which is positioned near the drill press and connected to the programmable controller 10 through the wire bundle 31, provides a number of pushbuttons 36 and monitor lights 37. The control panel 33 allows an operator to start and stop the machine or to manually control motion along one or more of the axes by depressing and holding a pushbutton, the latter being referred to as jog operations.

The double I/O modules 18 are located in slots 0–2 (octal) and are dedicated to controlling the X, Y and Z axis, respectively. Physically, the I/O rack 12 contains eight pairs of I/O slots and the adapter slot. The user address convention considers two single I/O modules 19–20 or one double I/O module 18 to occupy the low byte and high byte portions of a single I/O slot. Two single I/O modules 19–20 are in "slot 3", one of which is a master positioning I/O module 19 for preprocessing control data that is coupled between the adapter module 22 and the double I/O modules 18, also referred to as satellite I/O modules. The I/O module 20 in the righthand portion of "slot 3" and the remainder of the I/O modules 20 in the rack are of the conventional type, with input modules connected to eight single-bit input devices and output modules connected to eight single-bit output devices.

Figure 3:
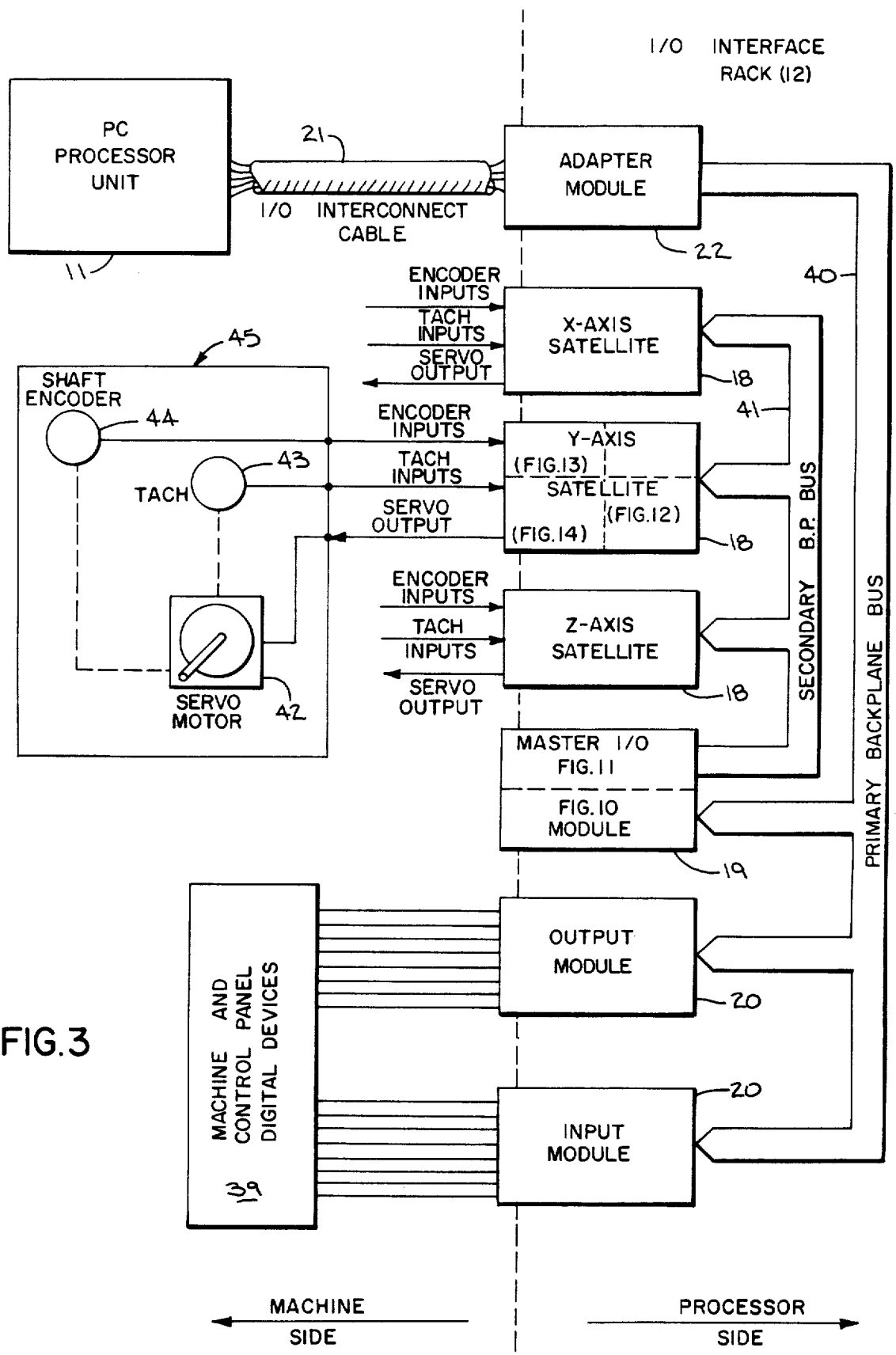
FIG. 3 is a block diagram of the I/O interface portion of programmable controller of FIG. 1.

FIG. 3 is a generalized schematic view of the programmable controller 10 of FIG. 1. In most prior systems, the backplane motherboard 24 formed direct connections between the adapter I/O module 22 and all of the other I/O modules in the rack 12. In FIG. 3, this arrangement is employed in part by the connection of the adapter I/O module 18 to the input and output modules 20 through the primary backplane bus 40. The master positioning I/O module 19 is coupled to the primary backplane bus 40 as well. Unlike these prior systems, however, the backplane motherboard 24 here also forms a secondary backplane bus 41 connecting the master positioning I/O module 19 to satellite I/O modules 20 for the X, Y and Z axes.

The adapter I/O module 22 performs in the conventional manner in this controller. Its function is to multiplex and demultiplex data sent through the I/O interconnect cable 21 to and from the various I/O modules 19 and 20, which are connected in parallel to the primary backplane bus 40. The circuit of a suitable adapter module 22 is described in detail in Struger, U.S. Pat. No. 4,250,563, issued Feb. 10, 1981.

Through the swing arm connectors 27 seen in FIG. 1, the conventional I/O modules 20 and the satellite I/O modules 18 are connected to I/O devices 39 on the machine 32 and its associated control panel 33. These I/O devices are seen schematically in FIG. 3 on the "machine side" of the I/O modules 18–20. This is as opposed to the "processor side" where the backplane connections are made. Note that the master I/O module 19 does not have any connections on the machine side.

Each satellite I/O module 18 connects to a servomechanism 45 that provides for closed-loop positioning control of motion along its respective axis. Each servomechanism 45 includes a servo motor 42, a shaft encoder 43 for generating position signals and a tachometer 44 for generating rotational velocity signals. A set of ENCODER INPUT lines carry the encoded signals from each shaft encoder 43 to its associated satellite 18.

These encoded signals are decoded by the satellite I/O modules 18 to sense the change of angular position of the shaft in a given time interval. A pair of TACH INPUT lines are connected to each satellite 18 to carry an analog signal from each tachometer 44 that is directly proportional to the rotational velocity of the rotor of the servo motor 42. A SERVO OUTPUT line carries an analog velocity signal from each satellite I/O module 18 to its associated servo motor 42. To provide a larger representation of the servomechanism 45 and its components 43-45, only one of the three servomechanisms 45 in the system has been shown in FIG. 3.

Figure 4:
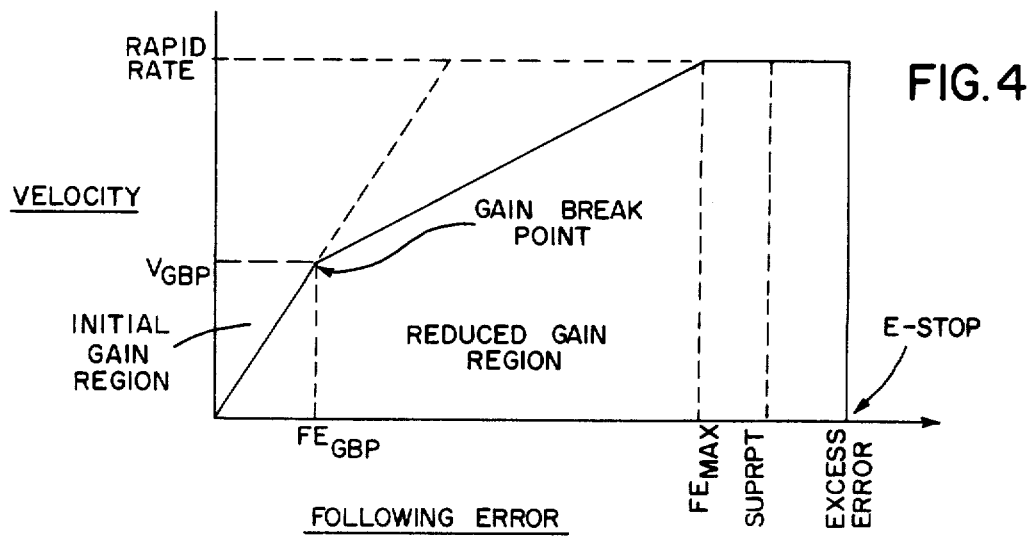
FIG. 4 is a plot of closed-loop circuit gain, which is the ratio of servo velocity to following error.

The programmable controller 10 performs closed-loop positioning by varying the velocity signal on the SERVO OUTPUT line according to a comparison of an incremental portion of the programmed position and the actual position read from the encoder 43. The difference between the incremental portion of the programmed position and actual position is the following error, and the output velocity is a function of this following error. The ratio of velocity output signal to following error input signal is the gain of the system and can be represented graphically as seen in FIG. 4. Parameters typically used for closed-loop control of the servo motor 42 such as SERVO VELOCITY, RAPID RATE, GAIN BREAK VELOCITY, GAIN BREAK POINT and MAXIMUM FOLLOWING ERROR are represented on this graph. These are also defined later in relation to a PARAMETER BLOCK (A) data structure, or derived from the values in the PARAMETER BLOCK (A). The selected gain function provides the desired response of the servo motor 42 as analyzed with the aid of other mathematical models familiar to those skilled in the art of servomechanisms and feedback control circuits. These models are used to analyze the stability of the system and to prevent conditions such as severe or continuing oscillation of the servo motor 42 as it attempts to reduce the following error.

2. DATA STRUCTURES

Figure 5:
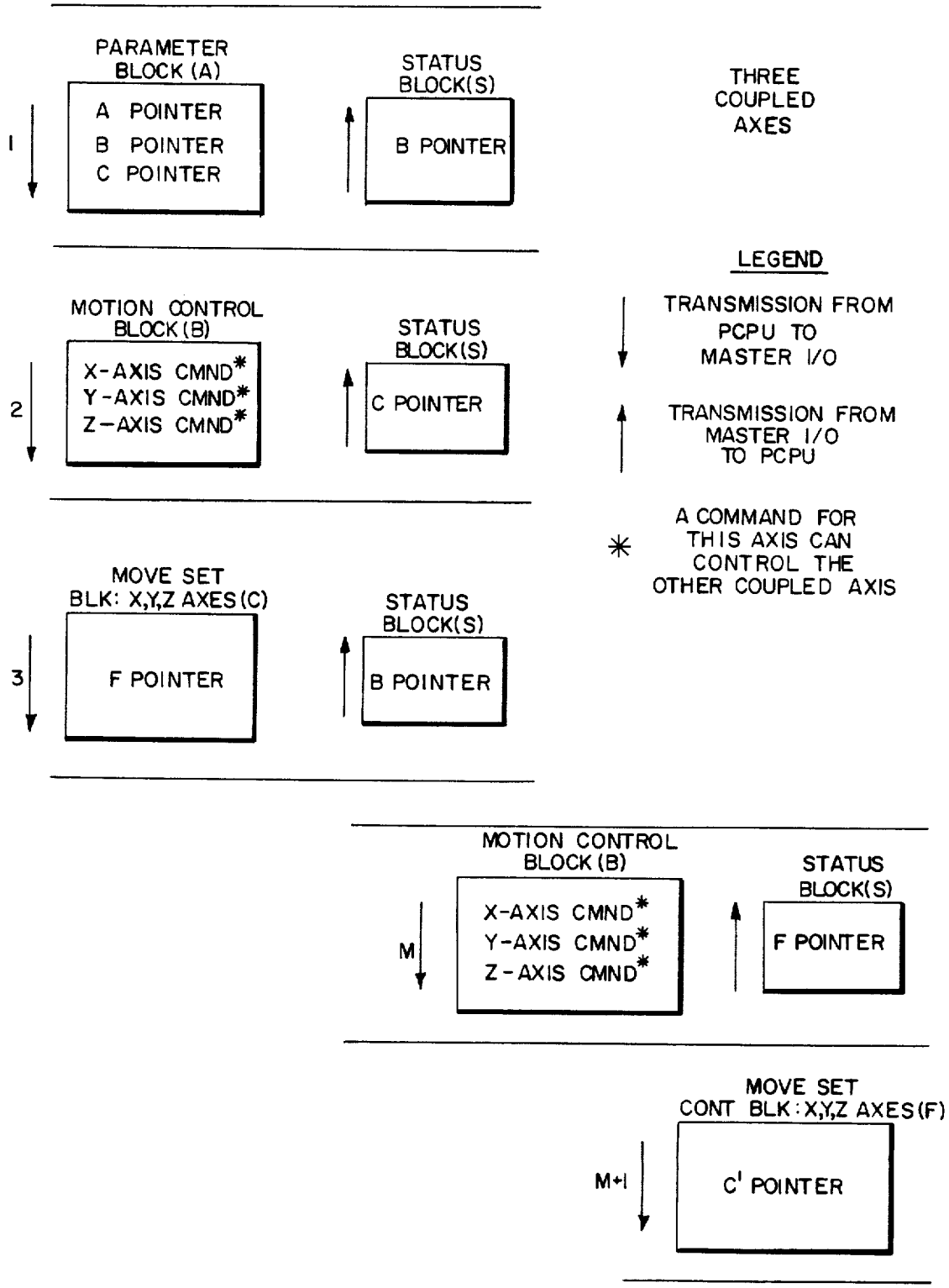
FIG. 5 is a block diagram of the organization of data structures that would be used in coupling information between the PC processing unit and the master positioning I/O module of FIG. 3, when motion is to be coupled along three axes.
Figure 6:
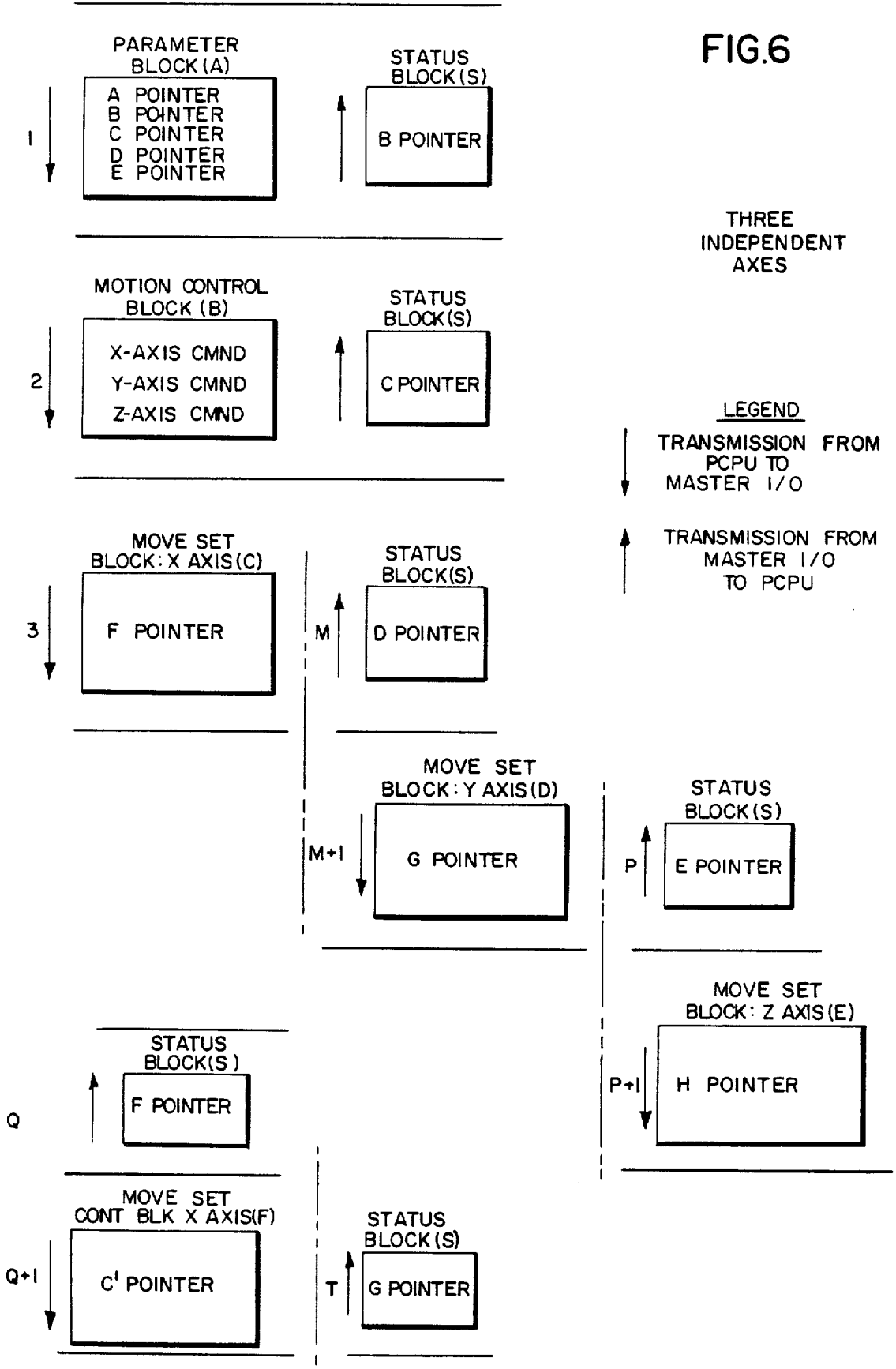
FIG. 6 is a block diagram of the organization of data structures that would be used in coupling information between the PC processing unit and the master positioning I/O module of FIG. 3, when three axes of motion are independent of one another.
Figure 7:
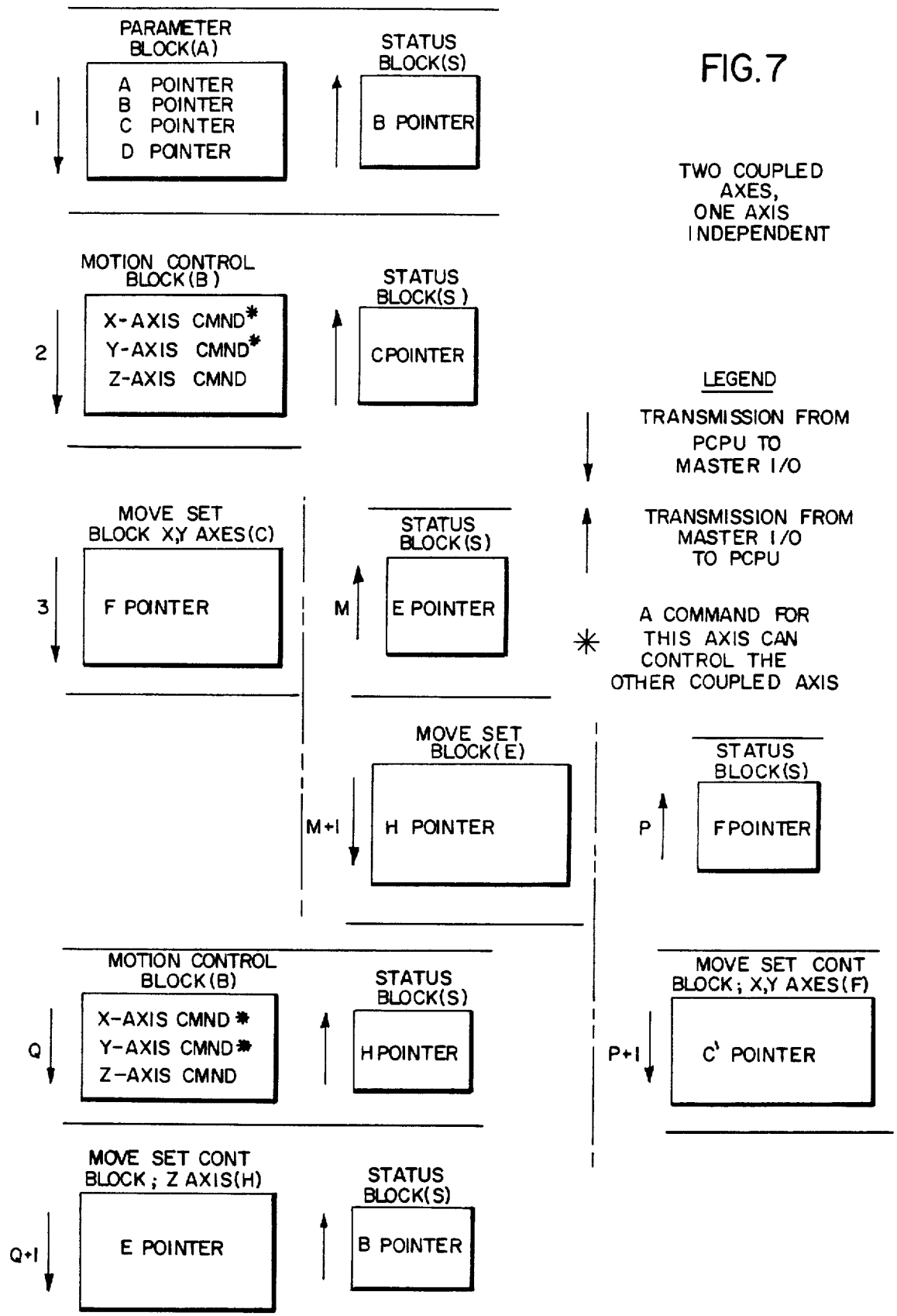
FIG. 7 is a block diagram of the organization of data structures that are used in coupling information between the PC processing unit and the master positioning I/O module of FIG. 3, when two axes of motion are coupled and one axis of motion is independent as seen in FIG. 1.
Figure 8:
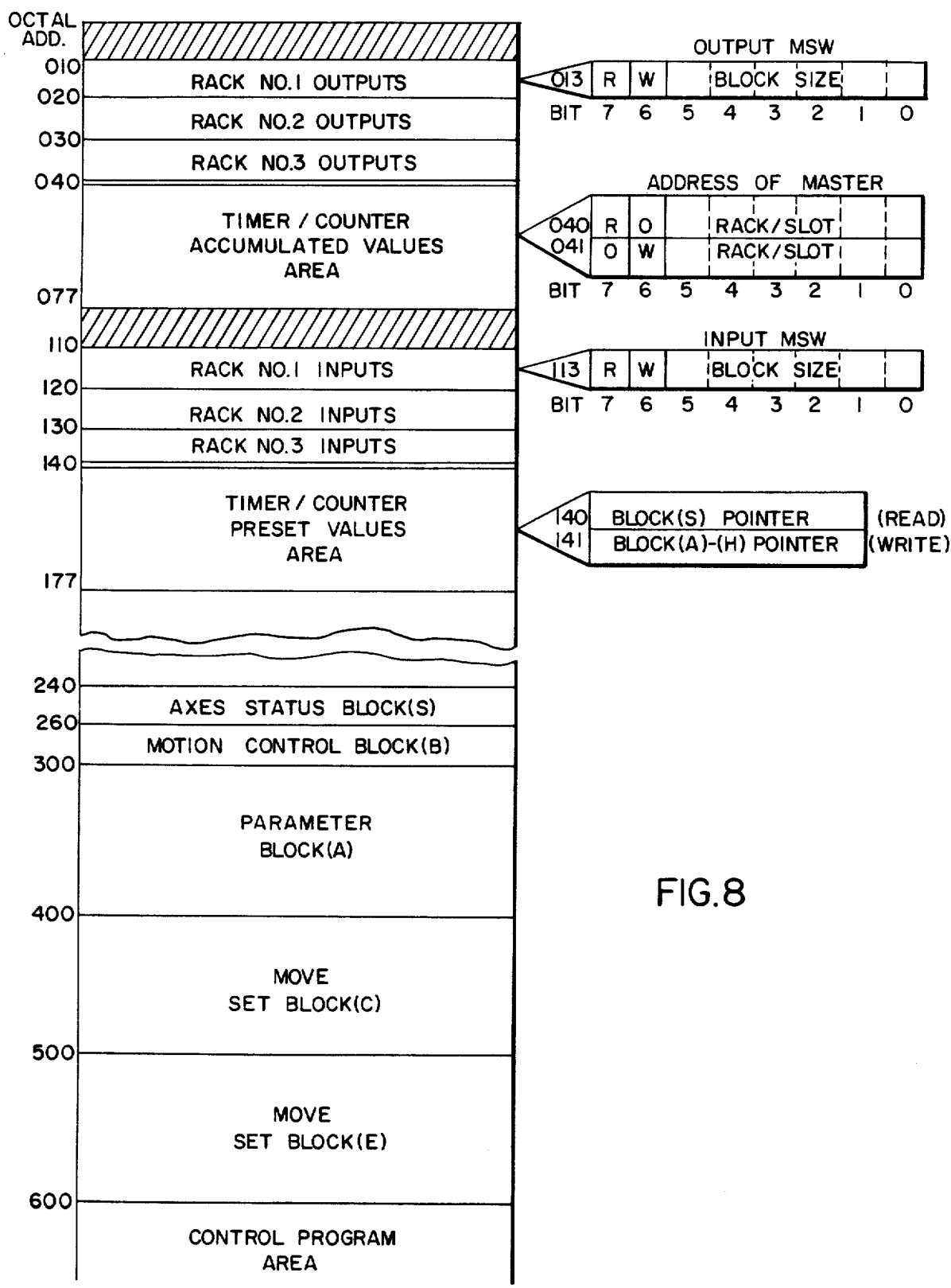
FIG. 8 is a map of the main memory in the PC processor unit including the data table areas where the user loads data to initialize transfer of the data structures.

The programmable controller of FIG. 3 is not limited to controlling only the machine 32 of FIG. 1. It is capable of controlling machines in which three axes of motion are coupled or in which three axes of motion are independent. This flexibility, which arises from the invention, is best explained with reference to the three cases presented by FIGS. 5-7. Each block in FIGS. 5-7 represents the transfer of a block of data between the PC processor unit 11 and the master positioning I/O module 19 (as indicated by the upwardly and downwardly pointing arrows). Each block transfer is executed during a modified I/O scan sequence in the manner disclosed in Struger et al, U.S. Pat. No. 4,293,924, issued Oct. 6, 1981. These blocks of data have certain information that is identified by its location within the block to form a data structure. These data structures have assigned locations in the main memory data table, as seen in FIG. 8, where the storage locations for a STATUS BLOCK (S), a MOTION CONTROL BLOCK (B), a PARAMETER BLOCK (A) and several MOVE SET BLOCKS (C, D and E) are identified.

The PARAMETER BLOCK (A) is mapped in Table 1 below. It is transferred from the PC processor unit 11 to the master positioning I/O module 19 at "power up," or upon a special command. The PARAMETER CONTROL WORD in Table 2 specifies how many axes are controlled on the machine and also specifies a mode of axis coupling. Thereafter, two to five address pointers are provided in the first five words of the parameter block, its own A POINTER, a pointer for the MOTION CONTROL BLOCK (B POINTER) and pointers for one or more MOVE SET BLOCKS (C, D and E POINTERS). Each 16-bit pointer is broken down into 4-bit segments or "nibbles." Each 4-bit segment represents one digit of a user address. Thereafter follow nineteen words for each axis, each word containing flag bits and/or 4-bit binary-coded digits for the listed parameters. The digits represent either a decimal whole number or a decimal fraction. Decimal whole numbers can be converted to 16-bit binary numbers and decimal fractions can be converted to 16-bit binary fractions to provide 32-bit binary numbers for use by the satellite I/O modules 18. Words 9, 11, 15 and 16 in Table 1 contain more than one parameter, while two words are required for fully defining the HOME position. With three axes (satellite I/O modules 18) installed, the PARAMETER BLOCK is 63 words long.

TABLE 1

MAP OF PARAMETER BLOCK (A)
(Each line entry represents a 16-bit word of data.)

1. PARAMETER CONTROL WORD
2. ADDRESS POINTER - BLOCK A
3. ADDRESS POINTER - BLOCK B
4. ADDRESS POINTER - BLOCK C
5. ADDRESS POINTER - BLOCK D
6. ADDRESS POINTER - BLOCK E
7. FEEDBACK RESOLUTION
8. COUNTS PER REVOLUTION (IN ×1 MODE)
9. FEEDBACK MULTIPLIER/COUNT MULTIPLIER/ INITIAL GAIN
10. GAIN BREAK VELOCITY
11. IN POSITION BAND/GAIN REDUCTION FACTOR
12. RAPID RATE (IPM OR MMPM)
13. JOG RATE HIGH
14. JOG RATE LOW
15. % EXCESS FOLL. ERR./+ D/A VOLTAGE
16. % EXCESS FOLL. ERR./− D/A VOLTAGE
17. HOME POSITION (MOST SIG.)
18. HOME POSITION (LEAST SIG.)
19. JOG ACCEL/DECEL
20. STEP VELOCITY
21. TRAVEL LIMIT +
22. TRAVEL LIMIT −
23. BACKLASH TAKE-UP
24. OFFSET
25. TACH PARAMETERS
26. NINETEEN DATA WORDS (Lines 7-25) ARE REPEATED FOR EACH ADDITIONAL INDEPENDENT AXIS. MAXIMUM SIZE OF BLOCK IS 63 WORDS
63.
64. END OF PARAMETER BLOCK The following are partial definitions for the data items that are provided for each axis in Table 1 above.

FEEDBACK RESOLUTION—the smallest increment of movement that can be detected by the shaft encoder as determined by a number of lines used to divide one revolution of the encoder shaft. In the present embodiment this number is expressed in $10^{-6}$ inches or $10^{-5}$ mm.

COUNTS PER REVOLUTION—the number of lines or increments for one full revolution of the encoder shaft.

FEEDBACK MULTIPLIER—a number for multiplying the number of digital signals generated for each count by a factor of 2 (×2 Mode) or by a factor of 4 (×4 Mode).

COUNT MULTIPLIER—a multiplier of 4 for the COUNTS PER REVOLUTION.

GAIN—a ratio of output to input with servo velocity as an output and following error as an input. (Following error is calculated from user programmed position minus actual position.) Example: servo velocity of 1 inch/minute and following error of $10^{-3}$ inches produces gain of 1 with a unit designation of IPM/mil.

GAIN BREAK VELOCITY—the velocity at which a GAIN REDUCTION FACTOR is applied by a satellite I/O module to reduce the initial GAIN.

IN POSITION BAND—tolerance within which the commanded position of an axis slide is considered to be reached.

GAIN REDUCTION FACTOR—a multiplier used to reduce the initial GAIN when the GAIN BREAK POINT is reached.

RAPID RATE—an axis velocity used for open travel, but not for metal-cutting operations; also the highest velocity for the axis.

JOG RATE—a velocity at which a JOG operation is executed; a JOG is a move controlled by an operator through a pushbutton or other control device.

±D/A VOLTAGE—positive and negative scale multipliers for the output voltage to the servo motor when axis is moving at RAPID RATE.

EXCESS FOLLOWING ERROR—an absolute maximum allowable following error beyond which an emergency stop is executed.

HOME POSITION—absolute position loaded into position register in response to an initialize home position command or a search for home command.

JOG ACCEL/DECEL—an acceleration/deceleration value used during a move if no special value is provided with the move data; this particular value is always used for JOG moves.

STEP VELOCITY—the lowest allowable, non-zero velocity in manual mode.

TRAVEL LIMITS—absolute position limits beyond which the axis will not move.

BACKLASH TAKE-UP—a distance to be moved in a reverse direction so as to always approach the programmed destination from the same direction.

OFFSET—an additional distance to be added to the position sent to the satellite in the move data.

TACH PARAMETERS—error range data used to detect loss of velocity feedback from the tachometer.

TABLE 2

| PARAMETER CONTROL WORD | | | | | | | | | | | | | | |
|---|---|---|---|---|---|---|---|---|---|---|---|---|---|---|
| 17 | 16 | 15 | 14 | 13 | 12 | 11 | 10 | 7 | 6 | 5 | 4 | 3 | 2 1 0 | |
| 0 | 1 | 0 | 0 | 0 | 0 | 0 | 0 | | MODE INCH/METRIC SELECTION | | | | NO. AXES NOT USED | |

The MOTION CONTROL BLOCK (B) seen in Table 3 below is a second type of data structure. It is transferred from the PC processor unit 11 to the master positioning I/O module 19 on a repetitive basis. It may contain from two to twelve words depending upon the mode of axis coupling and the amount of preset data that is selected for transmission. The first two words for each axis are MOTION COMMAND WORDS, which provide status bits for user commands such as START, STOP, JOG FORWARD, JOG REVERSE and FEEDRATE OVERRIDE, and which are entered through the control panel 33 in FIG. 1. The definition of the two MOTION COMMAND WORDS can be seen in the following Tables 4 and 5, where the definition of certain bits is determined by bit 7 of the FIRST MOTION COMMAND WORD. This bit is responsive to a user-selection of a PROGRAM or MANUAL mode command. In the PROGRAM mode moves are provided with a programmed final position or destination, while in the MANUAL mode, moves are controlled by the user through the set of controls on the instrumentation panel 33 to move along an axis to a selected, but unprogrammed destination. Jog moves executed by momentary operation of a pushbutton are an example of operation in the MANUAL mode.

The number of axes selected will determine whether only BLOCK C COMMAND WORDS are transmitted, or whether additional COMMAND words for BLOCKS D and E are transmitted. A COMMAND WORD in one block may be used to control more than one axis where the axes are coupled. Position preset data is entered through thumbwheel switches on the control panel 33 and follows the MOTION COMMAND WORDS for all of the axes that are operational.

TABLE 3

MAP OF MOTION CONTROL BLOCK (B)
(Each line entry represents a 16-bit word of data.)

| | | |
|---|---|---|
| 1. | FIRST MOTION COMMAND WORD | BLOCK C AXIS |
| 2. | SECOND MOTION COMMAND WORD | |
| 3. | FIRST MOTION COMMAND WORD | BLOCK D AXIS |
| 4. | SECOND MOTION COMMAND WORD | |
| 5. | FIRST MOTION COMMAND WORD | BLOCK E AXIS |
| 6. | SECOND MOTION COMMAND WORD | |
| 7. | POSITION PRESET (MOST SIG.) | BLOCK C AXIS |
| 8. | POSITION PRESET (LEAST SIG.) | |
| 9. | POSITION PRESET (MOST SIG.) | BLOCK D AXIS |
| 10. | POSITION PRESET (LEAST SIG.) | |
| 11. | POSITION PRESET (MOST SIG.) | BLOCK E AXIS |
| 12. | POSITION PRESET (LEAST SIG.) | |

TABLE 4

| DESCRIPTION OF FIRST MOTION COMMAND WORD | |
|---|---|
| Bit | Function |
| 17 | Block Identification |
| 16 | Axis Selection |
| 15 | Axis Selection |
| 14 | Axis Selection |
| 13 | Initialize Home Position* |
| 12 | New Parameter* |
| 11 | Offset* |
| 10 | Reset* |
| 7 | Program/Manual |
| 6 | Emergency Stop (E-Stop) |
| 5 | Slide Stop |
| 4 | Escape/Go Home* |
| 3 | EOM (End-of-Move) Stop/Search Home |
| 2 | Begin/Preset* |
| 1 | Go/Jog Reverse* |
| 0 | Next Move/Jog Forward* |

*Denotes active when manual mode is selected in bit 7

TABLE 5

DESCRIPTION OF SECOND MOTION COMMAND WORD

| Bit | Function |
| --- | --- |
| 17 | New Preset |
| 16 | Tach Calibrate* |
| 15 | Select Readout* |
| 14 | Jog Rate Select* |
| 13 | ± Limit Override* |
| 12 | Return to Position* |
| 11 | Program/Rapid Rate Select |
| 10 | Feedrate Override Enable |
| 7 | Direction of Search Home |
| 6–0 | Feedrate Override Value |

*Denotes active when manual mode is selected in bit 7 of FIRST MOTION COMMAND WORD The MOVE SET BLOCKS (C, D and E) are a third type of data structure and are arranged as seen in Table 6 below. A MOVE SET CONTROL WORD heads the blocks and up to twenty-one MOVES can be included, if only a SINGLE MOVE CONTROL WORD (SMCW) and two POSITION/ DWELL words, are included. Each MOVE however may be expanded to six words by addition of a RATE word, and two words for ACCELERATION and DECELERATION data, respectively, sometimes called ACCEL/DECEL data. The PARAMETER BLOCK (A) will contain a default or global values for RATE, ACCELERATION and DECELERATION. These values are included in individual moves to supersede the global values where desired and are therefore referred to as local values. The MOVE SET CONTROL WORD is mapped in Table 7 below. MOVE O is a special move referred to as an ESCAPE MOVE. Normally, it is skipped, however, upon an ESCAPE COMMAND it is executed to move to the HOME position, provided certain other conditions are met. Moves are classified as PROGRAMMED MOVES, DWELL MOVES, FEEDRATE OVERRIDE MOVES or JOG MOVES. A DWELL is not really a move, but a time delay in which motion is suspended along all of the axes, for a specific purpose such as to allow drill shavings to be evacuated from a drill hole. At the end of the MOVE SET BLOCK is a pointer to a MOVE SET CONTINUATION BLOCK (F) corresponding to MOVE SET BLOCK (C). This CONTINUATION BLOCK can be used to extend the number of successive moves. MOVE SET CONTINUATION BLOCKS (G) and (H) can be used where MOVE SET BLOCKS (D) and (E) cannot provide all of the MOVES required for controlling motion along their corresponding axes.

The SINGLE MOVE CONTROL WORD is of special significance in executing the move because it contains control information seen in Table 8 below, including the number of axes to which the move is applicable as well as the type of move. Where a move is applicable to three coupled axes, it will contain one SMCW and three sets of POSITION, RATE and ACCEL/DECEL data. Thus, Move 1 in Table 6 could contain up to 16 words and this would decrease the number of non-escape moves available in MOVE SET BLOCK (C) to as few as three (16 words each). Where two axes are coupled, the number of non-escape moves in MOVE SET BLOCK (C) might be limited to five (11 words each). This is not an operating limitation, however, due to the continuing transmission of MOVE SET BLOCKS and MOVE SET CONTINUATION BLOCKS.

TABLE 6

MAP OF MOVE SET BLOCK (C)
(Each line entry represents a 16-bit word of data except where noted)

| | |
| --- | --- |
| 1. | MOVE SET SET CONTROL WORD |
| 2. | SINGLE MOVE CONTROL WORD (SMCW) |
| 3. | POS./DWELL TIME (MOST SIG.) |
| 4. | POS./DWELL TIME (LEAST SIG.) MOVE O |
| 5. | RATE (IPM OR MMPM) |
| 6. | ACCELERATION |
| 7. | DECELERATION |
| 5–23. | (Range) MOVE 1 (3–16 words) |
| 8–39. | (Range) MOVE 2 (3–16 words) |
| 11–55. | (Range) MOVE 3 (3–16 words) |
| 14–52. | (Range) MOVE 4 (3–11 words) |
| 17–62. | (Range) MOVE 5 (3–11 words) |
| 20–43. | MOVE 6 (3–6 words) |
| 23–49. | MOVE 7 (3–6 words) |
| 26–55. | MOVE 8 (3–6 words) |
| 29–61. | MOVE 9 (3–6 words) |
| 32–34 | MOVE 10 (3 words) |
| 35–38 | MOVE 11 (3 words) |
| . | |
| . | |
| . | |
| 59–61 | MOVE 19 (3 words) |
| 62. | POINTER TO MOVE SET DATA BLOCK F |
| 64. | END OF BLOCK |

TABLE 7

DESCRIPTION OF MOVE SET CONTROL WORD

| Bit(s) | Function |
| --- | --- |
| 17 | Not Used |
| 16 | Not Used |
| 15 | Inch/Metric Select |
| 14 | End of Program |
| 13 | Escape Move Block I.D. |
| 12 | Block ID High Bit |
| 11 | Block ID Middle Bit |
| 10 | Block ID Low Bit |
| 7 | Data Valid |
| 6–0 | No. Moves This Set (BCD Format) |

TABLE 8

DESCRIPTION OF SINGLE MOVE CONTROL WORD

| Bit(s) | Function |
| --- | --- |
| 17 | Std. Positioning/Continuous |
| 16 | HALT/RUN Mode Select |
| 15 | RATE Select |
| 14 | ACCEL/DECEL Select |
| 13–12 | ID Bits |
| 11–10 | NORMAL/OFFSET/PRESET/ DWELL Select |
| 7 | Feedrate Override Enable |
| 6–4 | No. Axes Programmed with this Move |
| 3–0 | Not Used |

Blocks (A)–(H) described above are transmitted from the PC processor unit 11 to the master positioning I/O module 19. The last data structure to be described in detail is transmitted from the master positioning I/O module 19 to the PC processor unit 11 and is referred to as a STATUS BLOCK (S). This block is mapped in Table 9 below and its FIRST and SECOND STATUS CONTROL WORDS are mapped in Tables 10 and 11 below. The STATUS BLOCK (S) is transferred from the master positioning I/O module 19 to the PC processor unit 11 on a repetitive basis. An address pointer is sent to the PC processor unit 11 in this block to request the next data structure, whether it is the PARAMETER BLOCK (A), the MOTION CONTROL BLOCK (B) or one of the MOVE SET BLOCKS (C)–(E). Normally the B POINTER will be returned to obtain the MOTION CONTROL BLOCK. The STATUS BLOCK (S) also contains AXIS STATUS WORDS and POSITION/FOLLOWING ERROR data arranged according to the mode of axis coupling similar to the MOTION CONTROL BLOCK (B).

TABLE 9

MAP OF AXES STATUS BLOCK(S)
(Each line entry represents a 16-bit word of data.)

| | | |
|---|---|---|
| 1. | ADDRESS POINTER (BLOCK A, B, C, D, OR E, etc.) | |
| 2. | FIRST AXIS STATUS WORD | BLOCK |
| 3. | SECOND AXIS STATUS WORD | C |
| 4. | POS./FOLL. ERR. (MOST SIG.) | AXIS |
| 5. | POS./FOLL. ERR. (LEAST SIG.) | OR AXES |
| 6. | FIRST AXIS STATUS WORD | BLOCK |
| 7. | SECOND AXIS STATUS WORD | D |
| 8. | POS./FOLL. ERR. (MOST SIG.) | AXIS |
| 9. | POS./FOLL. ERR. (LEAST SIG.) | |
| 10. | FIRST AXIS STATUS WORD | BLOCK |
| 11. | SECOND AXIS STATUS WORD | E |
| 12. | POS./FOLL. ERR. (MOST SIG.) | AXIS |
| 13. | POS./FOLL. ERR. (LEAST SIG.) | |

TABLE 10

DESCRIPTION OF FIRST AXIS STATUS WORD

| Bit | Function |
|---|---|
| 17 | Excess Error |
| 16 | Loss of Feedback |
| 15 | Insufficient Data |
| 14 | Travel Limit + |
| 13 | Travel Limit − |
| 12 | Feedrate Reduction |
| 11 | Hardware Stop |
| 10 | Emergency Stop (E-STOP) |
| 7 | Program/Manual Mode |
| 6 | Home |
| 5 | Input No. 2 (JOG REVERSE) |
| 4 | Slide Stop |
| 3 | Input No. 1 (JOG FORWARD) |
| 2 | Ready |
| 1 | Done |
| 0 | In Position |

TABLE 11

DESCRIPTION OF SECOND AXIS STATUS WORD

| Bit | Function |
|---|---|
| 17 | Offset Taken |
| 16 | Preset Taken |
| 15 | Position Valid |
| 14 | Foll. Error Valid |
| 13 | Axis Fault |
| 12–10 | 3 Bit Move Set Number (BCD Format) |
| 7 | Programming Error |
| 6 | Parameter Out of Range |
| 5–0 | Move Number in BCD Format |

Having defined the contents of the data structures, the operation of the controller 10 in transferring these blocks of data between the PC processor unit 11 and the master positioning I/O module 19 can be explained with reference to the block diagrams in FIGS. 5–7. Beginning with FIG. 5, for the "three coupled axes" mode of operation, each frame represents a bidirectional block transfer or pair of transmissions. One block of data is transmitted downstream to the master positioning I/O module 19 and another block is returned upstream to the PC processor unit (PCPU) 11. Some of the frames have been split so that only one of the transmissions is shown. In the downstream transmission of Frame 1, the PARAMETER BLOCK (A) is sent to the master positioning I/O module 19 with A, B, and C POINTERS. While two words are reserved in this BLOCK for D and E POINTERS, these words carry zeroes and are not "active". The master positioning I/O module 19 always returns the STATUS BLOCK (S), however, the pointer returned in the STATUS BLOCK (S) varies according to which BLOCK will be requested for the next downstream transmission. Most often, the B POINTER is returned, so that the MOTION CONTROL BLOCK (B) is requested. The MOTION CONTROL BLOCK (B) might be requested for a number of frames after Frame 1, but to conserve space in FIG. 5, we shall assume that the C POINTER is returned in the STATUS BLOCK (S) of Frame 2. This event is effectively a request by the master positioning I/O module 19 for "move data", which it receives in a subsequent downstream transmission.

When the move data in MOVE SET BLOCK (C) in Frame 3 has been downloaded to the master positioning I/O module 19, it will select individual moves for transmission to the satellite I/O modules 18. Since move data will then be on hand for a certain time interval, there will be a number of frames after Frame 3 in which the STATUS BLOCK (S) will be returned with the B POINTER. An F POINTER accompanies the data in MOVE SET BLOCK (C) in Frame 3, and in a later Frame, designated M, this F POINTER is returned to the PCPU 11 as a request for a MOVE SET CONTINUATION BLOCK (F). The CONTINUATION BLOCK (F) also carries a pointer if still further move data is required. This can be a C POINTER to point back to the C BLOCK or it can be a C' POINTER to a C' BLOCK that is located in a different section of the main memory data table than either the C BLOCK or the F BLOCK. In this way a stream of move data can be transmitted to the master positioning I/O module 19, so that it can feed individual moves to the satellite I/O modules 18 as needed.

Comparing FIG. 5 to FIG. 6, which shows the "three independent axes" mode of operation, several differences will be observed. The A, B, C, D, and E POINTERS are all sent to the master positioning I/O module 19 in the PARAMETER BLOCK (A) in Frame 1. The STATUS BLOCK (S) is returned in Frame 1 with a B POINTER and the MOTION CONTROL BLOCK (B) is transmitted to the master positioning I/O module in Frame 2. Unlike the COMMAND WORDS in FIG. 5, however, these COMMAND WORDS can control motion only along their own respective axes of motion. BLOCK C is sent in Frame 3 in FIG. 6 similar to FIG. 5, except that this MOVE SET BLOCK now contains moves for the X-axis only rather than the X, Y and Z axes.

The sequence in FIG. 6 has been shown with the downstream transmission in Frame 3 opposite an upstream transmission in Frame M, which represents a later frame in which the D POINTER is returned to the PCPU 11 in the STATUS BLOCK (S) transmission. The PCPU is responsive to this D POINTER to send MOVE SET BLOCK (D) with Y-axis move data in a subsequent frame that is designated M+1. Some frames later, in a Frame designated P, the E POINTER is returned to the PCPU 11, and it responds in Frame P+1 by transmitting MOVE SET BLOCK (E) with Z-axis move data. If MOVE SET CONTINUATION BLOCKS (F)–(H) are needed for the respective axes, corresponding pointers are sent with MOVE SET BLOCKS (C)–(E). After the first sequence of MOVE SET BLOCKS (C)–(E) is received, the master positioning I/O module 19 starts sending back these pointers beginning with the F POINTER in Frame Q, and the G POINTER in Frame T. Due to space limitations the return of the H POINTER is not shown. Thus, move data is sent in a 3-block sequence for the three independent axes and continuation blocks are sent in a second 3-block sequence. Both sequences may contain intervening transmissions of the MOTION CONTROL BLOCK (B) with command data that must be quickly responded to.

Comparing FIG. 7 for the "two coupled axes, one independent axis" mode of operation, with FIG. 5 and 6, it will be seen that the PARAMETER BLOCK (A) is transmitted with A, B, C and E POINTERS. The MOTION CONTROL BLOCK (B) is again seen in Frame 2, however, only the X-axis and Y-axis command may affect an additional axis, because they are the two axes which are coupled. In this mode, MOVE SET BLOCK (C) contains moves for coupled axes X and Y, while MOVE SET BLOCK (E) contains move data for the independent Z-axis. The second move set pointer returned in this mode, which is seen in Frame M, is the E POINTER. In Frame P the F POINTER is returned for additional moves for the two coupled axes, and these moves are transmitted in the F BLOCK seen in Frame P+1. The H POINTER is returned in Frame Q to request a CONTINUATION BLOCK (H) with Z-axis move data, and this BLOCK H is transmitted in Frame Q+1. This mode of operation, with two axes coupled, corresponds to the mode of operation used by the machine in FIG. 1.

The PARAMETER BLOCK (A), MOTION CONTROL BLOCK (B) and MOVE SET BLOCKS (C) and (E) from FIG. 7 are shown in FIG. 8 as they are stored in the main memory of the PCPU 11. The PARAMETER BLOCK (A) is stored in an area beginning at octal address "300". The MOTION CONTROL BLOCK (B) is stored in an area beginning at octal address "260", and the AXES STATUS BLOCK (S) is stored in an area beginning in an area beginning at octal address "240". MOVE SET BLOCK (C) is stored in an area beginning at octal address "400", and MOVE SET BLOCK (E) follows at octal address "500". If necessary, CONTINUATION BLOCKS (F) and (H) would follow, to be followed by the CONTROL PROGRAM which in this example is seen at octal address "600". Above these areas is the traditional I/O image table for inputs and outputs and timer/counter present and accumulated values.

The transmissions of the individual blocks in FIGS. 5–7 are executed in the manner disclosed in Struger et al, U.S. Pat. No. 4,293,924, issued Oct. 6, 1981. The I/O interface rack 12 of FIG. 1 has been designated "Rack 1" according to the user addressing scheme. The master positioning I/O module 19 is in "slot 3" and its user address is therefore 013(output) and 113(input). At address 013 in the output image table in FIG. 8, an eight-bit control word contains a read flag in bit 7, a write flag in bit 6 and a six-bit block size in bits 0–5. In this instance the block size word is zeroed to indicate a default condition in which the size of the block transfer is controlled by a similar control word returned by the master I/O positioning module 19. Up to 64 words of data can be included in each block. During execution of the I/O scan routine, the control word is transmitted to the master positioning I/O module 19, and a second control word is received from the module and stored in the input image table. An I.D. signal is returned to the PC processor unit 11 with the second control word, and this causes it to jump to a subroutine to initialize the block transfer. In executing this subroutine, the bit-slice processor looks for the rack/slot address of the master positioning I/O module 19 in the timers/counters area at 040-100 (octal) and then looks at a corresponding location in the second timers/counters area 140-20-0(octal) for pointers to a block storage area in the data table. Here the matching rack/slot address is stored at "040" and "041". The address of BLOCK (S) is stored at "140" and a pointer to one of the other data structures is stored at "141". As the bit-slice processor couples blocks of data to and from the data table in FIG. 8, the master positioning I/O module communicates in the manner of the high density I/O module in U.S. Pat. No. 4,293,924, cited above, in a bidirectional transfer mode. It should also be noted in FIG. 8 that the amount of memory consumed is dependent on the number of MOVE SET BLOCK (C)–(E), which in turn, is dependent on the mode of axis coupling.

Figure 9A:
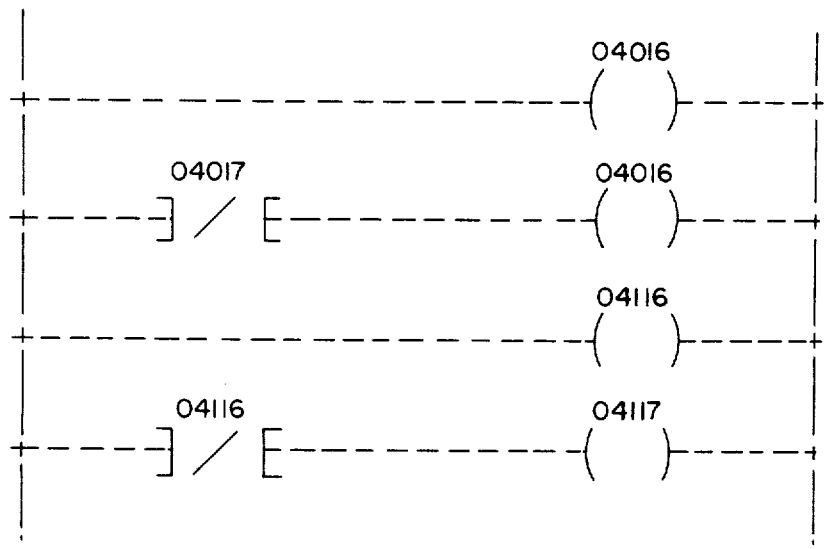
FIGS. 9a–9c are selected portions of a user program for initiating communication of the data structures.
Figure 9B:
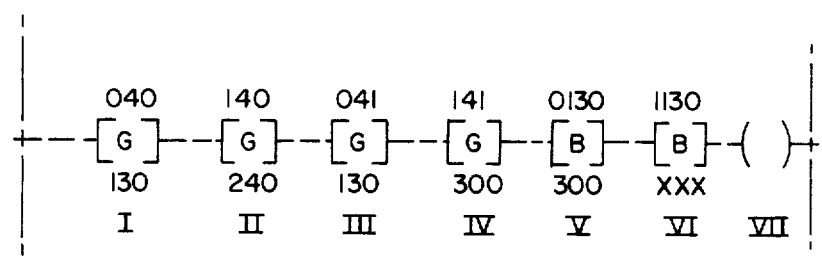
Figure 9C:
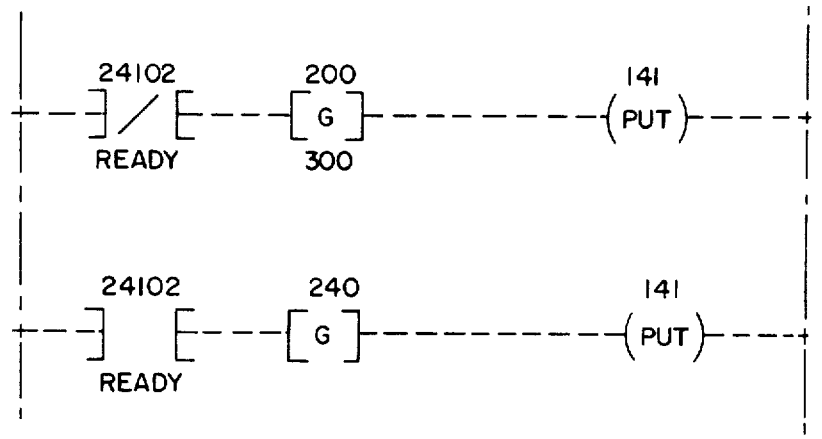

The location of the master positioning I/O module 19 and the satellite I/O modules 18 are to some extent within the discretion of the user, i.e. the modules can be arranged differently than in FIGS. 1 and 3. This requires, however, that the user tell the PC processor unit 11 where these I/O modules 18 and 19 are located, and where the control data can be found to perform the type of block transfer described in U.S. Pat. No. 4,293,924, cited above. This is accomplished through certain rungs that are added to the user program as seen in FIGS. 9a–9c. The execution of the four rungs seen in FIG. 9a sets the read and write flags in the data stored at locations 040 and 041 in the data table and interlocks these locations. The rung in FIG. 9b has six instructions I–VI which perform the following functions:

I—word 040 specifies rack 1, slot 3, low byte as the I/O location from which to read a block of data from the master positioning module 19.

II—word 140 contains a pointer to the first location in the main memory (address 240) for storing the first word of an incoming block of status data. The other words in the block are stored in successive locations immediately after location 240.

III—word 041 specifies rack 1, slot 3, low byte an I/O location to which a block of data is to be written.

IV—word 141 contains a pointer to the location in the main memory of the first word of the parameter block.

V—the read and write bits are set in the control word at location 013 (FIG. 8) for a bidirectional mode (read and write) operation between the processor and the master positioning I/O module 19.

VI—the I/O image byte at location 113 is used to monitor the present block transfer execution by showing either the read flag or the write flag and the number of words being transferred.

VII—a dummy output instruction is used to terminate the rung.

Referring to FIG. 9c, two rungs are shown for initiating the transfer of the PARAMETER BLOCK (A) and reading the pointer returned by the first STATUS BLOCK (S). When power is turned on, the PC processor unit 11 examines a ready bit location 24102, which is false, and the PC processor unit 11 therefore transfers the pointer for PARAMETER BLOCK (A) from address 300 in the data table to address 141. The PCPU 11 is programmed by its firmware instructions to transfer the indicated block from this location, so PARAMETER BLOCK (A) is transferred to the master I/O positioning module 19. The ready bit represents a signal back from the master positioning I/O module 19 that the parameters have been digested. When this has occurred, the master I/O module 19 returns a low-true signal at the I/O location 24102. The next instruction in the rung gets the pointer that was returned in the STATUS BLOCK (S) and loads it into pointer location 141 so that the appropriate block, e.g. the MOTION CONTROL BLOCK (B) or MOVE SET BLOCK (C), will be the next block transferred to the master positioning I/O module 19. With further ladder diagram programming, those skilled in the art can load move data into the move data structures, and can load data selecting the mode of axis coupling into the PARAMETER BLOCK (A) and data selecting the number of axes to be controlled into the MOTION CONTROL BLOCK (B).

The programmable controller 10 also allows the user to select its own operator controls for the control panel 33, and connect them to the I/O interface rack 12 through the swing arm connectors 27. The controller 10 can be "configured" through the user control program so that it will examine input controls of various locations and display data through output devices at various other locations. Operator functions such as START, E-STOP, SLIDE STOP, ESCAPE, JOG FORWARD, and JOG REVERSE can be entered through pushbuttons. Preset and tool offset data and feedrate override data can be entered through thumbwheel switches and feedback data can be observed through various types of display devices. Operator commands and preset/offset data are coupled to the data table in the PC processor unit 11 to be included in the MOTION CONTROL BLOCK (B) that is sent to the master positioning I/O module 19. Position feedback data is coupled back to the PC processor unit 11 in the STATUS BLOCK (S) and then coupled to the control panel display devices. The programmable controller 10 can thus be marketed apart from the control panel instrumentation which can be installed in the manner desired by the user.

3. Master Positioning I/O Module Hardware

Figure 10:
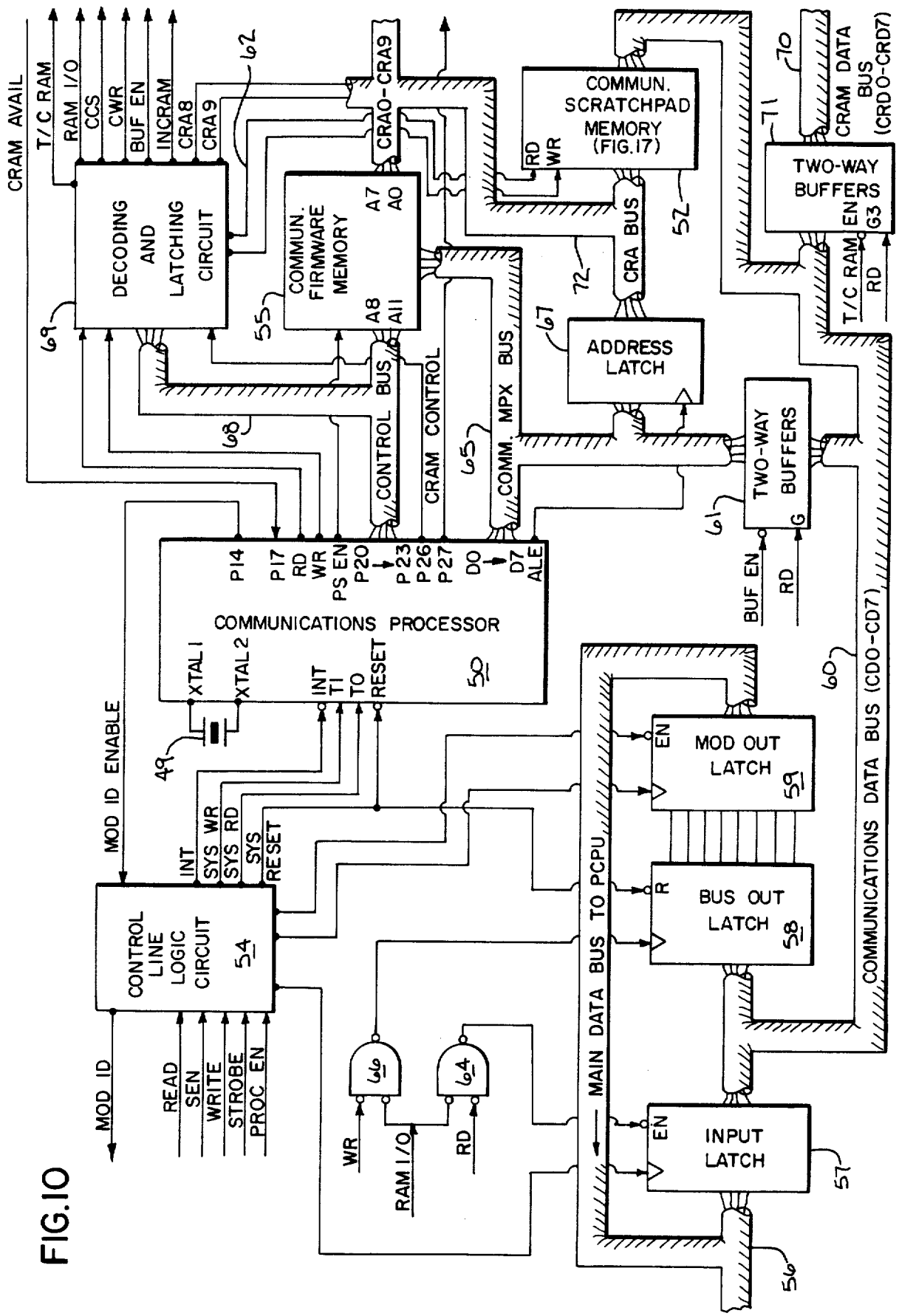
FIGS. 10 and 11 form an electrical schematic diagram of the master positioning I/O module of FIG. 3.
Figure 11:
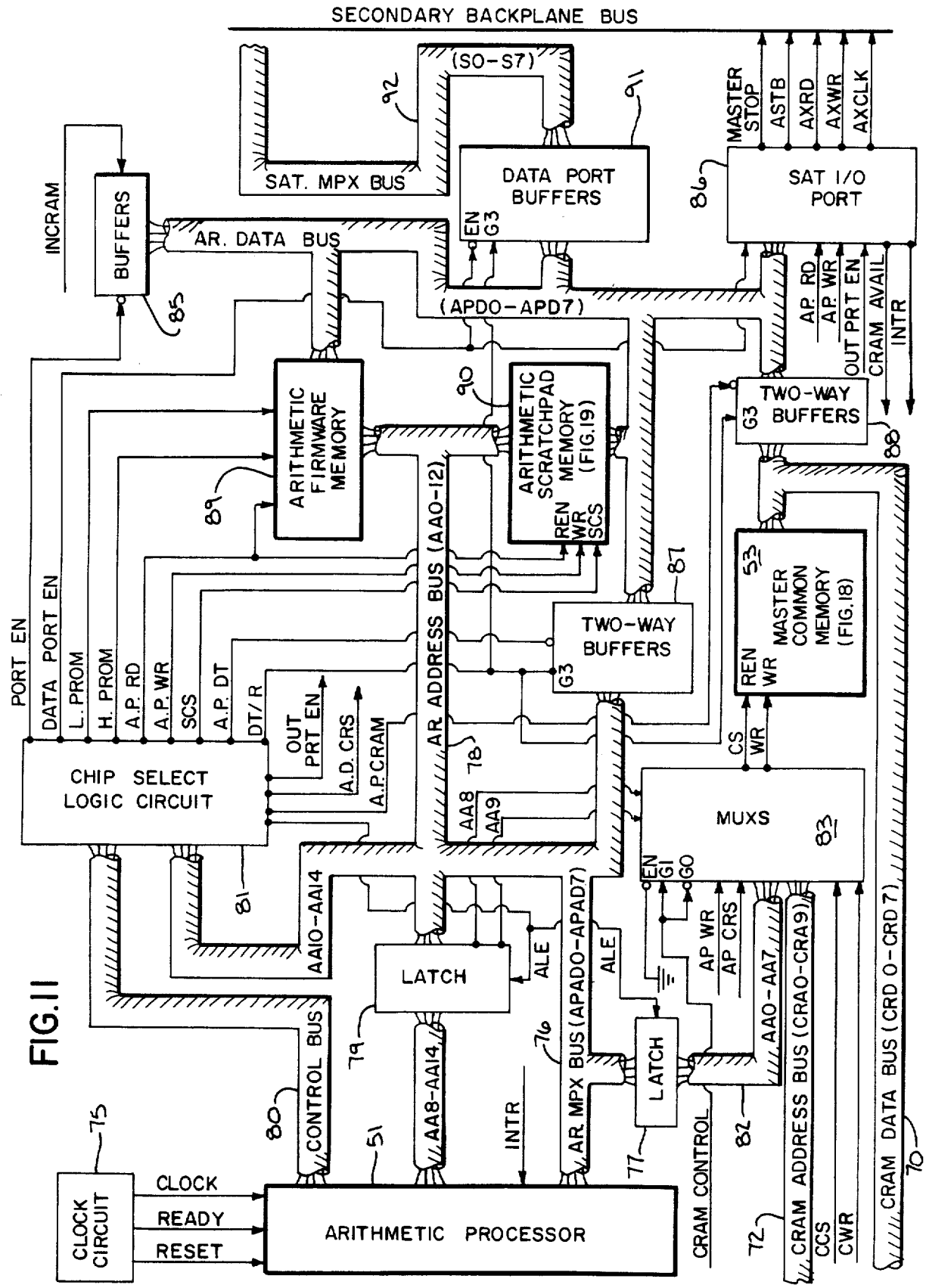

The manner in which the above-described data structures are processed for use by the satellite I/O modules 18 will be better understood by a more detailed review of the circuitry and operation of the master positioning I/O module 19 and one of the satellite I/O modules 18. Referring to FIGS. 10–11, the hardware for the master positioning I/O module 19 is shown in the form of a two-figure block diagram. The module 19 has two microelectronic processors which shall be referred to as a communications processor 50 and an arithmetic processor 51, respectively. The preferred components for these respective processors are the Intel 8039 and 8088 microprocessor chips. A detailed description of the architecture and operation of these processors can be obtained in literature which is commercially available from Intel Corporation. With an understanding of the operation described later herein in FIGS. 16 and 21-24, these processors can be programmed with the instruction set described in the commercial literature to carry out the invention.

The functions performed by the communications processor 50 include the sending and receiving of the various data structures, and checking new MOVE SET DATA BLOCKS (C, D, E, etc.) for data that has changed since the particular MOVE SET DATA BLOCK was last received by the master positioning I/O module 19. Referring to FIGS. 10 and 11 incoming data is stored in a read/write communications scratchpad memory 52, and when such data has changed, it is loaded into a read/write, master common memory 53. The data in the master common memory 53 is accessible to both processors 50 and 51 in a manner to be explained in more detail below. The arithmetic processor 51 performs conversion of the data between a binary format used by the satellite I/O modules 18 a binary-coded decimal (BCD) format for positioning data and user addresses that is used by the PC processor unit 11. The satellite I/O modules 18 are relieved of this data conversion function, to allow for a better job of closed-loop positioning control. The arithmetic processor 51 also downloads individual moves to the satellite I/O modules 18 for execution. Each satellite I/O module 18 maintains data for only two moves, a current move and a next move, so the master I/O module 19 is responsive to satellite requests for new move data.

Referring to FIG. 10 and the circuit aspects of the master positioning I/O module 19, the communications processor 50 is interfaced to the primary backplane bus 40 by a control line logic circuit 54 that receives signals on the READ, WRITE, SLOT ENABLE (SEN) and STROBE lines included in the backplane. Outputs to the backplane are made through a MOD ID line to identify the master I/O module 19 as a "high density" communication module. The details of this control line logic circuit 54 have been previously disclosed in U.S. Pat. No. 4,293,924, cited above. This circuit 54 is connected through INT, SYS RD and SYS WR lines to the INT, T1 and T0 inputs on the communications processor 50 to generate interrupt signals when the PC processor unit 11 initiates a READ or WRITE block transfer communication. The communications processor 50 responds to the interrupt signals by generating interrupt signals back to the PC processor unit 11 through the MOD ID line and by executing interrupt firmware routines that are stored in a nonvolatile communications firmware memory 55.

The communications processor 50 sends and receives data to and from the PC processor unit 11 through a main data bus 56, which is part of the primary backplane bus 40. The main data bus 56 is electrically coupled to the communications processor 50 through a module input latch 57, a bus output latch 58 and a module output latch 59. When data is received on the main data bus 56, it is clocked into the input latch 57 while an interrupt signal is being generated to the communications processor 50. The data is then available to the processor 50 through its communications data bus 60 (lines CD0–CD7) when it enables the two-way buffers 61 and the input latch 57, through its READ and WRITE control lines. These lines are coupled through a decoding and latching circuit 69 to a BUF EN input on the buffers 61, and the RD line is also coupled to a gate (G) input on the buffers 61. The outputs of the latch 57 are controlled through the RAM I/O and RD lines which are coupled through the low-true OR gate 64.

When the communications processor 50 is to write a word of data to the main data bus 56, it puts the word of data on a communications multiplex bus 65 (COMM. MPX BUS) and enables the two-way buffers 61, so that eight bits of data are coupled to the bus output latch 58. A clock signal is provided to this latch 58 from signals on the WRITE line and the RAM I/O line, which are coupled through the other low-true OR gate 66. On the next READ interrupt signal from the PC processor unit 11, the data is clocked into the module output latch 59, which is enabled by a read interrupt through the control line logic circuit 54, so that the word of data is transmitted through the output branch of the main data bus 56. The bus output latch 58 can be cleared through the SYS RESET line, which is controlled by the PC processor unit 11 through the PROC EN line.

The communications processor 50 is responsive to timing signals from clock crystal 49 to generate address and data signals on the communications multiplex bus (COMM. MPX. BUS) 65 in different time intervals. The address signals are coupled to an address latch 67 which is enabled through an address latch enable (ALE) line. From there, the address signals are coupled through lines CRA0–CRA7 of a "CRAM" address bus 72 to the communications firmware memory 55, or to the communications scratchpad memory 52, or to the common memory 53 in FIG. 11, depending upon which of these memories is enabled by control signals. The communications firmware memory 55 is enabled through a PSEN line from the processor 50. The scratchpad memory 52 is enabled through lines 62 from a decoding circuit 68, which are controlled through the RD and WR lines from the processor 50. And, the common memory 53 in FIG. 11 is enabled through CCS and CWR lines from the decoding circuit 69, when other circuitry in FIG. 11 is enabled through the CRAM CONTROL line originating at terminal P27 on the processor 50. It should be noted that two additional address lines CRA8 and CRA9 connect to the scratchpad memory 52 and the common memory 53 in FIG. 11. Four additional address lines for the firmware memory 55 are provided by control bus 68 in which lines connect terminals P20–P23 on the processor 50 to address inputs A8–A11 on the memory 55. The control bus 68 as well as a line from terminal P26 on the processor 50 carry control signals to the decoding circuit 69.

Besides generating address and control signals to the memories 52, 53 and 55, the communications processor 50 is also connected to two status lines related to the common memory. The CRAM AVAIL line, originating in FIG. 11, is connected to an input terminal P17 and an INCRAM line is controlled through output terminal P26 and the decoding circuit 68.

The communications processor 50 is connected directly to the firmware memory 55 for reading data through the multiplex bus 65. When reading data from other memories, however, additional buses must be coupled through bus transceivers, referred to simply as buffers 61 and 70 in FIG. 10. These buffers 61 and 70 are enabled through the BUF EN and T/C RAM lines, respectively, coming from the decoder circuit 69. They are enabled in one direction or the other, depending on the direction of data flow, through the RD line from the processor 50. The first set of buffers 61 couples the multiplex bus 65 to a communications data bus (CD0–CD7) 60, and the second set of buffers 71 further couples this bus 60 to a CRAM data bus (lines CRD0–CRD7) 70 extending into FIG. 11 to the master common memory 53. When communicating with the PC processor unit 11, the processor 50 enables the input and output latches 57 and 58 through the decoding circuit 69 and the RAM I/O line connecting to gates 64 and 66.

Referring to FIG. 11, the arithmetic processor 51 is driven by a clock circuit 75 through CLOCK, READY and RESET lines going to inputs on the processor 51. The arithmetic processor 51 also multiplexes bytes of address and data information on an arithmetic multiplex bus 76 (lines APAD0–APAD7). An upper six bits of address information (AA8–AA14) is coupled through an address latch 79 to an arithmetic address bus 78 (AA-0–AA14) that receives a lower eight bits through the arithmetic multiplex bus 76. The arithmetic processor 51 enables address latches 77 and 79 through an ALE line, which is included in the control bus 80, and which is coupled through a chip select logic circuit 81 to the two latches 77 and 79. Latch 77 holds signals received for lines AA0–AA7 in a branch bus 82. This branch bus 82 and lines AA8 and AA9 from the first address latch 77 are coupled to one set of inputs on three multiplexers 83. The multiplexers 83 have another set of inputs connected to lines CRA0–CRA9 of the CRAM address bus 72 originating in FIG. 10. Besides selecting one of the address buses 72 or 82, the multiplexers 83 also select either the CCS and CWR control lines from the decoder circuit 69 in FIG. 10 or the A.P. WR (write) and A.P. CRS (chip select) control lines from the chip select circuit 81 in FIG. 11, according to the state of the CRAM CONTROL line.

Through the multiplexers 83 and the CRAM control lines discussed in FIG. 10, the communications processor 50 and the arithmetic processor 51 communicate by alternately obtaining access to the master common memory 53. In terms of its internal processing capabilities, the arithmetic processor 51 is a sixteen-bit machine, which gives it an advantage over eight-bit machines such as the communications processor 50, in performing arithmetic functions such as addition, subtraction, multiplication and division. The communications processor 50 on the other hand, is well-suited to interrupt-driven I/O communication tasks. The common memory 53 is therefore controlled by allowing the arithmetic processor 51 to have access to the common memory 53 for a greater time, and by giving the communications processor 50 a controlled ability to interrupt the arithmetic processor 51 to update the data blocks stored in the common memory 53. During these interrupt cycles, new MOVE SET BLOCKS(C)–(E) are written into the common memory 53 and new STATUS BLOCKS(S) are read from the common memory 53 for transmission to the PC processor unit 11.

The arithmetic processor 51 controls the time that such an interrupt cycle can occur by controlling the CRAM AVAIL line through a satellite I/O port 86. This port 86 is enabled through the output port enable (OUT PORT EN) line and data is coupled through an arithmetic data bus 84 (APD0–APD7) to activate the CRAM AVAIL line. Referring to FIG. 10, the status of the CRAM AVAIL line is sensed by the communications processor 50 at terminal P17 and it responds by activating the INCRAM line through terminal P26. The status of the INCRAM line is sensed by the arithmetic processor 51 through buffers 85, which are enabled through the input port enable (IN PORT EN) line. The arithmetic processor 51 then knows that the communications processor 50 is about to take control, which it does by selecting a state for the CRAM CONTROL line in which the multiplexers 83 couple addresses to the common memory 53 from the CRAM address bus 72. In its other state, both before and after such an interrupt cycle, the CRAM CONTROL line selects lines AA0–AA9, so that the arithmetic processor 51 has access to the common memory 53.

So far only the address signals to the master common memory 53 have been discussed. Data is coupled to and from the common memory 53 through the CRAM data bus 70 when the communications processor 50 has access. Data is coupled to and from the common memory 53 through the arithmetic multiplex bus 76, a first set of two-way buffers 87, the arithmetic data bus 84 and a second set of two-way buffers 88, when the arithmetic processor 51 has access. During a read or write cycle, the arithmetic processor 51 puts out address data to the address latch 77 first, and then couples the data through data buses 76 and 84 to the common memory 53. As the data is coupled, the buffers 87 and 88 are enabled through the chip select logic circuit 81, and through the A.P. DT and A.P. CRAM lines going to their respective enable inputs. A direction control (DT/R) line running from the chip select logic circuit 81 to the inputs on the buffers 87 and 88 controls the direction in which data is transmitted.

Through the chip select logic circuit 81, the arithmetic processor can also enable a nonvolatile, arithmetic firmware memory 89, which stores processor instructions in machine language at processor addresses that are different from those where data is stored in the common memory 53. The arithmetic processor 51 can read and write data to and from a read/write, arithmetic scratchpad memory 90 at another set of addresses. The address signals on lines A10–A14 and the signals through the control bus 80 are decoded by the chip select logic circuit 81 to generate control signals on the H. PROM, L. PROM, A.P. RD, A.P. WR and SCS enable lines. The H. PROM and L. PROM lines are used to enable high address and low address portions of an arithmetic firmware memory 89. Signals on the A.P. RD and A.P. DT lines allow data to be read through the arithmetic data bus 84 and the buffers 87. When the arithmetic scratchpad memory 90 is addressed, a chip select signal is coupled to it through the SCS line, accompanied by either a read signal on the A.P. RD line or a write signal on the A.P. WR line. The buffers 87 and the buses 76 and 84 are also enabled during these cycles. The arithmetic firmware memory 89 stores machine-language instructions in routines that are executed by the arithmetic processor 51 to carry out the functions to be described. The scratchpad memory 90 provides a means for storing data, for further computation, or prior to transfer to the common memory 53, or prior to transfer to one or more of the satellite I/O modules 18.

When data is coupled to or from one of the satellite I/O modules 18, a set of data port buffers 91 are enabled through a data port enable (DATA PORT EN) line from the chip select logic circuit 81, and the direction of data flow is controlled through the DT/R line connected to a G3 input on the buffers 91. The buffers 91 drive the lines in the arithmetic data bus 84 or lines SD0–SD7 of a satellite multiplex bus 92 according to the direction in which data is being transmitted. As part of the read or write cycle in which data is coupled on the satellite multiplex bus 92, signals are also generated through axis read (AX RD) and axis write (AX WR) control lines. These lines are included in the secondary backplane bus 41 and connected to the satellite I/O port 86. These lines are controlled through the A.P. RD and A.P. WR lines going to the satellite I/O port 86 from the chip select logic circuit 81. Other lines controlled through the satellite I/O port 86 are the STOP line, the address strobe (ASTB) line for signalling the identity of information on the satellite multiplex bus 92, the CRAM AVAIL line, and an interrupt (INTR) line going back to the arithmetic processor 51. The satellite I/O port 86 also includes a timer which is set to time out in 2.0 milliseconds and generate a signal on the AX CLK line. The satellite I/O port 86 is enabled through the OUT PORT EN line, when one or more of its satellite control lines is to be active.

4. Satellite I/O Module Hardware

Figure 12:
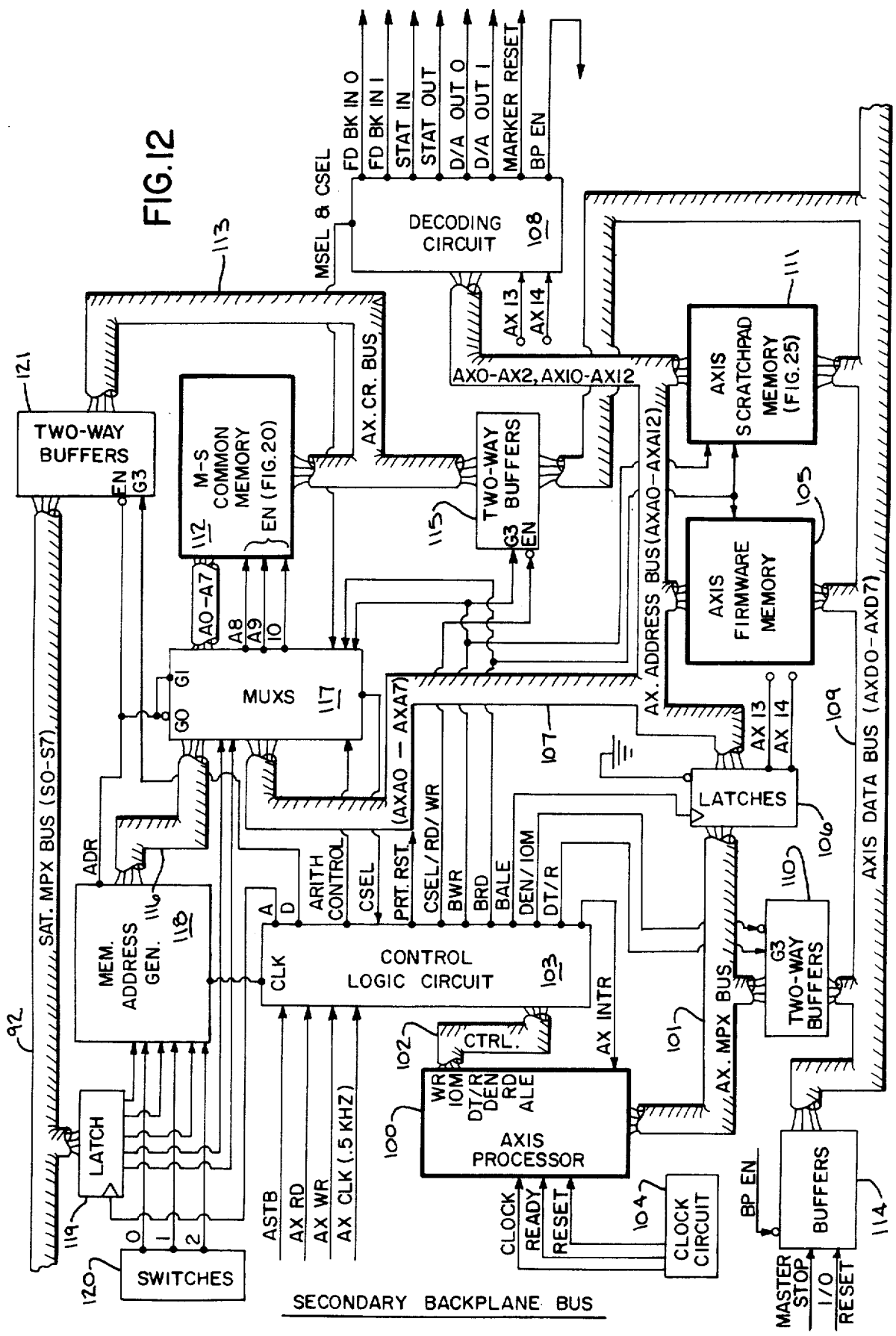
FIGS. 12–14 form an electrical schematic diagram of one of the satellite I/O modules seen in FIG. 3.

Referring to FIG. 12, each satellite I/O module 18 has its own axis processor 100. Like the arithmetic processor 51 discussed above, an Intel 8088 16-bit microelectronic processor has been selected for the axis processors 100 of the preferred embodiment. The axis processor 100 communicates with the other components on the module 18 through a 16-line (AX0–AX15) axis multiplex bus 101 that carries both address and data signals on its eight lower bit lines AX0–AX7. The axis processor 100 also transmits signals through a control bus 102 to a control logic circuit 103. Further control signals are derived within this circuit 103 and coupled from its outputs to enable the other components on the module 18 at various times as the axis processor 100 is executing sequences of its machine instructions. The axis processor 100 obtains basic timing signals from a clock circuit 104 through a CLOCK line running to the processor 100 with READY and RESET control lines. From these basic timing signals the processor 100 derives output control signals such as read (RD), write (WR), I/O memory control (IO/M), address latch enable (ALE), data transmit/receive (DT/R) and data enable (DEN). These signals are generated when the processor 100 fetches instructions, or couples other data through the network of buses on the module 18.

The axis processor 100 sequentially reads machine instructions that are organized in program sequences and fixed in a readable, but nonvolatile state in an axis firmware memory 105. When the axis processor 100 generates an address on the axis multiplex bus 101, it is clocked into a pair of latches 106 by a control signal received from the control logic circuit 103 on the BALE line. The address is then available to the axis firmware memory 105 through lines AXA0–AXA12 of an axis address bus 107. Lines AX13 and AX14 of the axis multiplex bus 101 are also coupled through the latches 106, but these lines carry control signals to a decoding circuit 108. When reading machine instructions from the axis firmware memory 105, the axis processor 100 generates a control signal through the control logic circuit 103 and the BRD line to a control input on the axis firmware memory 105. This allows a word of instruction information to be read onto the axis data bus (lines AXD0–AXD7) 109. Control signals are also transmitted through the DT/R line and a DEN/IO/M line which are coupled from the control logic circuit 103 to the two-way buffers 110, to activate these buffers 110 when such information is to be read into the axis processor 100 through the buses 101 and 109.

Similarly, the axis processor 100 can read data from or write data into an axis scratchpad memory 111. A control signal for the write operation is received by the scratchpad memory 111 through the BWR line. The DT/R line carries a signal of opposite logic state from that during the read operation, to enable the buffers 110 in an output direction.

The axis processor 100 shares access with the arithmetic processor 51 to a read/write, master-satellite common memory 112. Data is coupled between the common memory 112 and the axis processor 100 through an axis common memory bus (AX. CR. BUS) 113 which is coupled to the axis data bus 104, through another set of two-way buffers 115. These buffers 115 are controlled through the BWR control line and a CSEL/RD/WR control line coming from the control logic circuit 103. The BWR line enables the buffers 115, while the CSEL/RD/WR line controls the direction in which the buffers 115 are enabled. This last control line is derived in part from a chip select (CSEL) line that is coupled with a memory select (MSEL) line from the decoding circuit 108 to the multiplexers (MUXS) 117, the CSEL line being further coupled to the control logic circuit 103.

The multiplexers 117 have address outputs A0–A7 coupled to corresponding address inputs on the master-satellite common memory 112 and address outputs A8–A10 coupled to enable inputs on that memory 112. The multiplexers 117 provide two sets of inputs, one for lines controlled by the axis processor 100 and the other for lines controlled by the arithmetic processor 51 in FIG. 11. The axis processor 100 is coupled to these inputs through lines AXA0–AXA7 of the axis address bus 107, the BRD and BWR control lines, and the MSEL line mentioned previously. Address lines from the arithmetic processor 51 originate at the outputs of a memory address generator 118 and a latch 119, which has other outputs connected to inputs on the memory address generator 118.

Two lines in the satellite multiplex bus 92 become bank select lines for selecting four different 64-byte sections of the master-satellite common memory 112. The memory address generator 118 is coupled through six lines 116 to sequentially address the 64-bytes within the selected area of the memory 112. This bank-addressing technique allows the addresses from the arithmetic processor 51 to be coupled through the secondary backplane bus 41 with fewer than the eight address lines that are coupled to the memory 112. Control signals from the arithmetic processor 51 are coupled with signals from the backplane lines, including AX STB, AX RD, AX WR and AX CLK, by the control logic circuit 103 and by the arithmetic control (ARITH CONTROL) lines (illustrated as a single line) going to the multiplexers 117. A trigger signal for the memory address generator 118 is derived from these backplane signals and coupled through a CLK line to begin the sequential addressing of a 64-byte section of the master-satellite common memory 112.

When the axis processor 100 has access to the master-satellite common memory 112, the ADR line is at a logic high state and the multiplexers 117 are enabled at their G1 inputs to couple the address and control lines from the axis processor 100. At the same time the buffers 115 are enabled through the CSEL/RD/WR control line and the direction of data flow through the buffers 115 is controlled through the BWR line extending from the control logic circuit 103 to the G3 input on the buffers 115. The other buffers 110 between the master-satellite common memory 112 and the axis processor 100 are also enabled at that time.

When the arithmetic processor 51 is to interrupt the operation of the axis processor 100, it generates an address for the satellite I/O module 18 on the satellite multiplex bus 92, and also couples the necessary control signals on the AX STB, AX RD and AX WR lines to generate a signal on the A control line which clocks the address into the latch 119. Each satellite I/O module 18 has a numerical identity that is maintained by three switches 120. These are coupled to three inputs on the memory address generator 118 for comparison to three bits of information coupled from the latch 119. When a match occurs, the state of the ADR line is switched to a logic low and the multiplexers 117 are enabled at the GO enable input to select the address and control signals from the arithmetic processor 51. The logic low state of the ADR line also enables another set of two-way buffers 121 so that data can be coupled from the satellite multiplex bus 92 through the axis common memory bus 113 to communicate with the master-satellite common memory 112. The direction in which these buffers 121 are enabled is controlled by a D control line, which in turn is controlled by control logic circuit 103 and the secondary backplane control lines.

The arithmetic processor 51 interrupts the axis processor 100 every 2.0 milliseconds by generating a signal on the axis clock (AX CLK) line through the control logic circuit 103. The AX CLK line controls the status of the axis interrupt (AX INTR) line going to an interrupt terminal on the axis processor 100. Thus, the arithmetic processor 51 has the ability to interrupt the axis processor 100 and gain control of buses to couple data to and from the master-satellite common memory 112. When several satellite I/O modules 18 are included in a system, all are interrupted before data is sent, so that data can be sent to satellites controlling coupled axes of motion. The interrupt terminal on the axis processor 100 is disabled, when necessary to prevent an interrupt from the arithmetic processor 51 that would interfere with initialization or other routines that should not be interrupted.

The axis processor 100 also controls the digital-to-analog output circuitry and the position monitoring circuitry that is necessary for closed-loop positioning control. Control signals that are required for this function are coupled from the decoding circuit 108 to the circuitry in FIG. 13, these signals being derived from signals on the axis address bus 107 from the axis processor 100. These signals are coupled on two feedback input enable (FDBKIN0 and FDBKIN1) lines, a status input enable (STAT IN) line, a status output enable (STAT OUT) line, and two digital-to-analog clock output (D/A OUT 0-1) lines. The decoding circuit 116 also provides a backplane enable (BP EN) line for reading the STOP signal from the master positioning I/O module 19 through buffers 114. Digital output data and position input data are coupled to and from this closed loop positioning control circuitry through the axis data bus 109, which extends from FIG. 12 to FIGS. 13 and 14.

Figure 15:
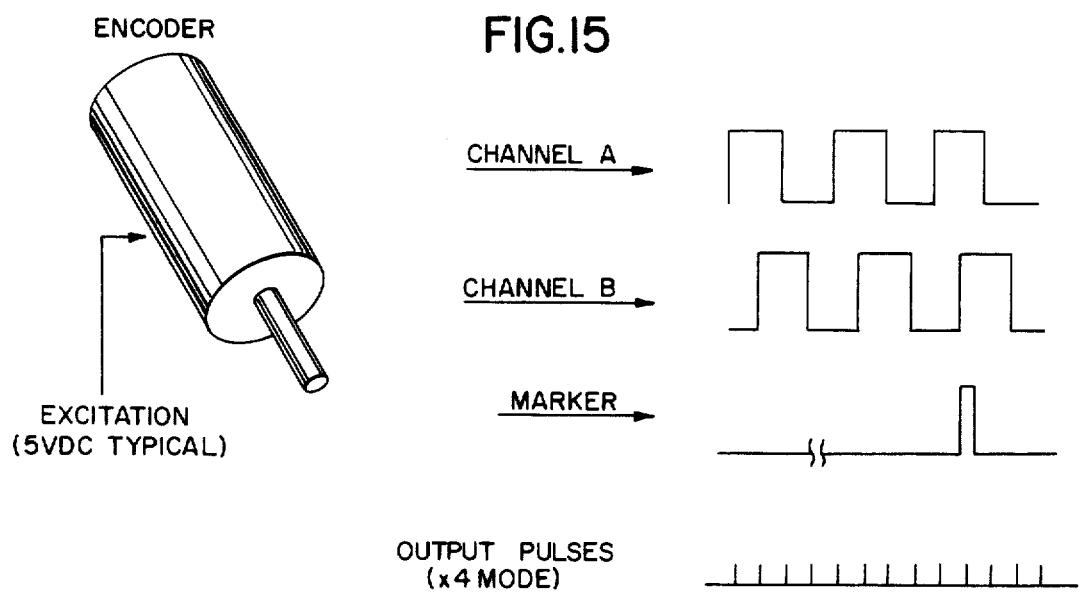
FIG. 15 is a diagram illustrating the encoding of feedback position signals.
Figure 13:
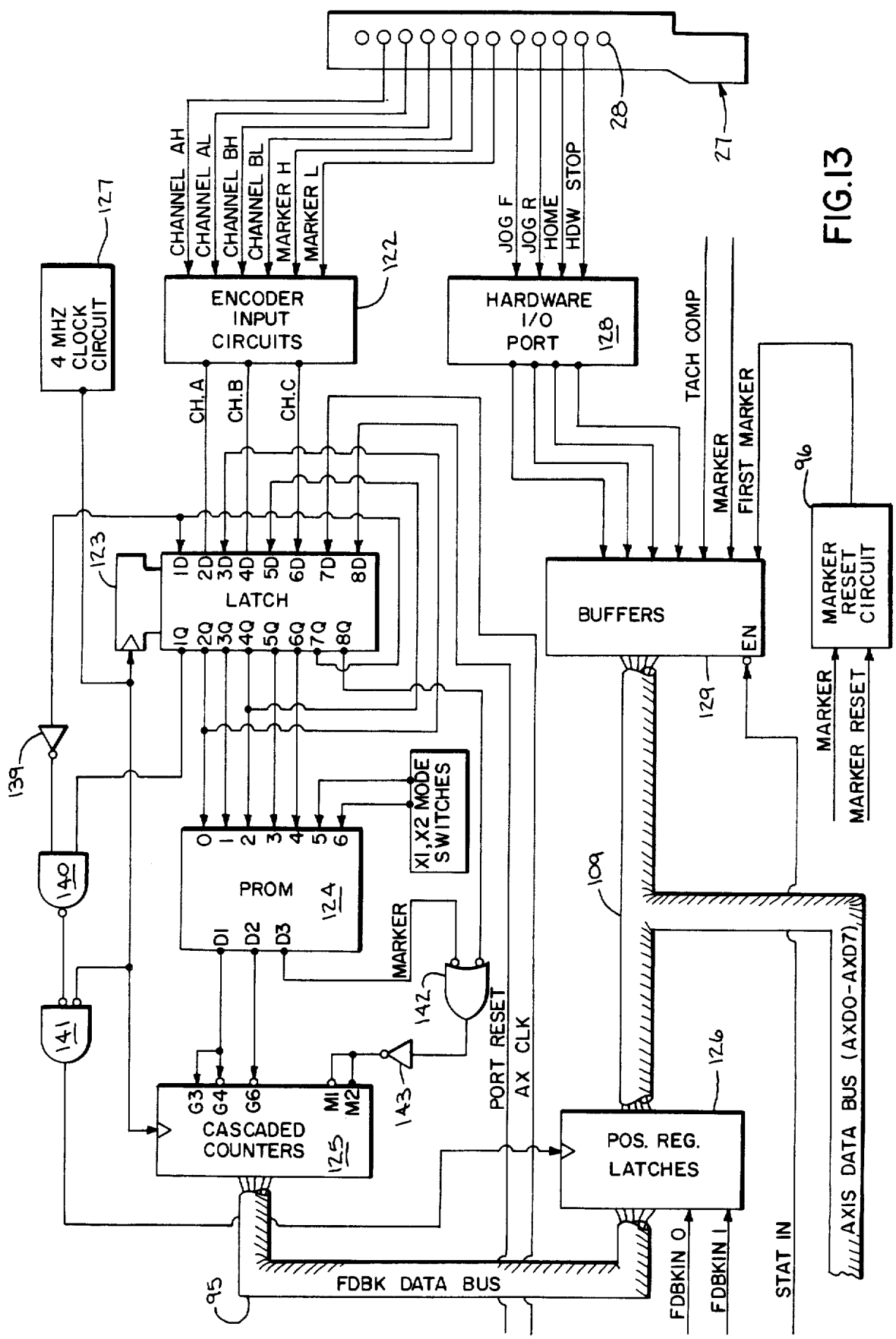

Referring to FIG. 13, the ENCODER INPUTS of FIG. 3 are wired as inputs to terminals 28 on a swing arm connector 27 attached to the front edge of the satellite I/O module 18. These inputs more particularly include a pair of CHANNEL A inputs, (H and L) a pair of CHANNEL B (H and L) inputs and a pair of MARKER inputs (H and L). An optical encoder, which is suitable for use as the encoder 43 in FIG. 3, generates square wave input signals for CHANNELS A and B that have a 90° phase difference as seen in FIG. 15. The pulses are generated when etched lines on a transparent disc of the encoder are rotated between a light source and one or more photodiodes. The number of square waves generated in each revolution is related to the pattern and number of etched lines on the disc, and is generally in a range from 50 to 2500 lines. The number of pulses can be multiplied by feedback multipliers of x2 and x4 and the disc count can be multiplied by a factor of 4. These pulses are seen in FIG. 15 with a MARKER pulse that is generated each revolution as a reference marker on the disc passes the detector. The use of two channels allows for encoding the direction of shaft rotation and also allows for pulse multipliers, as each change of state received through CHANNEL A or CHANNEL B can represent an increment or individual input pulse from the encoder.

Referring again to FIG. 13, the incoming CHANNEL A and CHANNEL B pulses are sensed through comparators and opto-isolating photo-transistors which are connected to form encoder input circuits 122. These circuits 122 also include the necessary biasing networks and switches to accept encoded waveforms of various voltage levels and scale them to the +5-volt logic level signals that are observed at the CH. A, CH. B and CH. C outputs going to the inputs of an eight-bit latch 123. The latch 123, a 256-line-by-4-bit programmable read-only memory (PROM) 124 and four 4-bit binary counters 125 respond to timing and control signals from a 4 Mhz clock circuit 127 and the AX CLK line to decode the encoded position input signals and periodically set up a binary, incremental position number in a 16-bit position register formed by two eight-bit latches 126. The feedback position is periodically read by the arithmetic processor 51, as explained relative to the flow charts herein, by sequentially enabling the eight-bit position register latches 126 through the FDBKIN 0 and FDBKIN 1 lines and reading the high and low bytes through the axis data bus 109.

The loading of the position register latches 126 is accomplished as follows. The CH. A and CH. B inputs to the latch 123 are coupled to the "0" and "2" inputs on the decoding PROM 124 and are wrapped around from these connections through the same latch 123 for additional connections to the "1" and "3" inputs of the PROM 124, respectively. This allows the state of the CH. A and CH. B inputs to be examined at two time intervals (t) and (t−1) to see which channel has changed from the previous time interval and to combine the CH. A and CH. B signals from these two intervals to form a four-bit sequence to address the decoding PROM 124. The states of CH. A and CH. B in the (t−1) interval are present at the 3D and 5D inputs on the latch 123 as the (t) interval states are received at the 2D and 4D inputs.

Clock pulses for the latch 123 are generated at a frequency of 4 Mhz by the clock circuit 127. Each clock pulse times a 4-bit pattern at outputs 2Q-5Q, which is coupled to inputs "0-3" in the PROM 124. Additional address bits are provided by the MARKER (CH. C) input signal, which is coupled through the 6D input and 6Q output on the latch 123 to input "4" on the PROM 124. Two switches 117 are set to select input signals that are coupled to input "5" for an x2 feedback multiplier mode and to input "6" for an x1 feedback multiplier mode. Each line in the PROM 124 has four bits of data including a count bit, a direction bit, a LOAD control bit and an extra unused bit. Four lines of data provide a first 4-bit sequence of 4 counts going to the UP/DOWN (G3-G4) count inputs from the D1 output. Logic high counts are used to count up and logic low counts are used to count down. The counters 125 are cascaded with the outputs of the first three connected to the G5 inputs on the counter next in order. A second 4-bit sequence is simultaneously coupled from the D2 output in the PROM 124 to form a direction pulse going to the G6 input on the counters 125.

The PROM 124 stores a 4-line sequence for the "up" count direction and stores a second four-line sequence for the "down" count direction. The number of these sequences is doubled to distinguish events when the marker is detected. These four sets of 4-line×4-bit sequences must be further supplemented by four sets for the x2 mode and four sets for the x1 mode. In the x2 mode only two count pulses are generated for each four-line sequence read from the PROM 124 and in x1 mode only one count pulse is generated to the counter for each four-line sequence read from the PROM.

By sampling the incoming pulses from the CHANNEL A and CHANNEL B inputs in the above manner, the phase relationship of the channels is decoded to determine direction and the number of pulses is converted to counts. The accumulated count value is loaded into the position register latches 126 when they are clocked by the 0.5 khz clock signal on the AX CLK line, which connects to the 7D input on the latch 123 and is wrapped around through the 1D input and 1Q output to several gates 139–141 to enable the inputs of the position register latches 126. A feedback data bus (FDBK DATA BUS) 95, which couples the outputs of the counters 125 to the position register latches 126, has sixteen lines. The feedback position data is read eight bits at a time through the axis data bus 109 when the axis processor 100 sequentially enables the latches 126 through the FDBKIN 0-1 lines.

Generally speaking, each time a marker is sensed, the cascaded counters 125 are reset by a signal at their LD/COUNT (M1, M2) inputs. This signal is generated by an input through the MARKER H and L inputs which are coupled through CH.C to the latch 123, and then to input D4 in the PROM 124. When the output signal for the marker is transmitted from output D3 in the PROM it is coupled through a low-true NAND gate 142 and an inverter 143. The PORT RESET line is also coupled through the low-true NAND gate 142 and is controlled by the axis parameter 100 through the control logic circuit 103 to control the times at which the cascaded circuits can be reset to zero.

A marker reset circuit 96 in FIG. 13 provides a circuit for distinguishing the first marker from successive markers. The axis processor 100 provides a reference for detecting the first marker by generating a signal on the MARKER RESET line to the input on the marker reset circuit 96. The next marker that is detected results in a signal on the MARKER line from PROM 124 that is coupled to the marker reset circuit 96 to produce a signal on the FIRST MARKER line. This signal is read through buffers 129 by the axis processor 100 when it reads the hardware I/O port 128.

Also connected to the swing arm 27 in FIG. 13 are user-operable controls (not shown) for JOG FORWARD (JOG F), JOG REVERSE (JOG R) and HARDWARE STOP (HDW STOP). These inputs duplicate the functions of several switches on the control panel 33, however, it is preferred to have these inputs also available on the satellite I/O module 18 itself. A HOME input is provided for a home limit switch (not shown in FIG. 1) on the machine 32. The terminals 28 for these inputs are connected to hardware input circuits similar to those for the encoder inputs which form a hardware I/O port 128. The input circuits in the hardware I/O port 128 include a comparator to sense each input and a photoelectric transistor for isolating the electronics on the module 18 from the electrical operating environment outside the controller 10. These hardware inputs are coupled to the axis data bus 109 through the buffers 129 and are read when these buffers 129 are enabled through the STAT IN line.

Figure 14:
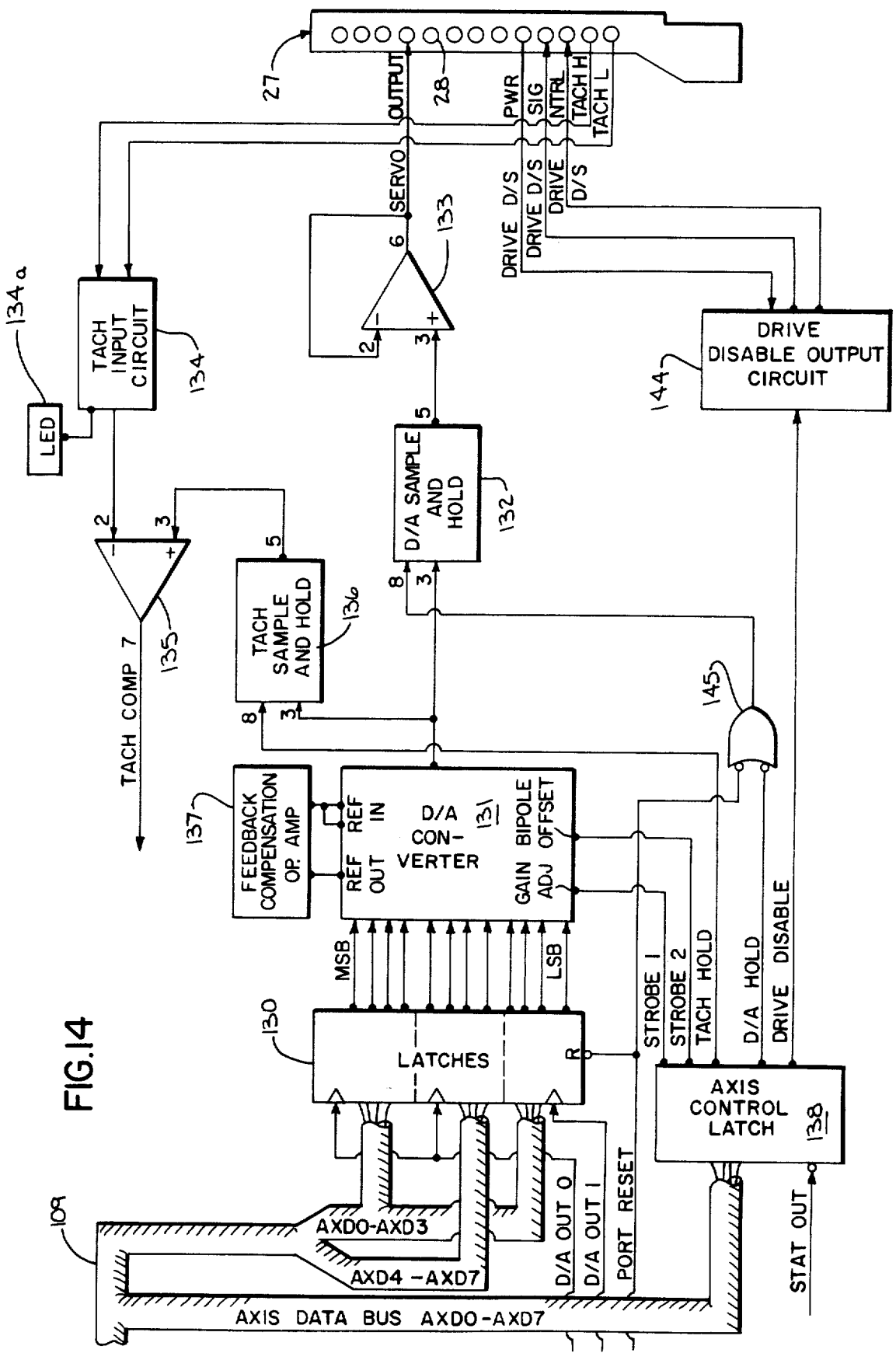

FIG. 14 shows the electronics for converting digital signals from the axis processor 100 to an analog output signal that controls the velocity of the servo motor 42. A 12-bit representation of the servo motor output velocity is multiplexed through the 8-bit axis data bus 109 and held in three 4-bit latches 130. Two of the latches are clocked through the D/A OUT 0 line to receive the upper eight bits, and the third is clocked through the D/A OUT 1 line to hold the lower four bits. The twelve bits of information are coupled to twelve inputs on a 12-bit digital-to-analog (D/A) converter 131. A feedback compensation circuit 137 is connected to two reference voltage terminals on the D/A converter 131. The analog output of the D/A converter 131 generates analog signals in the range of ±10 AC volts and is connected to a first, analog input (pin 8) of a D/A sample and hold circuit 132. A D/A HOLD control line is coupled to a second, digital input (pin 3) on the D/A sample and hold circuit 132. When a logic high signal is present on this line, the analog output (pin 5) of the sample and hold circuit 132 follows the signal at its analog input (pin 3). This is the "sample" mode. When a logic low signal is present at the digital input, the analog output is held, irrespective of a change at the analog input. This is the "hold" mode. The analog output of the D/A sample and hold circuit 132 is coupled through an operational amplifier 133, that acts as a buffer between the sample and hold circuit 132 and the SERVO OUTPUT line that connects to a terminal 28 on the swing arm connector 27. The D/A sample and hold circuit 132 is switched every 2.0 milliseconds to the sample mode by the axis processor 100 to generate an output velocity signal to the servo motor 42. In between these events, the circuit 132 is retained in the "hold" mode.

The satellite I/O module 18 uses the TACH INPUT signals to detect a loss of feedback. If, for example, the D/A converter 131 is generating a maximum output voltage, the servo motor 42 should be running at full speed and a comparable maximum input voltage should be sensed through the TACH INPUT lines (TACH H and TACH L), which are connected to two terminals 28 on the lower swing arm connector 27. Where the tach input voltage is not in proper proportion to the output voltage to the servo motor 42, the position feedback data from the encoder 43 is not valid. The tachometer input voltage is sensed through a tach input circuit 134 and a comparator 135. The input circuit 134 includes an operational amplifier and a biasing network that is used to calibrate the level of the tach input voltage to the voltage range of the D/A converter 131. Because the maximum or full-speed voltage of tachometers may range from three to fifty AC volts, the satellite I/O module 18 must be conditioned to equate the maximum feedback voltage for the selected tachometer to the maximum servo velocity output voltage of ±10 AC volts. When these two voltages have been "calibrated" the satellite I/O module 18 can sense a loss of the feedback when the tach input voltage is disproportional to the servo velocity output voltage by a selected amount that is specified in the TACH PARAMETER word of the PARAMETER BLOCK (A).

To test the tach input voltage through the comparator 135, a known signal must be coupled to one input and compared with the tach input voltage at another input. The digital output (pin 7) of the tach comparator 134 is read through the axis data bus 109 and the buffers 129 in FIG. 13 when the STAT IN line is enabled. The known signal is generated to the D/A converter 131, which has its analog output coupled to the analog input (pin 3) of a tachometer sample and hold circuit 136. The digital input (pin 8) of the circuit 136 is controlled through the TACH HOLD line. For feedback calibration a signal proportional to the servo output voltage is coupled to the positive input (pin 3) on the comparator 135 through the sample and hold circuit 136. Two potentiometers in the tach input circuit 134 are adjusted until the comparator 134 switches at its output (pin 7). This is also visually detected by a LED 134a, which is connected to the tach input circuit 134 and to an input of the comparator 135. When the comparator output switches, current is drawn through the LED 134a into the negative input (pin 2) of the comparator 134. To check for loss of feedback, analog signals are output through the tach sample and hold circuit 136 to one input (pin 3) of the comparator 134 and for each sample, a digital signal is read from the output (pin 7) of the comparator 135 through the TACH COMP line. By generating reference signals at the limits of an acceptable operating range for the tach input voltage, the axis processor 100 can detect whether the voltage received through the input circuit 134 is greater than the minimum acceptable voltage and less than the maximum acceptable voltage. If this test produces a negative result, there is a loss of feedback.

Commercially available servomechanisms 45 typically include a DRIVE DISABLE control circuit and this is controlled by the satellite I/O module 18 through the DRIVE DISABLE line. This line is controlled through the axis control latch 138 which is enabled through the STAT OUT line. The DRIVE DISABLE line is coupled through a drive disable output circuit 144, which provides isolation for the DRIVE DISABLE SIGNAL line and DRIVE DISABLE NEUTRAL lines. The user supplies power to this circuit through the DRIVE DISABLE POWER line. Signals for the TACH HOLD and D/A HOLD control lines and STROBE 1 and STROBE 2 lines are also coupled through the axis data bus 109, the axis control latch 138 and a low-true NOR gate 145. The STROBE 1 and STROBE 2 lines are used to control certain internal portions of the D/A converter 131 as recommended by the manufacturer of the chip.

5. Operation of the Processors on the Master Positioning I/O Module

Figure 18:
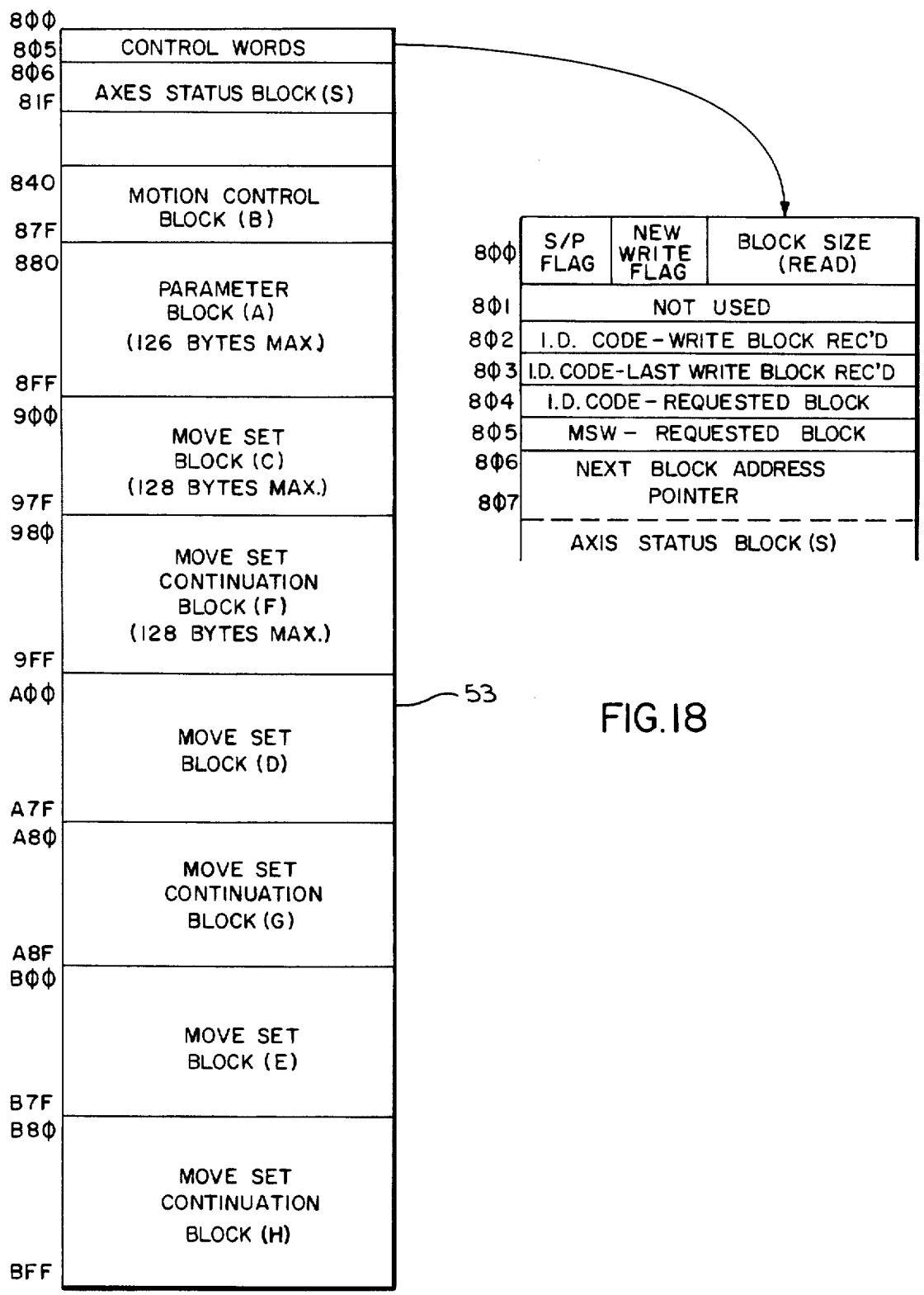
FIG. 18 is a map of a common memory for the two processors on the master positioning I/O module of FIGS. 10 and 11.

Referring to FIGS. 16–18 and keeping in mind the hardware components described in FIGS. 10 and 11, the operation of the communications processor 50 begins when power is turned on, which is represented by start block 146 in FIG. 16. As further represented by process block 147, the processor 50 then executes routines of diagnostic instructions stored in its associated firmware memory 55 to check the operation of its internal registers as well as the operation of the communications scratchpad memory 52. Next, as represented by process block 148 a 10-millisecond timer is started or restarted during the execution of a background loop. During the background loop the communications processor 50 is waiting for an interrupt from the PC processor unit 11, which initiates execution of a read or write block transfer. During the 10-millisecond timed period represented by process block 149 the processor 50 checks for a 250-millisecond communications timeout, and then executes several NOP (no operation) instructions. Decision block 150 represents the execution of an instruction to see if the 10-millisecond timer has timed out. If ten milliseconds pass without an interrupt, the communications processor will loop back to execute blocks 148 and 149. The "YES" result leading from block 150 represents the occurrence of an interrupt.

As part of the basic high density transfer disclosed in U.S. Pat. No. 4,293,924, a module status word (MSW) (actually a byte here) is received from the PC processor unit 11 and examined by the communications processor 50 in response to an interrupt to determine whether a read or write block transfer is to be executed, and the determination of the type of block transfer is represented by decision block 151. A read block transfer, executed through blocks 152–156, transfers data from the communications scratchpad memory 52 in FIG. 10 back to the PC processor unit 11. The status/position data for a read block transfer is stored as seen in FIG. 17 in one of the two status/position data storage areas, S/P BLOCK 0 and S/P BLOCK 1. Two storage areas for status position data are needed in the communications scratchpad memory 52, due to the asynchronous nature of communications in which the PC processor unit 11 is communicating with one of the S/P BLOCKS and the arithmetic processor 51 is communicating with the other.

As shown by process block 152, instructions are executed to initiate communications for a read block transfer and to assure that the communications processor 50 will not disturb any data in the common memory 53 of the master I/O positioning module 19. Before the read block transfer is completed in I/O block 152, however, the status/position data in the communications scratchpad memory 52 will be updated for remote I/O systems where a ten-millisecond timer has timed out. When the I/O system is a "remote" I/O system as opposed to a "local" I/O system, data at the I/O interface might be changing, and yet be held at the I/O interface for longer than 10 milliseconds while awaiting service from the PC processor unit 11. This is due to the longer propagation times in a remote system and the fact that blocks of data may be transmitted to many I/O modules at various remote locations. A check for the remote system is represented by decision block 153, and a check for the 10-millisecond time period is represented by decision block 154. If these conditions are presented the status/position data in the communications scratchpad memory 52 will be updated, as represented by process block 155 and this improves the response time of the controller 10.

To update status/position data as represented by process block 155 the processor 50 checks an S/P flag in line 800 (hexadecimal) of the common memory 53 (seen in FIG. 18) to determine whether fresh status/position data has been received from any of the satellite I/O modules 18. If new status/position data is detected, it is moved from the AXES STATUS BLOCKS(S)s area in FIG. 18 to one of the two status/position data storage areas, S/P BLOCK 0 and S/P BLOCK 1, seen in FIG. 17. In executing block 155, the address pointer to be returned to PC processor unit 11 is retained. Assuming that the status/position data has been updated, and the read block transfer completed through execution of I/O block 156, the communications processor 50 returns to the operations in process block 149 to restart the ten-millisecond timer and wait for another interrupt. Referring again to decision block 150 in FIG. 16, when a write block transfer, represented by I/O block 157 is executed, the various data structures discussed earlier are transferred to the master positioning I/O module 19, including the PARAMETER BLOCK (A), the MOTION CONTROL BLOCK (B), MOVE SET BLOCKS (C)–(E) and MOVE SET CONTINUATION BLOCKS (F)–(H). When these blocks are received from the PC processor unit 11, they are stored in the WRITE DATA AREAS 0 and 1 in FIG. 17. From there, these blocks are transferred to the common memory 53, to specific locations for each respective BLOCK (A)–(H) that are shown in FIG. 18. When a write transfer represented by I/O block 161 has been executed, the incoming block of data is transferred from one of the WRITE DATA AREAS 0–1 in the communications scratchpad memory 52 to one of the above-mentioned block storage areas in the common memory 53.

After a write block transfer to the scratchpad memory 52, the arithmetic processor 51 executes instructions to determine which BLOCK (A)–(H) in the common memory 53 is to be updated. The processor 51 receives requests for MOVE SET BLOCKS from the satellite I/O modules 18, and when such requests are not pending, the arithmetic processor 51 requests other appropriate data structures such as the MOTION CONTROL BLOCK (B) or the PARAMETER BLOCK (A). As shown by decision block 158a in FIG. 16, if the last block received in the communications scratchpad memory 52 does not correspond to the block being requested by the arithmetic processor 51, data is not coupled to the common memory 53, but will remain in the scratchpad memory 52 to be written over. Where the data block in the scratchpad memory 52 corresponds to the requested data block, the communications processor 50 executes further instructions represented by decision block 158b, to see if the correct number of words have been received for that block. A flag bit is then tested as shown by decision block 158c to determine whether the data received in this write block transfer has changed from the data in the previous write block transfer. The new BLOCK and the previous BLOCK are stored in WRITE DATA AREAS 0 and 1, respectively. Since the MOTION CONTROL BLOCK (B) is frequently received with unchanged data, this operation prevents the propagation of redundant data throughout the system, thereby conserving processing time for those processors downstream from the communications processor 50. Where the new block examined by the communications processor 50 has been requested by the arithmetic processor 51, and contains new data, the block is loaded into the appropriate location in the common memory 53 as represented by process block 159.

To carry out the block transfer operations seen in FIG. 16, an ID code for the block of data requested by the arithmetic processor 51 is stored at hexadecimal address C01 in the scratchpad memory 52, and module status words (MSW's) defining the block size of the received block and the requested block are stored in lines C02(hex) and C03(hex) of the scratchpad memory 52. The block ID bits for the blocks in the WRITE AREAS 0 and 1 are stored in the second byte at each block. An address pointer (A POINTER, B POINTER, etc.) for the write block requested by the arithmetic processor 51 is stored in lines 806(hex) and 807(hex) of the master common memory 53. After processing a write block transfer as seen in blocks 157–159 of FIG. 16, the communications processor 50 updates status/position data for the next read block transfer as seen in blocks 160 and 161 and then returns to execute process block 149 in the background loop routine.

Figure 21:
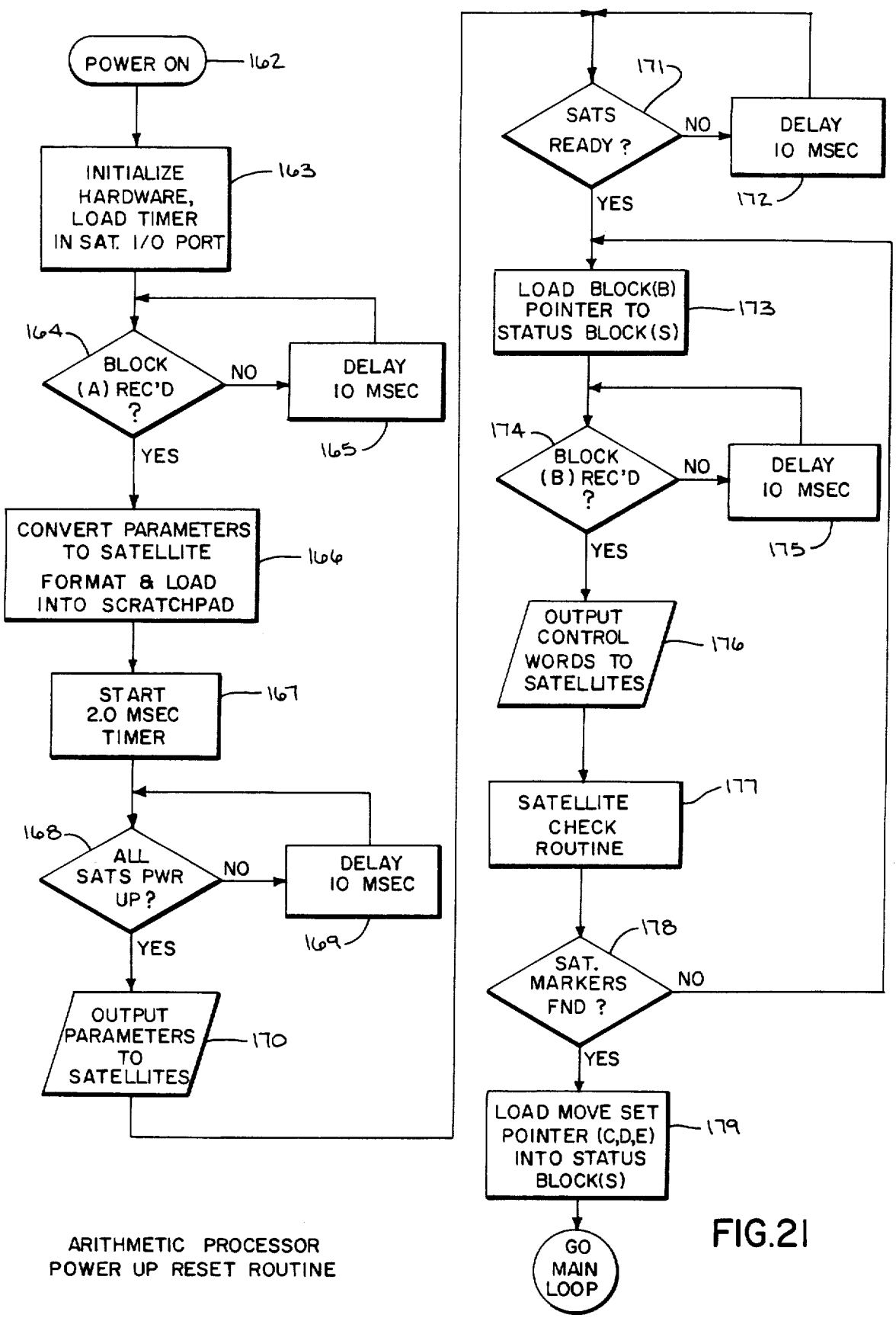
FIGS. 21-24 are flow charts illustrating the operation of the arithmetic processor seen in FIG. 11.
Figure 22:
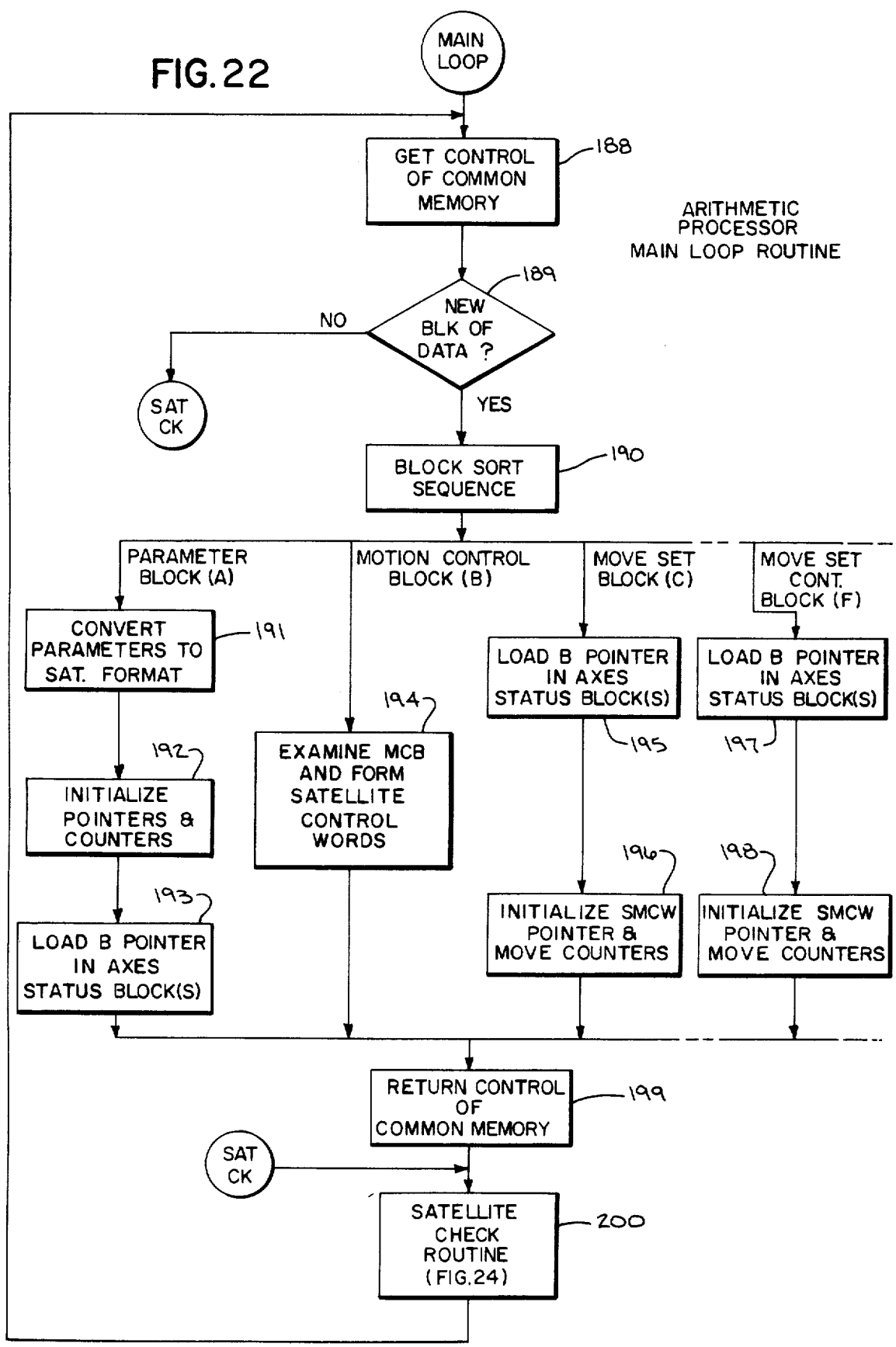
Figure 23:
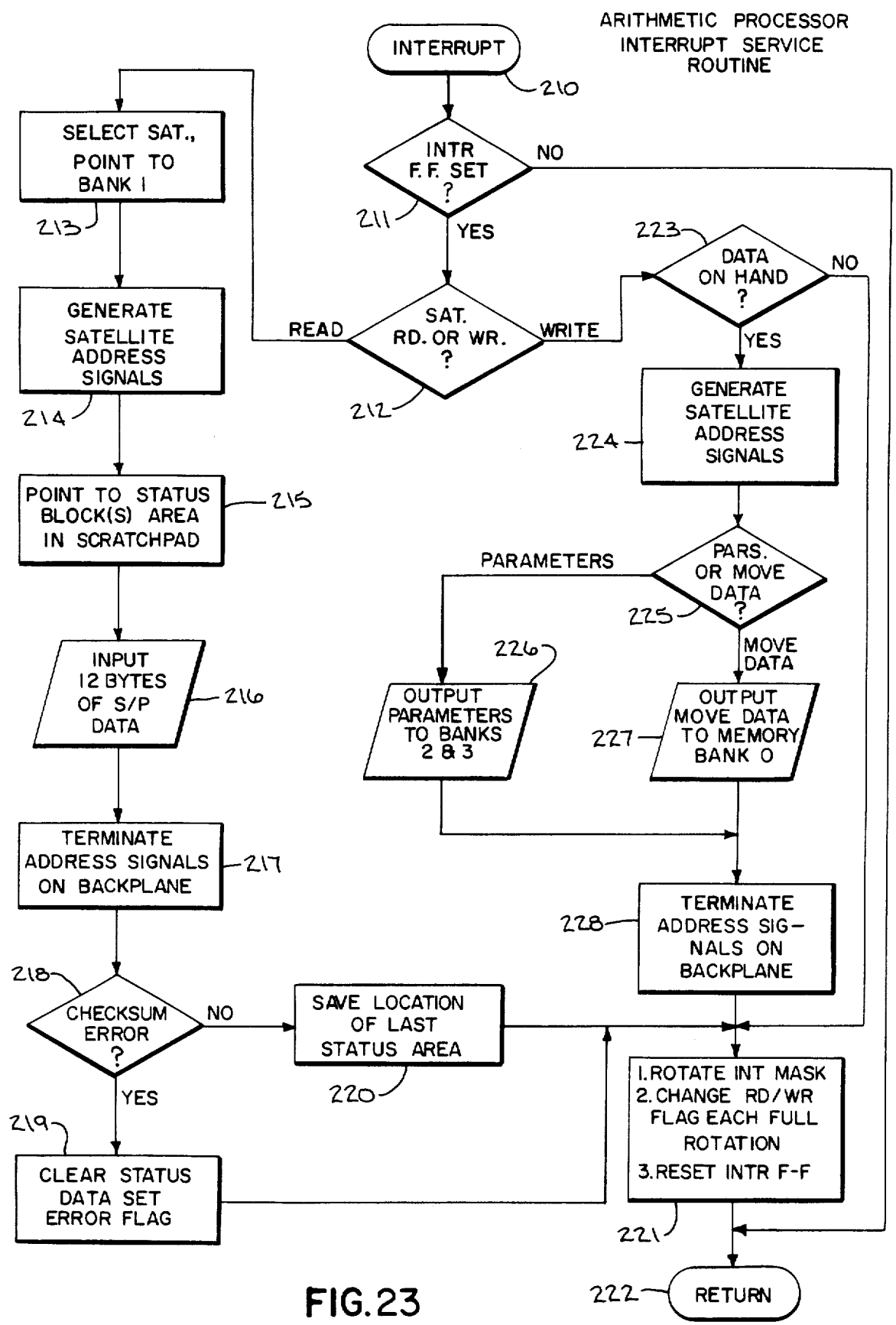

The arithmetic processor 51 of FIG. 11 executes sequences of instructions stored in its associated firmware memory 89 and represented in FIGS. 21–24. A POWER UP RESET routine in FIG. 21 is executed to start up communication between the master and satellite I/O modules 18 and 19 and to allow the satellite I/O modules 18 to digest the parameters from the PARAMETER BLOCK (A). A MAIN LOOP ROUTINE in FIG. 22 couples data between the common memory 53 (mapped in FIG. 18) and the arithmetic scratchpad memory 90 (mapped in FIG. 19) and also performs conversion of binary-coded decimal (BCD) data to pure binary data and vice versa. The data in the common memory 53 is in the user format discussed earlier relative to FIGS. 2a and 2b. This format uses an octal numbering system, but user data is actually coded for transmission as four-bit BCD data with the BCD codes for numbers "8" and "9" not being used. Parameter and move data in BCD format are coupled to the arithmetic scratchpad memory 90 and coverted to binary format for transmission to the satellite I/O modules 18. Through the execution each 2.0 milliseconds of an INTERRUPT SERVICE ROUTINE, which is represented in FIG. 23, the arithmetic processor 51 sends parameter, motion control and move data to the satellites 18 and receives status and position data. The binary-coded parameter and move data are coupled to the master-satellite common memory 112 (mapped in FIG. 20).

Figure 19:
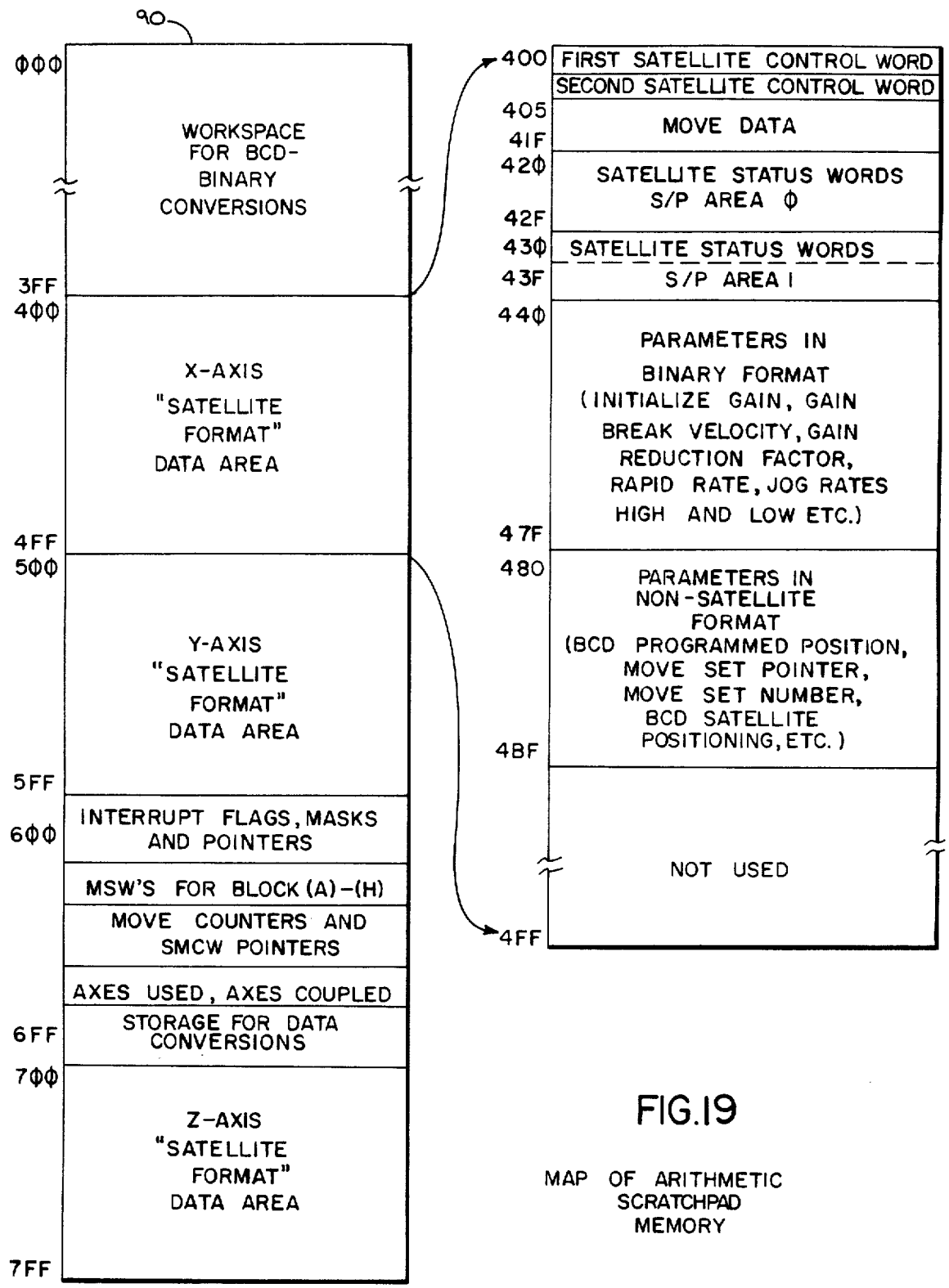
FIG. 19 is a map of a scratchpad memory in FIG. 11 that is associated with an arithmetic processor.

Referring to FIG. 18, the MOTION CONTROL BLOCK (B) at address 840(hex) in the common memory 53 contains MOTION COMMAND WORDS for up to three independent axes (see Table 3). The signals in these MOTION COMMAND WORDS are used to form SATELLITE CONTROL WORDS for each satellite I/O module 18. The two 16-bit SATELLITE CONTROL WORDS for the X-AXIS module 18 are stored in an X-AXIS "SATELLITE FORMAT" DATA AREA beginning at address 400(hex) in the arithmetic scratchpad memory 90 (FIG. 19). The Y-AXIS SATELLITE CONTROL WORDS are stored in a Y-AXIS "SATELLITE FORMAT" DATA AREA beginning with address 500(hex) and Z-AXIS control words are stored in a corresponding area beginning at the 700(hex) address. All of the memories used on the module 19 are eight bits wide so each line in the scratchpad memory 90 stores a byte, and two SATELLITE CONTROL WORDS occupy four lines. The SATELLITE CONTROL WORDS are organized as seen in Tables 12 and 13 below. These should be compared with the MOTION COMMAND WORDS of Tables 4 and 5.

TABLE 12

DESCRIPTION OF FIRST SATELLITE CONTROL WORD

| Bit | Function |
|---|---|
| 17 | Full/Empty |
| 16 | Move Data |
| 15 | Program Rate/Rapid Rate |
| 14 | Feedrate Override |
| 13 | Run/Halt Mode Select |
| 12 | Unused |
| 11 | Dwell |
| 10 | Escape Move |
| 7 | Program/Manual* |
| 6 | Emergency Stop (E-Stop) |
| 5 | Slide Stop |
| 4 | Escape/Go Home* |
| 3 | EOM Stop/Search Home* |
| 2 | Begin/Preset* |
| 1 | Go/Jog Reverse* |
| 0 | Load Next Move/Jog Forward* |

*Denotes active in manual mode

TABLE 13

DESCRIPTION OF SECOND SATELLITE CONTROL WORD

| Bit | Function |
|---|---|
| 17 | |
| 10–16 | Feedrate Multiplier |
| 7 | Jog Rate Select |
| 6 | Direction Search Home |
| 5 | Tach Calibrate* |
| 4 | Return to Position* |
| 3 | Initialize Home Position* |
| 2 | Parameter Block* |
| 1 | ± Limit Override |
| 0 | Reset* |

*Denotes active in manual mode

Referring again to FIG. 18, the AXES STATUS BLOCK(S) is seen above the MOTION CONTROL BLOCK (B) and is stored at addresses 806–81F(hex). The AXIS STATUS WORDS (described in Tables 9–10) are updated by the arithmetic processor 51, by examining TWO SATELLITE STATUS WORDS in its scratchpad memory 90. The FIRST SATELLITE STATUS WORD seen in Table 14 corresponds to the FIRST AXIS STATUS WORD, and is coupled from the AXIS "SATELLITE FORMAT" DATA AREAS seen in FIG. 19 to the AXES STATUS BLOCK(S) in FIG. 18. The AXIS "SATELLITE FORMAT" DATA AREAS include status position data areas, S/P AREA 0 and S/P AREA 1, to asynchronously receive SATELLITE CONTROL WORDS from the satellite 18 while making them available to the arithmetic processor 51. The SECOND SATELLITE STATUS WORD seen in Table 15 below provides local inputs from the satellite to the arithmetic processor 51 and consequently it does not correspond to the SECOND AXIS STATUS WORD.

TABLE 14

DESCRIPTION OF FIRST SATELLITE STATUS WORD

| Bit | Function |
|---|---|
| 17 | Excess Error |
| 16 | Loss of Feedback |
| 15 | Insufficient Data |
| 14 | Travel Limit + |
| 13 | Travel Limit − |
| 12 | Feedrate Reduction Request |
| 11 | Hardware Stop |
| 10 | Emergency Stop (E-Stop) |
| 7 | Program/Manual Mode |
| 6 | At Home |
| 5 | Input No. 2 (JOG REVERSE) |

TABLE 14-continued
DESCRIPTION OF FIRST SATELLITE STATUS WORD

| Bit | Function |
|---|---|
| 4 | Slide Stop |
| 3 | Input No. 1 (JOG FORWARD) |
| 2 | Ready |
| 1 | Done |
| 0 | In Position |

TABLE 15
DESCRIPTION OF SECOND SATELLITE STATUS WORD

| Bit | Function |
|---|---|
| 17–10 | Move Number |
| 7 | Not Used |
| 6 | Not Used |
| 5 | Marker Found |
| 4 | Send Next Move |
| 3 | Parameter Error |
| 2 | Move Data Error |
| 1 | Control Word Error |
| 0 | Power Up |

Referring again to FIG. 18, the PARAMETER BLOCK (A) is stored at addresses 880–8FF(hex), which are seen just below the MOTION CONTROL BLOCK (B). The arithmetic processor 51 converts these parameters to binary format and stores them in the AXIS "SATELLITE FORMAT" DATA AREAS seen in FIG. 19. As seen in the expanded portion of FIG. 19, the parameter areas in the "SATELLITE FORMAT" DATA AREAS also include an area for non-satellite format parameters that are used by the arithmetic processor 51 during its processing operations. Only the satellite format parameters are transferred to the satellite I/O modules 18.

MOVE SET BLOCKS (C)–(E) and MOVE SET CONTINUATION BLOCKS (F)–(H) are stored in areas seen below the PARAMETER BLOCK (A) in FIG. 18. Move data is selected a move at a time, converted to binary format by the arithmetic processor 51 and stored in the MOVE DATA storage area in one or more of the AXIS "SATELLITE FORMAT" DATA AREAS depending on the mode of axis coupling. The storage area for the SATELLITE CONTROL WORDS for each axis is seen just above the MOVE DATA storage area.

In coupling data between the common memory 53 and the scratchpad memory 90, the arithmetic processor 51 utilizes several control bytes seen in FIG. 18. The control bytes at addresses 802–805 of the common memory are as follows. The byte at 802 includes a 3-bit BLOCK ID number which identifies the type of incoming BLOCK (A)–(H) just transferred by the communications processor 50. The byte at 803 contains the ID number for the previous BLOCK (A)–(H) transferred to the common memory 53 by the communications processor 50. The byte at 804 contains an ID number for the type of BLOCK (A)–(H) being requested by the satellite I/O modules 18 and the byte at 805 contains the block transfer module status word (MSW), which is a byte defining the direction of block transfer and the block size.

Referring to FIG. 20, the master-satellite common memory 112 on each satellite I/O module 18 has four banks, BANK 0-BANK 3, and these correspond to the areas within its corresponding AXIS "SATELLITE FORMAT" DATA AREA in the scratchpad memory 90 as seen in FIG. 19. Data is transferred from the CONTROL WORD and MOVE DATA storage areas at 400(hex) to BANK 0 of the master-satellite common memory 112. Data is returned from BANK 1 of the X-AXIS satellite I/O module 18 to one of the S/P AREAS 0 or 1 beginning at address 420(hex) in FIG. 19. The satellite format parameters at address 440(hex) are subdivided into two groups and transferred to BANKS 2 and 3 in FIG. 20.

Besides the AXIS "SATELLITE FORMAT" DATA AREAS at 400(hex), 500(hex) and 700(hex) the arithmetic scratchpad memory 90 in FIG. 19 also has miscellaneous storage areas at 600(hex)–6FF(hex). These include an area for storage of MSW's for the BLOCK (A)–(H), and an area for MOVE COUNTERS AND SMCW POINTERS. The latter are used for processing individual moves as they are selected from the common memory 53, loaded into the AXIS "SATELLITE FORMAT" DATA AREAS in the scratchpad memory 90, and then transferred to the satellite I/O modules 18. An axis storage area maintains a reference to the number of axes being used and the mode of axis coupling. And, a STORAGE FOR DATA CONVERSIONS area is used for storing data immediately after it has been converted from BCD to binary or vice versa. This background of the memory organization shows the source and destination for data that is transferred during execution of the sequences of instructions stored in its firmware memory 89, which will now be described with reference to the flow charts in FIGS. 21–24.

Referring to FIG. 21, after power on, represented by start block 162, the arithmetic processor 51 checks the functioning of the common memory 53 and its scratchpad memory 90 and initializes the 2.0 millisecond timer in the satellite I/O port 86 (FIG. 11), as represented by process block 163. The processor 51 then examines the NEW WRITE flag in line 800(hex) of the common memory 53 to see whether a new block of write data has been received in the common memory 53, and if so, it checks the ID bits for this block in line 802 to see whether PARAMETER BLOCK (A) has been received, these decisions being represented by decision block 164. Where the PARAMETER BLOCK (A) has not been received, the processor 51 uses the timer in the satellite I/O port 86 to execute a 10-millisecond delay routine represented by process block 165, and loops back to decision block 164.

When the PARAMETER BLOCK (A) has been received in the storage area beginning at 880(hex) in FIG. 18, the processor 51 converts the parameters to binary format and stores them in the binary format parameter area within the applicable AXIS "SATELLITE FORMAT" DATA AREAS as represented by process block 166. The 2.0 millisecond timer is then started, as represented by process block 167, and when it times out an interrupt signal will be coupled to the processor 51 through the INTR line (FIG. 11) and the INTERRUPT SERVICE ROUTINE in FIG. 23 will be executed. After starting the timer, the processor 51 checks to see whether the satellite I/O modules 18 have completed a power-up sequence as shown by decision block 168. The processor 51 remains in a delay loop through process block 169 until all of the satellites 18 signal they are ready for execution of the next block of instructions. I/O block 170 represents an interrupt sequence in which the processor 51 transfers the parameters to the satellite I/O modules 18 by executing the routine of FIG. 23.

The successful transfer and digestion of the PARAMETER BLOCK (A) is checked as shown in decision block 171 by testing the satellite READY flag that returned in the FIRST SATELLITE STATUS WORD from each satellite I/O module 18. The READY flag is eventually reflected back to the PC processor unit 11. While waiting for this confirmation, the processor 51 calls and executes the 10-millisecond delay routine represented by block 172, in the manner of blocks 165 and 169. As seen in process block 173, when the satellite READY flags are detected, the arithmetic processor 51 loads the B POINTER into locations 806 and 807(hex), where a BLOCK POINTER is stored for return to the PC processor unit 11 in the AXES STATUS BLOCK(S). The arithmetic processor 51 then waits for the MOTION CONTROL BLOCK (B) to be received, by repeatedly checking the ID bits stored at location 802(hex) in FIG. 18 as represented by decision block 174. A 10-millisecond delay routine represented by process block 175 is executed when the MOTION CONTROL BLOCK (B) is not detected. BLOCK (B) is processed to form the FIRST AND SECOND SATELLITE CONTROL WORDS described in Tables 12 and 13. As represented by I/O block 176, the processor 51 then sends these CONTROL WORDS to the master-satellite common memory 112 on each satellite I/O module 18. The processor 51 then executes a shortened version of a SATELLITE CHECK routine represented by process block 177 and shown in more detail in FIG. 24.

Figure 24:
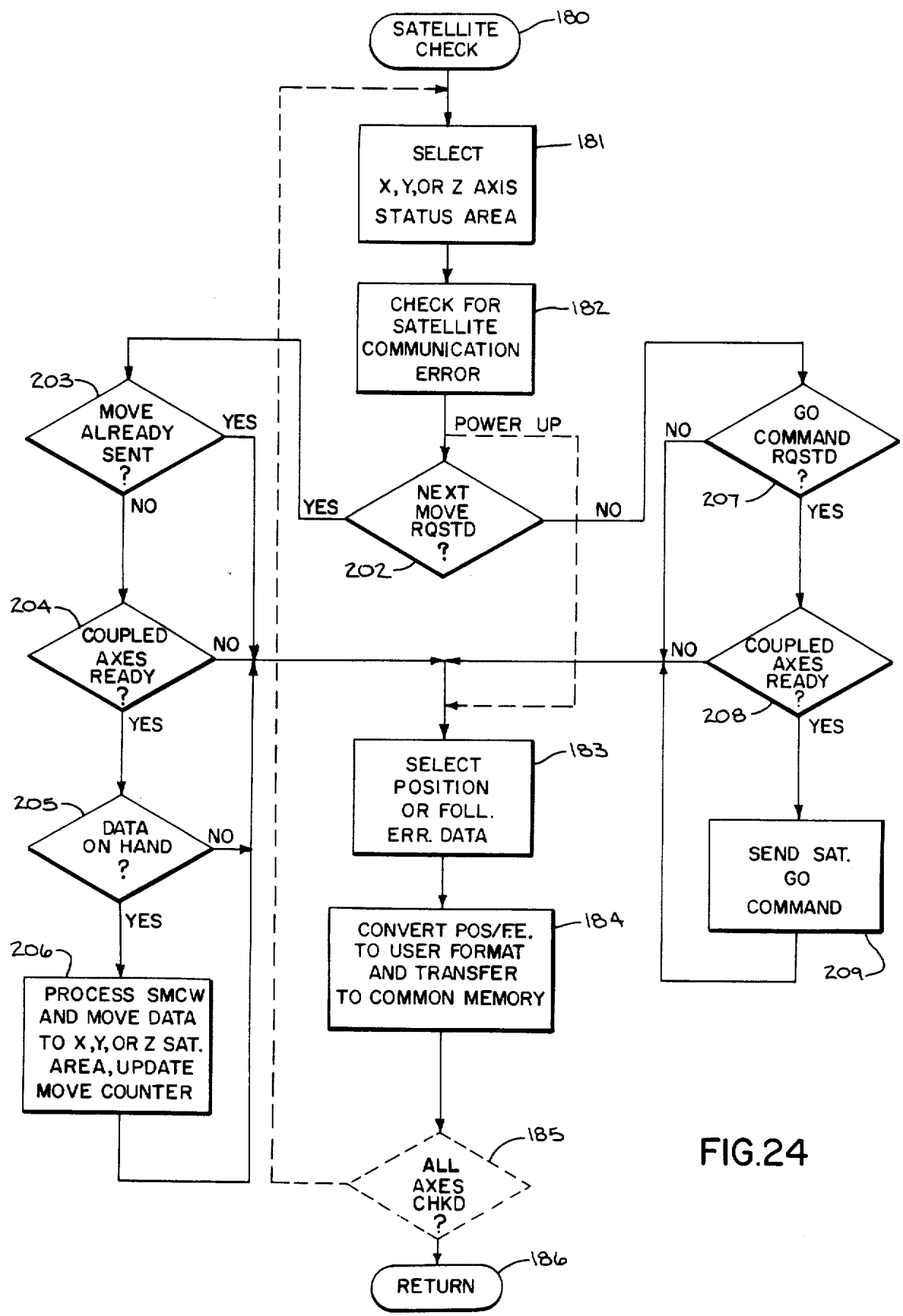

Referring to FIG. 24, the SATELLITE CHECK routine is executed by the arithmetic processor 51 to update the status/position feedback data in the AXES STATUS BLOCK(S) area in the master I/O module common memory 53. The processor 51 first points to an area within BLOCK(S) where status/position data is stored for a particular axis, as represented by process block 181. Then a check is made that no satellite communication error has occurred on initial transmission as represented by process block 182. Next, there is a determination whether feedback is to be reported as an absolute position or as following error (the result of subtracting actual position from comanded position), and this is represented by process block 183. The feedback data, which has been received in the AXIS "SATELLITE FORMAT" DATA AREAS in FIG. 19 is then converted from binary to BCD format and stored in the AXES STATUS BLOCK(S) AREA in FIG. 18, as represented by process block 184. Then, for the version of the SATELLITE CHECK routine executed during power up or reset conditions, the routine is repeated until all axes have been serviced, as represented by decision block 185 (in phantom). When all axes have been serviced, the processor 51 returns from the SATELLITE CHECK routine, as represented by return blocks 186, to block 178 in FIG. 21. Next, in FIG. 21, the arithmetic processor 51 checks bit 5 of the SECOND SATELLITE STATUS WORD for each satellite I/O module 18 to determine whether markers have been found for the encoders of all the axes. When this marker is found, it provides a position reference to count revolutions and increments of the encoder shaft. The satellite I/O module 18 is then ready to receive move data, and instructions represented by process block 179 are executed to load one of the MOVE SET POINTERS (C)-(H) to the AXES STATUS BLOCK(S) area in FIG. 18, to be returned to as the PC processor unit 11. After completing this POWER UP RESET routine, the arithmetic processor 51 enters a MAIN LOOP sequence seen in FIG. 22.

Referring to FIG. 22, the MAIN LOOP routine begins with the arithmetic processor 51 executing a sequence of instructions to obtain control of the common memory 53, as represented by process block 188. The data at location 800(hex) is examined for the NEW WRITE FLAG as represented by decision block 189. When this flag is set, a new block of data has been loaded into the common memory 53 by the communications processor 50 and is ready for processing by the arithmetic processor 51. The arithmetic processor 51 executes a BLOCK SORT sequence represented by process block 190 to determine which of the BLOCKS (A)-(H) has been received. Assuming that PARAMETER BLOCK (A) has been received, instructions represented by process block 191 are executed to convert the parameters for each axis to a binary format and to load these parameters into the AXIS "SATELLITE FORMAT" DATA AREAS in FIG. 19. As represented by process block 192 pointers and counters are then initialized in preparation for transfer of the parameters to BANKS 2 and 3 of the master-satellite common memory 112 seen in FIG. 20. As represented by process block 193 the B POINTER is then loaded into the AXES STATUS BLOCK(S) AREA in FIG. 18 to be returned to the PC processor unit 11.

Referring to process block 194, if a MOTION CONTROL BLOCK (B) is detected during the BLOCK SORT sequence 190, the MOTION COMMAND WORDS in Tables 4 and 5 are used to form the SATELLITE CONTROL WORDS described in Tables 11 and 12. Where one of the MOVE SET BLOCKS (C)-(E) is detected during the block sort sequence, the B POINTER is loaded in the AXIS STATUS BLOCK(S) storage area in the common memory 53 as represented by process block 195. Next, as shown by process block 196, a single move control word (SMCW) pointer and a MOVE COUNTER are initialized in preparation for transfer of data for a single move from one of the MOVE SET BLOCK areas in the common memory 53 to one of the AXIS "SATELLITE FORMAT" DATA AREAS in the scratchpad memory 90. Similar operations are carried out for MOVE SET CONTINUATION BLOCKS (F)-(H) as represented by process blocks 197 and 198.

After one of the BLOCKS (A)-(H) has been processed, the arithmetic processor 51 returns control of the common memory to the communications processor as represented by process block 199. The arithmetic processor 51 then executes the more extensive version of the SATELLITE CHECK ROUTINE of FIG. 24 as represented by process block 200 in FIG. 22. The SATELLITE CHECK routine is also executed where a block of data is not detected by executing the instructions represented by decision block 189.

In executing the long version of the SATELLITE CHECK routine, the arithmetic processor 51 also updates the status/feedback position data by executing blocks 181-185, which were described previously for the POWER UP RESET routine. In the MAIN LOOP sequence, however, the arithmetic processor 51 also determines whether one of the satellite I/O modules 18 has requested that move data be sent to it, this request being detected in the SEND NEXT MOVE bit of the SECOND SATELLITE STATUS WORD of Table 14. The examination of this bit is represented by decision block 202 in FIG. 24. When the next move has been requested, a SEND NEXT MOVE ACKNOWLEDGE flag, which is stored with the MODULE STATUS WORDS (MSW'S) in FIG. 19, is checked to see whether the move data has already been sent, and this test is represented by decision block 203. Assuming move data has been requested, but has not been sent, the SEND NEXT MOVE bits for all coupled axes must all be detected before data can be transferred to the satellite I/O modules 18 operating in the coupled mode, and this decision is represented by decision block 204. As represented by decision block 205, a WRITE DATA FOR SATELLITE X POINTER in line 604(hex) in FIG. 19 is checked to see if data is on hand for the axis requesting a new move. Where the data is on hand, the single move control word (SMCW) for the move data is processed and the move data is loaded in binary format into the X, Y or Z-AXIS "SATELLITE FORMAT" DATA AREAS in FIG. 19. After processing the move data or deciding it cannot be processed in blocks 203-206, the arithmetic processor 51 completes updating the status/position data by executing process blocks 183 and 184 prior to returning to the main loop for execution of process block 188.

Referring again to decision block 202 in FIG. 24, if a next move has not been requested, instructions are executed to determine whether a GO command for initiating motion along one or more axes has been requested and this is represented by decision block 207. Analogous to the processing of move data, there is a check to see if all the coupled axes are ready as represented by decision block 208. When this result is positive, the GO command is formulated and sent to the satellite modules 18 as represented by process block 209. The SATELLITE CHECK routine then concludes with the updating of the position feedback data in process blocks 183 and 184.

The routines discussed this far are executed to transfer data between the common memory 53 and the arithmetic scratchpad memory 90. To couple data between the arithmetic scratchpad memory 90 and the master-satellite common memory 112 seen in FIGS. 12 and 20, the INTERRUPT SERVICE ROUTINE seen in FIG. 23 is executed every 2.0 milliseconds. The interrupt is represented by start block 210 in FIG. 23. The satellite I/O port 86 includes an interrupt flip-flop which is set and which is checked, when an interrupt occurs, as represented by decision block 211. If the flip-flop is not set, the processor 51 returns from the interrupt through return block 222. If the satellite I/O port flip-flop is set, an interrupt control word at location 600(hex) in the arithmetic scratchpad memory 90 is examined to see whether the transfer is to be a write transfer to a satellite I/O module 18 or read transfer from a satellite I/O module 18. This is represented by decision block 212. After all of the satellite I/O modules 18 have been written to, or read from, a read/write flag is complemented to transfer data in the other direction for all of the satellite I/O modules 18. Assuming that data is first read from the satellite I/O modules 18, the processor 51 points to BANK 1 of the master-satellite common memory on the satellite I/O module 18 determined by an interrupt mask stored in the INTERRUPT FLAGS AND POINTERS area in FIG. 19. This is represented by process block 213. A bit in this mask is rotated to sequentially point to the X, Y and Z AXIS I/O modules 18. Address signals, including a signal on the ASTB line in FIG. 12, are generated through the secondary backplane bus 41 to the selected satellite I/O module 18 as represented by process block 214. As represented by process block 215 the processor 51 next points to the S/P AREA 0 or 1 in the AXIS "SATELLITE FORMAT" DATA AREA in the corresponding satellite I/O module 18. Then, as represented by I/O block 216, twelve bytes of status/position/following error data are coupled from the satellite I/O module 18 to this area. The address signals on the secondary backplane are then terminated as represented by process block 217. A check is then made for a checksum error as represented by decision block 218. When an error occurs the status/position/following error data is cleared from its S/P AREA as represented by process block 219, otherwise, the location of the S/P AREA 0 or 1 is saved so that the alternate area can be used on the next transfer from the satellite I/O module 18. This operation is represented by process block 220. The interrupt sequence is terminated through process block 221 in which the interrupt mask is rotated to point to the next satellite I/O module 18, the read/write flag is complemented if all of the satellite I/O modules 18 have been serviced for input or output, and a flip-flop in the satellite I/O port 86 is reset. The routine is then exited through return block 222 to return to the MAIN LOOP routine in FIG. 22.

When a block of data is to be written to one of the satellite I/O modules 18, as a result of executing decision block 212 in FIG. 23, a test instruction is executed to determine if new data is on hand, as represented by decision block 223. If so, address signals are generated on the backplane, to a satellite selected through examination of the interrupt mask, and this is represented by process block 224. Decision block 225 represents the execution of instructions to determine whether new data has been received in a PARAMETER BLOCK (A) or in one of the MOVE SET BLOCKS (C)-(H). Where the PARAMETER BLOCK (A) is detected through the execution of block 225, a data transfer is made to BANKS 2 and 3 in the master-satellite common memory 112 as represented by I/O block 226. Move data on the other hand is transferred to BANK 0 as shown by I/O block 227. Address signals on the secondary backplane bus 41 are then terminated as shown by process block 228. Block 221 is again executed to rotate the interrupt mask and complement the read/write flag, if necessary, before exiting the routine. This completes the description of the INTERRUPT SERVICE ROUTINE, the last of the major sequences to be described for the arithmetic processor 51.

6. Operation of the Axis Processors on the Satellite I/O Modules

The satellite I/O modules 18 seen in FIG. 3 drive the axis servo motors 42 in response to the satellite-formatted move data that is received from the master positioning I/O module 19. The axis processor 100 (FIG. 12) on each satellite 18 breaks each move into increments and generates a digital velocity signal to its servo motor 42 each 2.0 milliseconds to move one increment. The digital signal is converted to an analog signal before actually being applied to the servo motor 42. Master-satellite communications and servo I/O functions are directed by machine instructions organized in an interrupt routine, which is executed in an interrupt interval of 2.0 milliseconds. The axis processor 100 receives an interrupt signal every 2.0 milliseconds on the AX INTR line in FIG. 12, which is coupled through logic circuit 103 and AX CLK line to the satellite I/O port 86 in FIG. 11.

Upon power up, represented by start block 229 in FIG. 26 the axis processor 100 executes a RESET routine, represented by process block 230, with interrupt terminals disabled, to check the operation of the memories on the satellite I/O module 18. The feedback counters 125 are cleared and their value is saved in a FEEDBACK SAVE area listed in Table 17 below. After these operations, the internal interrupt circuitry within in the axis processor 100 is enabled, and an interrupt vector is set up. On the first interrupt signal, the axis processor 100 will jump to a power up loop beginning with process block 231 in FIG. 26.

Generally, the operations provided by execution of the power up loop are as follows. The axis processor 100 will continue to execute instructions in this loop until the first marker is detected. While waiting for this event the axis processor 100 will look for new parameters to be processed for operation of its satellite I/O module 18 and will set a READY flag upon digestion of the new parameters, as discussed in connection with the master positioning I/O module 19. The axis processor 100 also searches for the home position, which can be determined by the location of a home limit switch, or by a position programmed by the user in the PARAMETER BLOCK (A). When a home limit switch is used, the first marker will be considered to be the first marker detected after the home limit switch is found. After processing any new parameters and any manual mode command signals the axis processor 100 creeps at a low rate in response to a hardware or programmed jog command and looks for the first marker on the shaft encoder 43. When the first marker is found any manual mode command will then be executed at its original selected rate, if that rate is higher than the creep rate.

Figure 25:
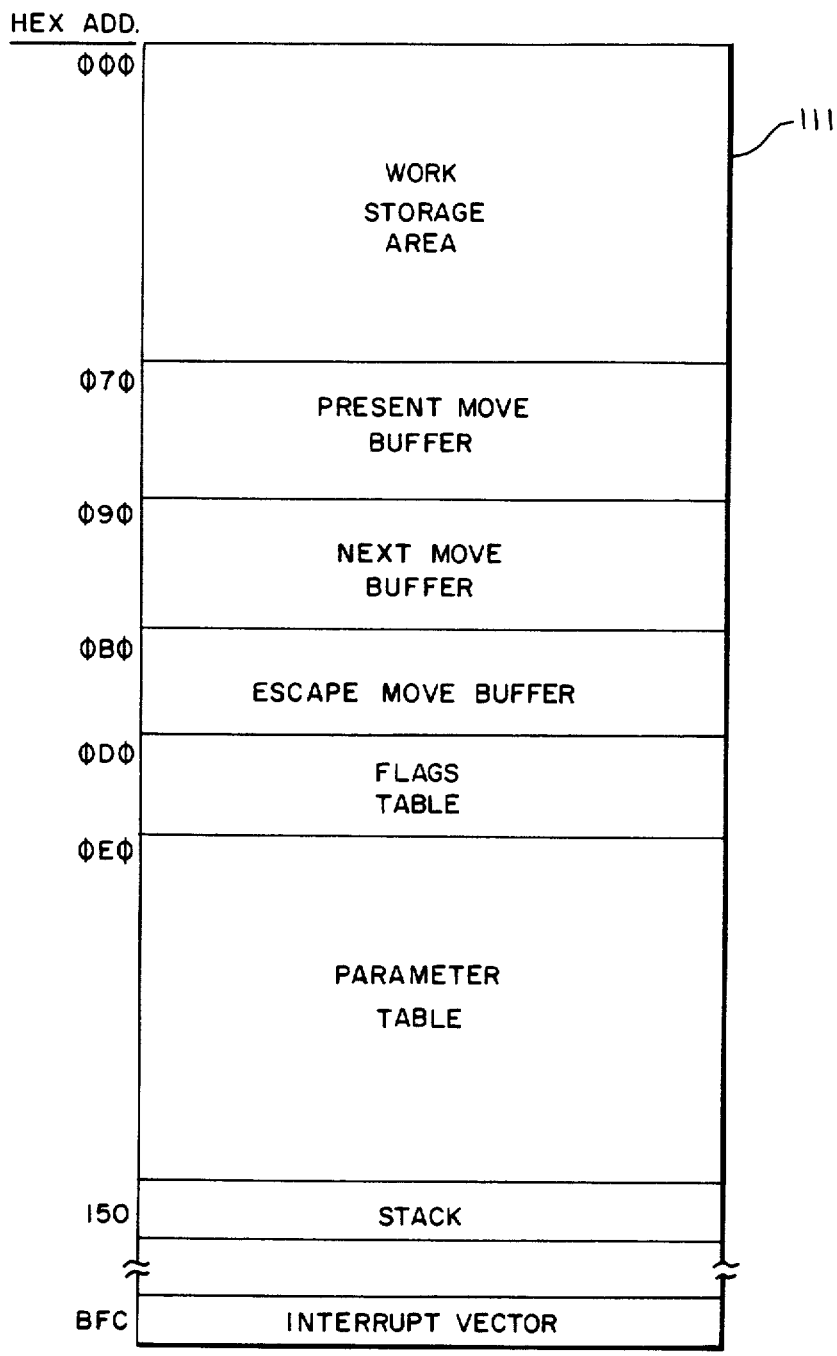
FIG. 25 is a map of an axis scratchpad memory seen in FIG. 12.

The more detailed description of these operations is as follows. Referring to process block 231 in FIG. 26, the axis processor 100 in FIG. 12 executes instructions from its firmware memory 105 to read the SATELLITE CONTROL WORDS and to verify them by examining a CONTROL WORD CHECKSUM. The location of this checksum is shown in the map of the common memory 112 in FIG. 20. The processor 100 next checks a bit in the FIRST SATELLITE CONTROL WORD (FIG. 20) to see if new control information is present in those CONTROL WORDS. During power up this means that new data, such as parameter data or a manual mode command to drive the axis slide to the home position, has probably been received in the mastersatellite common memory 112. Therefore, the processor 100 next examines another bit in the FIRST SATELLITE CONTROL WORD to see whether a manual mode command is present, and this is represented by decision block 233. The axis processor 100 also checks for new parameter data as represented by decision block 234. If a new parameter from the PARAMETER BLOCK (A) is detected, the parameters are transferred to the PARAMETER TABLE seen in FIG. 25 and defined in Table 16 below. It will be noticed that Table 16, corresponds to lines 7-25 in Table 1, which defined the parameter for one axis in PARAMETER BLOCK (A).

TABLE 16

DESCRIPTION OF PARAMETER TABLE
IN THE AXIS SCRATCHPAD MEMORY

| Location(s) | Parameter |
|---|---|
| 00E0-00E1 | COUNTS/REVOLUTION |
| 00E2-00E3 | INITIAL GAIN |
| 00E4-00E7 | GAIN BREAK VELOCITY |
| 00E8-00E9 | IN POSITION BAND |
| 00EA-00EB | GAIN REDUCTION FACTOR |
| 00EC-00EF | RAPID RATE |
| 00F0-00F3 | JOG HIGH |
| 00F4-00F7 | JOG LOW |
| 00R8-00F9 | +D/A VOLTAGE |
| 00FA-00FB | −D/A VOLTAGE |
| 00FC-00FD | % EXCESS ERROR |
| 00FE-0101 | HOME POSITION |
| 0102-0105 | JOG ACCEL/DECEL |
| 0106-0109 | VELOCITY STEP |
| 010A-010D | +TRAVEL LIMIT |
| 010E-0111 | −TRAVEL LIMIT |
| 0112-0115 | BACKLASH TAKE-UP |
| 0116-011D | TACH PARAMETERS |

Besides these user-defined parameters, the satellite I/O module 18 uses certain computed parameters. From the parameters INITIAL GAIN, GAIN BREAK VELOCITY, RAPID RATE, GAIN REDUCTION FACTOR, EXCESS ERROR FACTOR, +D/A VOLTAGE and −D/A VOLTAGE, other satellite operating parameters are calculated as follows:

| | | |
|---|---|---|
| (1) | $\text{FOLL.ERROR}_{GBP} =$ (16-bit word) | GAIN BREAK VELOCITY/INITIAL GAIN |
| (2) | REDUCED GAIN = (16-bit word) | (INITIAL GAIN)(GAIN REDUCTION FACTOR) |
| (3) | MAX.FOLL.ERR. = (32-bit word) | $\dfrac{\text{RAPID RATE-GAIN BREAK VELOCITY}}{\text{REDUCED GAIN}} + \text{FOLL.ERROR}_{GBP}$ |
| (4) | EXCESS FOLL.ERROR = (32-bit word) | (MAX.FOLL.ERR.)(EXCESS ERROR FACTOR) + MAX.FOLL.ERROR |
| (5) | FEEDRATE SUPPRESSION PT. = (32-bit word) | (MAX.FOLL.ERR.)(6.25%) + MAX.FOLL.ERROR |
| (6) | PSCON,NSCON* = | 2047 (± D/A VOLTAGE) (16-bit words) |
| (7) | SCON = (16-bit word) | (RAPID RATE/INITIAL GAIN) × 1,000 |

*POSITIVE AND NEGATIVE VALUES

FIG. 4 illustrates both user-defined parameters, such as INITIAL GAIN and GAIN BREAK VELOCITY, and the computed parameters such as FOLLOWING ERROR at the GAIN BREAK POINT, REDUCED GAIN and MAXIMUM FOLLOWING ERROR. The computed parameters are not stored in the PARAMETER TABLE, but in a WORKING STORAGE AREA in FIG. 25, which also stores other results calculated during positioning control operations. The WORKING STORAGE AREA is more particularly defined in Table 17 below.

TABLE 17
DESCRIPTION OF WORKING STORAGE AREA

| Location(s) | Operating Parameter |
|---|---|
| 000C-000F | MANUAL POSITION (MAN POS) |
| 0010-0013 | COMMAND POSITION (CPOS) |
| 0014-0017 | MAXIMUM FOLLOWING ERROR (MAXFERR) |
| 0018-0019 | POS. D/A SCALE FACTOR (PSCON) |
| 001A-001B | NEG. D/A SCALE FACTOR (NSCON) |
| 001C-001D | OUTPUT SCALE FACTOR (SCON) |
| 001E-001F | FOLLOWING ERROR AT GAIN BREAK POINT |
| 0020-0023 | EXCESS FOLLOWING ERROR |
| 0024-0027 | FEEDRATE SUPPRESSION POINT (SUPRPT) |
| 0028-0029 | SATELLITE CONTROL WORDS (CONTROL) |
| 0028-0031 | POINT OF DECELERATION (PT DCEL) |
| 0032-0035 | INTEGRAND (INTGRND) |
| 0036-0039 | DESIRED RATE (DRATE) |
| 003A-003D | JOG RATE |
| 003D-0041 | ACTUAL RATE (ARATE) |
| 0042-0045 | SATELLITE STATUS WORDS |
| 0046-0049 | ACTUAL POSITION (POS) |
| 004A-004D | FOLLOWING ERROR (FE) |
| 0050-0051 | ACCUMULATOR (ACCUM) |
| 0052-0053 | ADJUSTED DECELERATION RATE (DC RAMP) |
| 0054-0055 | FEEDBACK SAVE (FDBKSAV) |
| 0056-0057 | FEEDBACK INCREMENT (FDBK) |
| 0058 | SIGN |
| 0059-005A | COUNTER USED IN ADJUSTING ACCEL/DECEL (ADJ CNT) |
| 005B-0053 | FEEDRATE MULTIPLIER (FDR MULT) |
| 005D-0060 | DWELL TIMER |
| 0061 | TACH ITERATION COUNTER |
| 0062 | TACHOMETER SUM |

The transfer and calculation of parameters in the above Table is represented by process block 235 in FIG. 26. When new parameters are not detected through execution of decision block 235, the READY flag is tested by executing a conditional instruction, which is represented by decision block 236. The READY flag is set when the parameters are processed in block 235, so that in succeeding cycles through the power up loop, the axis processor 100, as well as the arithmetic processor 51 discussed earlier, will know that the parameters have been digested. Where the READY flag is set, the axis processor 100 can then check for the home limit switch. As shown by decision block 237, a SEARCH HOME command bit is examined in a FIRST SATELLITE CONTROL WORD. When this bit is set, a SEARCH HOME sequence represented by process block 238 is executed to examine a bit that is set when the home limit switch is sensed through the hardware I/O port 128 in FIG. 13. Where the home limit switch is not utilized, home position is obtained from the PARAMETER BLOCK (A). Next, the axis processor 100 looks for any programmed jog commands as represented by decision block 239. After any manual mode commands and parameters have been processed, or the home position has been initialized, the SATELLITE CONTROL WORDS are cleared from the master-satellite common memory 112, as represented by process block 240, to allow a new block of data to be received from the master positioning I/O module 19.

When the result of decision block 232 is negative, or after executing block 241, the axis processor 100 reads status data from the hardware I/O port 128 as represented by I/O block 242. The word of data read from this I/O port is defined in Table 18 below.

TABLE 18
DESCRIPTION OF STATUS WORD READ FROM HARDWARE I/O PORT

| Bit | Function |
|---|---|
| 17 | Spare |
| 16 | Tach Comparator Impact |
| 15 | First Marker |
| 14 | Successive Marker Inputs |
| 13 | Home Limit Switch |
| 12 | Jog Reverse |
| 11 | Jog Forward |
| 10 | Hardware Stop (E-Stop) |
| 7 | I/O Reset (Slide Stop) |
| 6 | Master Stop (Slide Stop) |
| 5 | Master in Common Memory |
| 4-0 | Spare |

After status data has been read through the hardware I/O port 128, the READY flag is again checked as represented by decision block 243. Where the READY flag has been set, instructions represented by decision block 244 and process block 245 are executed to set up hardware jog actions that are used in directing the servo motor 42 to creep at a low rate until the first marker is detected. Next, as represented by decision block 247, a check is made for the first marker. If the marker has not been detected by reading status data through the hardware I/O port 128 the loop is repeated by returning to process block 231. Where the first marker has been found, instructions are executed to check whether the servo is in motion, as represented by decision block 248. If the servo is in motion, the jog rate for any pending jog command is loaded in the appropriate storage areas, as represented by process block 249. The axis processor 100 is then ready to request move data, and does so by executing instructions represented by process block 250.

Figure 27A:
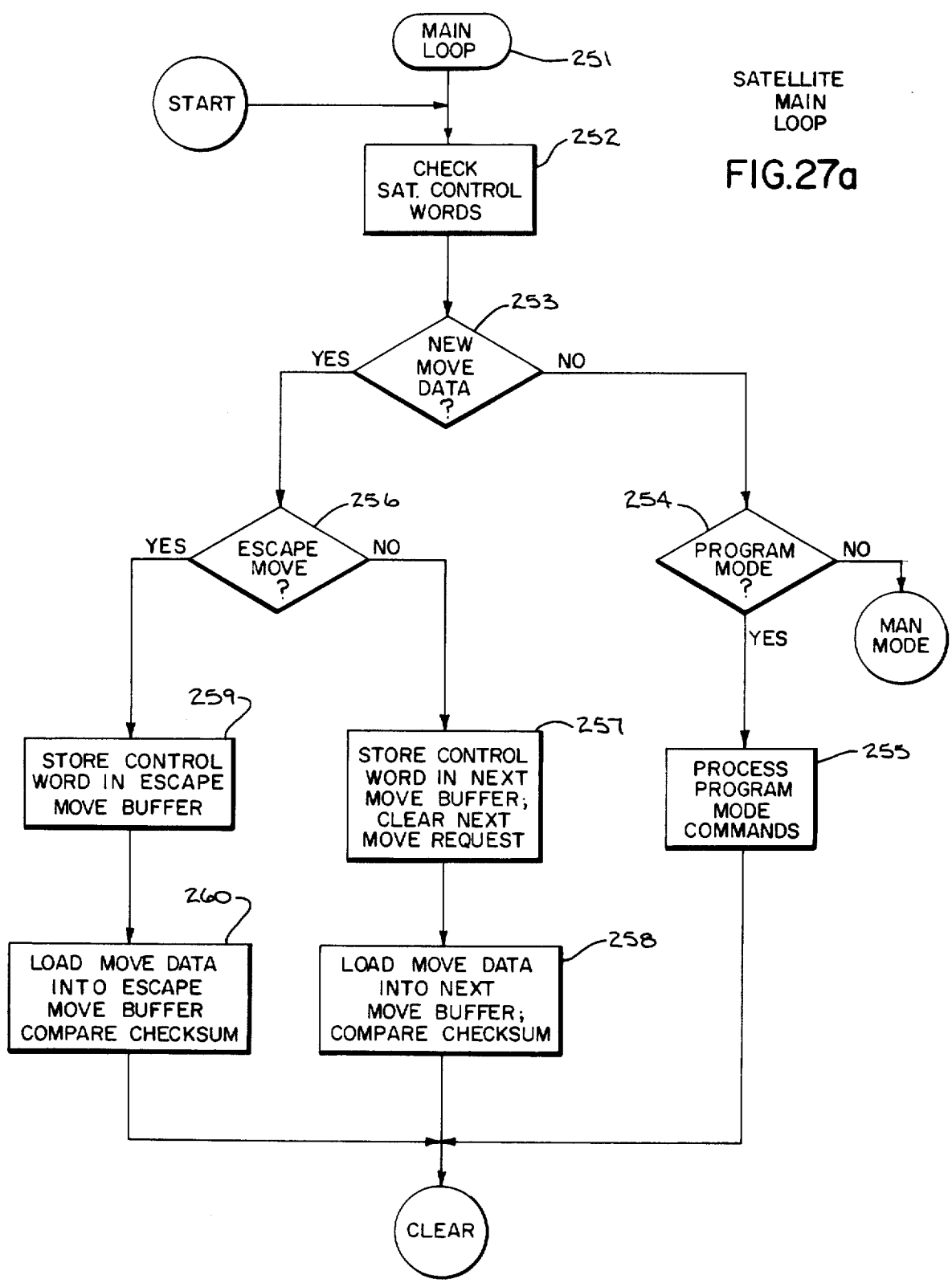

Upon completion of the POWER UP AND RESET ROUTINE the axis processor 100 begins execution of a MAIN LOOP ROUTINE that is charted in FIGS. 27a and 27b. FIG. 27a is generally related to programmed moves, while FIG. 27b is generally related to processing manual mode commands and new parameters similar to the POWER UP AND RESET ROUTINE.

After entering the MAIN LOOP as represented by start block 251, the processor 100 examines the SATELLITE CONTROL WORD CHECKSUM to assure that a valid transmission has occurred from the master positioning I/O module 19. This is represented by process block 252. Next, a conditional instruction is executed to detect new move data as represented by decision block 253. If no new move data is detected, the processor then processes any manual mode commands or program mode commands transmitted through the SATELLITE CONTROL WORDS. As represented by decision block 254, the processor 100 checks for program mode commands first. These commands include LOAD NEXT MOVE, the GO command, the EOM (end-of-move) STOP command and the ESCAPE command. When the controller 10 is in the manual mode, the routine proceeds from decision block 254 in FIG. 27a to decision block 261 in FIG. 27b. From there, the processor 100 processes manual mode commands, new parameters or one of several commands related to establishing a home position. If program mode commands are processed by virtue of executing instructions represented by process block 255, the axis processor 100 then proceeds to a CLEAR portion of the MAIN LOOP beginning with process block 266 in FIG. 27b.

Referring again to decision block 253 in FIG. 27a if new move data is detected, a conditional instruction, represented by decision block 256, is executed to see whether the move is the ESCAPE move. When ordinary move data is present, the single move control word (SMCW) is stored in the NEXT MOVE BUFFER in FIG. 25 and the move request is cleared as represented by process block 257. Next, the move data is loaded into the NEXT MOVE BUFFER in FIG. 25 as represented by process block 257 and a checksum is examined to make sure that no communication errors have occurred in transferring the move data. The ESCAPE move is processed similar to ordinary move data through execution of process blocks 259 and 260 except that a next move request is not cleared for the ESCAPE move. After loading the applicable move data into the NEXT MOVE BUFFER, the processor 100 again proceeds to the CLEAR portion of the sequence beginning with process block 269 in FIG. 27b.

Manual mode commands are processed during the MAIN LOOP in a similar, but nevertheless slightly different manner than during the POWER UP AND RESET ROUTINE. As illustrated by decision block 261 in FIG. 27b, it must first be determined whether a programmed move is in progress. If the satellite I/O positioning module 18 is doing a programmed move and a manual motion command is received, the manual motion command will be ignored until the programmed move is completed. Programmed and manual moves are executed asynchronously on the basis of which is received first. Thus, if a programmed move is in progress, blocks 262-266 are skipped, and the hardware I/O port is read as shown by I/O block 267.

When a programmed move is not in progress as represented by the "NO" result for decision block 261 in FIG. 27b, a check is made for new parameters as represented by decision block 262. When a new PARAMETER BLOCK (A) has been received, the additional parameters are computed and all of the parameters stored in the axis scratchpad memory 111 seen in FIG. 25. If parameters have previously been received, the READY flag will be set and this will be detected through execution of an instruction represented by decision block 264. When the READY flag is set there is the possibility of executing either an initialize home position sequence, a GO HOME command or the SEARCH FOR HOME sequence discussed earlier in relation to the home limit switch. In the initialize home sequence, the home value received in the PARAMETER BLOCK (A) becomes the command position and the present position becomes the home position less the following error. After processing any of these home position sequences, the axis processor 100 proceeds to the CLEAR portion of the MAIN LOOP which begins with block 266.

After clearing the SATELLITE CONTROL WORDS, as represented by process block 266, the axis processor 100 reads the hardware I/O port seen in Table 18 above, as represented by I/O block 267. Bit 14 (octal) is checked, as represented by process block 268, for further markers. Other hardware inputs such as the STOP button on the satellite I/O module 18, and the I/O RESET and MASTER STOP inputs from the master I/O positioning module are also checked and processed, as represented by process block 269. A set of three blocks 270-272 is then executed to load any jog rate needed for execution of a hardware jog command. As represented by decision block 273, if a jog motion is under way, a check is made as to whether processing should be done in preparation for further motion through execution of block 274 or in preparation for terminating motion through setting a flag for deceleration to zero velocity as represented by process block 275. After any interrupt has been completed, the axis processor 100 returns to the START portion of the MAIN LOOP in FIG. 27a.

The MAIN LOOP routine in FIGS. 27a and 27b is interrupted each 2.0 milliseconds and an interrupt routine is executed to control the servomechanism 45 as it moves, or in "real time." Referring to FIG. 28, the interrupt is represented by start block 280. The first step in the interrupt routine is represented by decision block 281, where the axis processor checks for overlapping operation with the arithmetic processor 51 relative to their common memory 112. In this event, an instruction represented by process block 282 is executed to signal an E-STOP and through decision block 283 the E-STOP condition will be detected. Process block 284 will then be executed to execute the E-STOP. Where no overlap is detected through execution of decision block 281, the register values and index pointers from the MAIN LOOP routine are saved, a 2.0 millisecond timer is reset, and a BUSY flag is set as represented by process block 285. Assuming there is no condition for causing an E-STOP, the processor 100 executes a servo I/O routine represented by process block 286, and described in more detail relative to FIG. 29. During this routine, velocity output signals are transmitted to the servo motor 42 and position feedback is read from the shaft encoder 43. The axis processor 100 then checks for the manual mode of operation in which a SEARCH HOME, a GO HOME or a JOG move is executed and this sequence is shown in blocks 287-292.

Assuming that no E-STOP or manual mode command is to be executed, the axis processor 100 then proceeds to test for the program mode, as shown by decision block 293. A non-emergency stop command referred to as SLIDE STOP is a program mode command that is executed through decision block 294 and process block 295. The SLIDE STOP sequence represented by process block 295 is also important because through this sequence the axis processor 100 calls a LOAD NEXT MOVE sequence (not represented) to transfer move data from the NEXT MOVE buffer in FIG. 25 to the PRESENT MOVE BUFFER, so that continuous movement can be maintained. To provide for continuous movement, the master I/O positioning module 19 inserts a GO command into the next move data. The axis processor 100 senses this GO command and other conditions and then calls the LOAD NEXT MOVE sequence. Another program mode command is a DWELL. A DWELL is not actually a move but a delay sequence which is programmed with moves and executed through decision block 296 and process block 297.

Programmed moves are divided into increments, each increment being associated with a distance to be moved and a velocity output signal for a 2.0 millisecond interval. Calculation of these move increments and velocity signals is the function of the ITERATION sequence represented by process block 298 and seen in more detail in FIG. 30. After performing the calculations to determine the output signals for the next cycle of the servo I/O routines 286, the processor checks to see whether the common memory 112 is available as represented by decision block 299. If so, status, position and following error data are transferred from the axis scratchpad memory 111 to the common memory 112 as represented by process block 300. The contents of the processor registers, including pointers, are then restored as represented by process block 301 in preparation for return from the interrupt routine as represented by terminal block 302. The blocks 299-301 form a STAT LOOP portion of the INTERRUPT routine.

Figure 29:
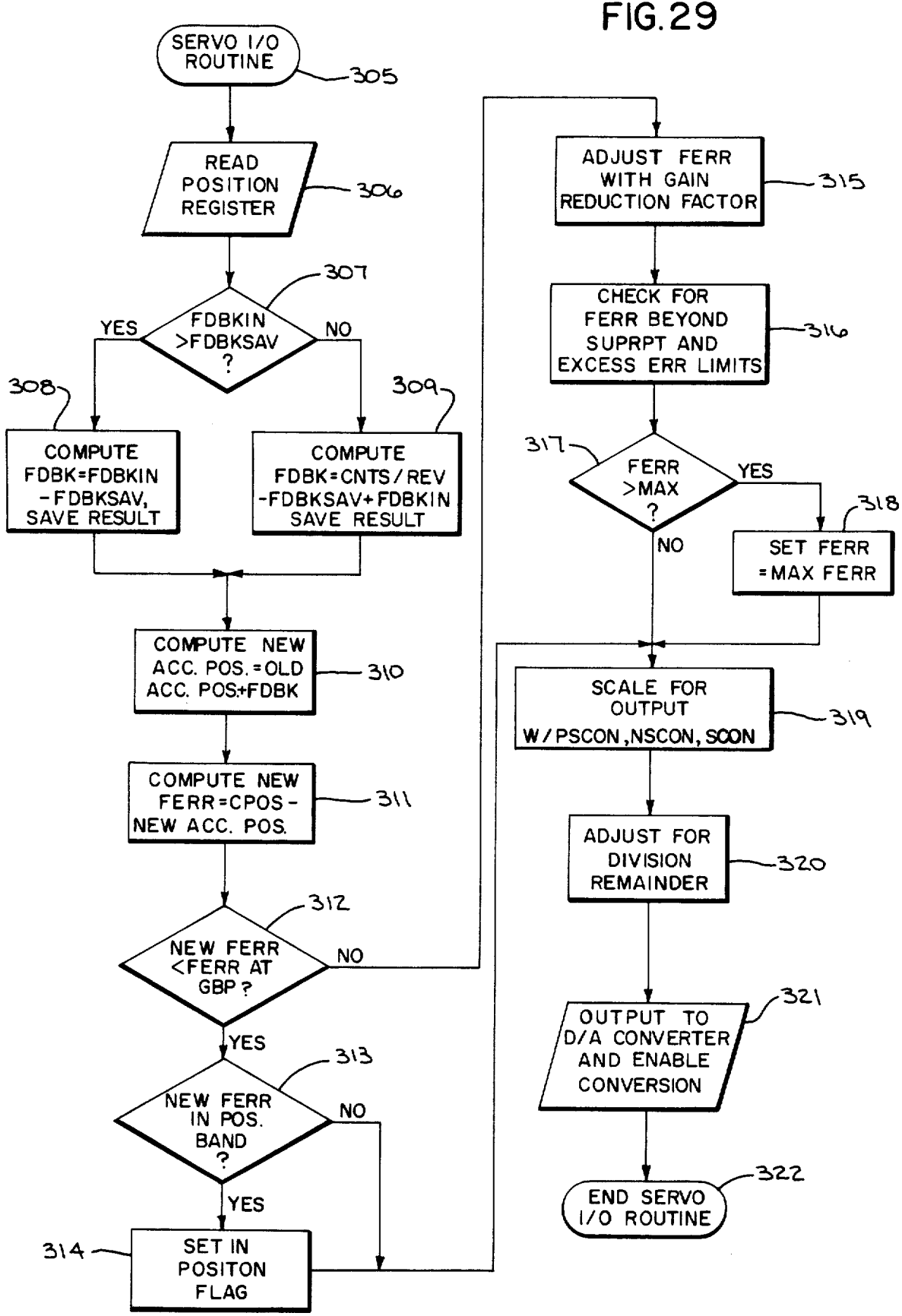

The SERVO I/O ROUTINE of block 286 in FIG. 28 is outlined in FIG. 29 and an illustrative example of such a routine is listed in Appendix B. Beginning with start block 305 in FIG. 28, the axis processor 100 reads the accumulated position from the position register latches 126 (FIG. 12), as represented by process block 306. The counters 125 are reset when the first marker is found and upon detection of succeeding markers. When the accumulated count is read through the position register, it represents a partial revolution of the servo output shaft. The previous count or position is referred to in FIG. 29 as FDBKSAV, while the new count or position is referred to as FDBKIN. As represented by decision block 307, FDBKIN is compared to FDBKSAV. If it is greater, the new FDBKSAV equals FDBKIN minus the old FDBKSAV. This calculation is executed and the result saved as represented by process block 308. Where the new FDBKIN is less than FDBKSAV the shaft has passed the marker. To add an increment of the previous revolution with an increment of the present revolution, the new FDBKSAV is computed by subtracting the old FDBKSAV from the COUNTS/REVOLUTION and then adding FDBKIN, as shown by process block 309. The new accumulated position is then computed, as seen in process block 310, by adding the new feedback position increment to the old accumulated position. Following error is computed as shown in process block 311 by subtracting the new accumulated position from the command position included in the move data being executed.

After computing the new position and following error, the axis processor 100 executes instructions represented by blocks 312-318 to determine the region of operation relative to the GAIN BREAK POINT in FIG. 4. If the following error is in the INITIAL GAIN region (result of decision block 312 is yes) it is multiplied by scale factors (process block 319) to convert it to a corresponding velocity signal for output to the servo motor 42 (process block 321). If the computed following error is greater than the following error at the GAIN BREAK POINT (result of decision block 312 is "NO") the following error is adjusted with the GAIN REDUCTION FACTOR (process block 315) according to the following equation (8) to obtain the proper velocity in the REDUCED GAIN region in FIG. 4.

ADJ. FOLL. ERROR=(NEW FOLL.
ERROR−FOLL. ERR.$_{GBP}$) (GAIN RED.
FACTOR)+FOLL. ERR.$_{GBP}$      (8)

Where the following error is beyond the FEEDRATE SUPPRESSION POINT (SUPRPT) or the MAX FERR (blocks 316 and 317) it is reduced to the maximum (process block 318). Where the following error is beyond the excess error limit (process block 316) an E-STOP is executed on the next interrupt. The conversion of following error to servo velocity is made with scale factors PSCON, NSCON and SCON, where PSCON and NSCON are positive and negative values of the respective D/A VOLTAGE parameters, multiplied by 2047. SCON is the RAPID RATE×10³/INITIAL GAIN. The servo output is calculated as follows:

$$SERVO\ VELOCITY = (ADJ.\ FOLL.\ ERR.) \frac{(PSCON\ or\ NSCON)}{SCON} \quad (9)$$

As represented by process block 320 a further adjustment is made to account for a remainder that results from the division in Equation (9). Each time the computation is made, the remainder from the previous computation is added, and a carry bit is examined, so that the servo velocity will not be diminished by repeated loss of the remainder. As represented by I/O block 321 the digitized velocity signal is then coupled to the D/A converter 131 and the conversion is initiated in response to control signals to the D/A latches 130 and to the D/A sample and hold circuit 132. The end of the SERVO I/O ROUTINE is represented by terminal block 322.

The SERVO I/O ROUTINE of FIG. 29 provides closed-loop positioning control of the servomechanism 45 in response to position commands calculated from the move data through execution of an ITERATION routine represented by block 298 in FIG. 28. This routine is outlined in FIGS. 30a and 30b and an illustrative example is listed in detail as a PROGRAM MOVE COMMAND ROUTINE in Appendix C. The ITERATION sequence applies to program mode moves as opposed to manual mode moves such as SEARCH FOR HOME (FIG. 28, decision block 288), and GO HOME (FIG. 28, decision block 290) or JOG MOVES (FIG. 28, process block 292). The ITERATION loop is also inapplicable to SLIDE STOP commands (FIG. 28, block 294) and DWELL (zero distance) commands (FIG. 28, block 296). The program mode includes two sub-modes of operation referred to as the RUN and HALT modes. The invention is illustrated when the controller is operated in the RUN program mode, in which moves are executed continuously after an initial GO command, even though additional GO commands may be formulated by the master I/O positioning module 19. In the HALT mode, a GO command from the user is required for each move, and each move ends at zero velocity. The HALT mode is essentially a single-step mode for stepping through a program or performing very simple positioning tasks while the RUN mode applies to more complex operations. Therefore, the ITERATION routine in FIG. 30 will be explained in terms of the RUN mode only.

Figure 31A:
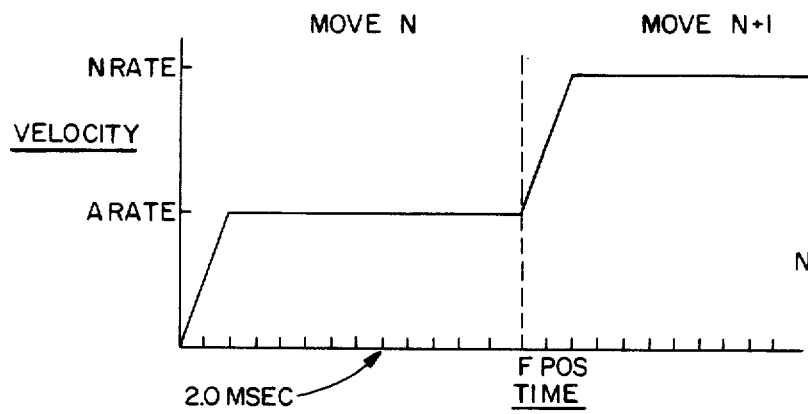
FIGS. 31a-31c are velocity vs. time curves for three different examples of controlling acceleration and deceleration with the satellite I/O modules of FIG. 3.

In calculating the servo velocity, the axis processor 100 looks for a point of deceleration (PT DECEL) at which a user-programmed DECEL number is used to reduce servo velocity (ARATE). Referring to FIG. 31a, where the next move (N+1), is to be executed at a rate (NRATE) greater than the rate (ARATE) of the present move (N), acceleration can await the start of the next move time period. However, in the situation shown in FIG. 31b, deceleration should be started prior to the next move to prevent possible overshoot of the end point for the next move. And in the case of FIG. 31c, where the next move is to be performed in the opposite direction, it is desirable to decelerate to zero by the end of the current move and to accelerate in the reverse direction. To assure that deceleration is applied at the correct point, the axis processor 100 checks, at each 2.0 millisecond interval, to see if the velocity (ARATE) should be decreased by a deceleration increment (DECEL). Using classical physical formulas for motion, the distance from the present position (CPOS) to the end point for move (FPOS) can be related to steady-state velocity for move N (ARATE), the steady-state velocity for move N+1 (NRATE) and the deceleration parameter (DECEL).

Equation (10) is the classical differential equation relating to a constant average acceleration (a) to velocity (v) and time (t). Equation (11) is the classical differential equation relating to a constant velocity (v) to distance (x) and time (t).

$$a = dv/dt \qquad (10)$$

$$v = dx/dt \qquad (11)$$

Equation (10) can be rewritten in terms of velocity (v), distance (x) and time (t) as follows:

$$a = \left(\frac{dv}{dx}\right)\left(\frac{dx}{dt}\right) = \left(\frac{dv}{dx}\right) v \qquad (12)$$

Equation (12) can be rearranged as seen in Equation (13).

$$dx = \frac{1}{a} v\, dv \qquad (13)$$

Integrating both sides of equation (13) in terms of FPOS, CPOS, ARATE, NRATE and DECEL produces Equation (14) and evaluating the integrals produces Equation (15).

$$\int_{CPOS_{DECEL}}^{FPOS} dx = -\frac{1}{DECEL} \int_{ARATE}^{NRATE} v\, dv \qquad (14)$$

$$FPOS - CPOS_{DECEL} = \frac{(ARATE)^2 - (NRATE)^2}{2 \times DECEL} \qquad (15)$$

When the command position for deceleration (CPOS$_{DECEL}$) is reached the DECEL factor should be applied. For purposes of processor calculations, the following mathematical statement (16) is used to see if CPOS$_{DECEL}$ will be reached or passed in the next 2.0 millisecond time interval. The distance to go (DTG) is defined as the end of move or final position (FPOS) minus the present commanded position (CPOS).

$$NRATE^2 - ARATE^2 > DTG \cdot ARATE\,(2.0\ MSEC) \times 2 \times DECEL \qquad (16)$$

Figure 30A:
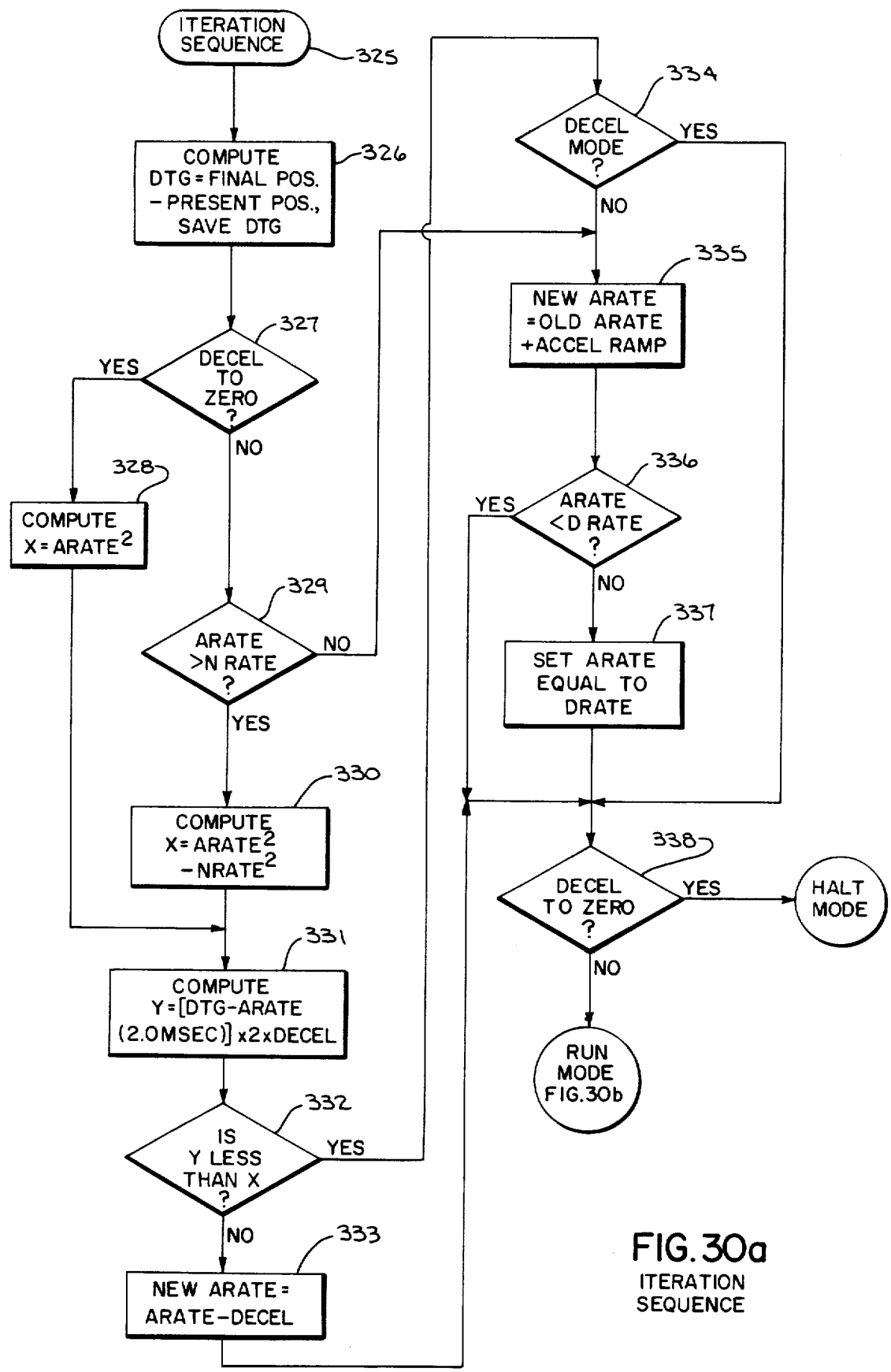

These formulas are applied to live motion by the ITERATION sequence which begins with start block 325 in FIG. 30a. As shown by process block 326, the axis processor 100 executes instructions to calculate the distance to go (DTG) from the destination position (FPOS) and the present commanded position (CPOS). As shown by decision block 327, the processor then checks several conditions to determine whether the velocity should be decelerated to zero. One of these conditions is the selection of the HALT or SINGLE STEP mode. Another condition for deceleration to zero occurs when the next move is in the opposite direction of the present move. This condition is illustrated in FIG. 31c. In this case, the ARATE is squared as represented in process block 328 and compared with the remaining portion of Equation (16) as represented by process block 331 and decision block 332. If the point of deceleration will be passed as a result of the comparison in decision block 332, the DECEL factor is applied to the ARATE for the next move increment, as shown by process block 333. Where the point of deceleration is not detected as a result of executing decision block 332, it may be that the axis processor 100 is in the deceleration mode, but that the DECEL factor need not be applied in this increment. This is checked as shown by decision block 334. If the processor 100 is not in the DECEL mode, then Case 1 shown in FIG. 31a or Case 3 shown in FIG. 31c may be present. In FIG. 31a the ACCEL factor is a positive number for motion in the positive direction. In FIG. 31c the ACCEL factor for move N+1 is in the negative direction. As will be appreciated by those skilled in the art, positive and negative numbers might be handled somewhat differently with different processors, however, process block 335 is intended to represent that the magnitude of the ACCEL factor is added to the old ARATE, with a negative sign being applied for acceleration in the negative direction.

The user has the option of programming a FEEDRATE OVERRIDE velocity, however, this FEEDRATE OVERRIDE velocity is limited to a specified percentage of the actual rate (ARATE). Therefore, instructions are executed as represented by decision block 336 to assure that ARATE is not accelerated beyond a maximum FEEDRATE OVERRIDE velocity that has been designated DRATE. If that would occur in the next increment, the new ARATE is limited to DRATE as represented by process block 337.

Figure 31B:
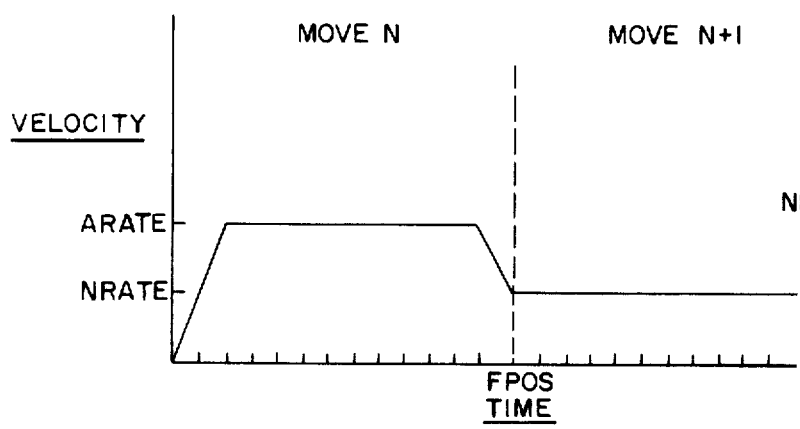
Figure 31C:
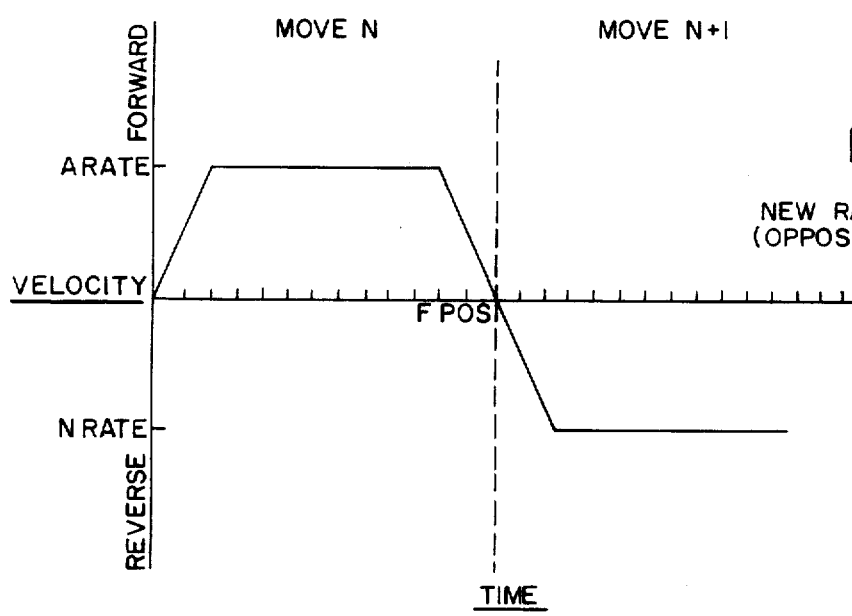

Referring back to decision block 327, if there will not be a deceleration to zero, and if NRATE for move N+1 is less than ARATE for move N, then Case 2 represented by FIG. 31b is presented. In that case the point of deceleration is computed with the operation seen in process blocks 330 and 331. If the point of deceleration has been reached as shown by the "NO" result from decision block 332 then the DECEL factor is subtracted from ARATE to begin deceleration to NRATE.

After adjusting velocity for the next increment by an ACCEL factor, a DECEL factor or by neither when the point of deceleration has not been reached, the conditions for deceleration to zero are again checked as represented by decision block 338. Where deceleration to zero will be executed, the positioning system is effectively operated in the HALT mode which, as mentioned above, will not be described in detail. Where a velocity will be maintained the same, or velocities will be blended, the RUN mode sequence seen in FIG. 30b will be executed.

As seen in FIG. 30b, a check is made as represented by decision block 339 for the direction of travel. In the RUN mode, the rate for the next increment is integrated over the 2.0 millisecond time interval to provide a command position increment. This integration is accomplished as represented by process blocks 340 and 341, by adding or subtracting the ARATE, depending on the direction of travel. Over the 2.0 millisecond time interval the ARATE equals the incremental distance to be moved. The increments are accumulated in a 32-bit INTEGRAND area in the axis scratchpad memory 111. The INTEGRAND stores a whole number in its upper 16 bits and a fraction in its lower 16 bits. When ARATE is added to INTEGRAND, it provides the new commanded position increment in the upper 16 bits and remainder in the lower 16 bits. By retaining the remainder, a carry is accomplished in the INTEGRAND over two or more move increments, so that position increments are more accurately integrated. To obtain the resultant command position the upper 16 bits of the INTEGRAND are added to the accumulated command increments which are kept in a storage area that is separate from INTEGRAND. This operation is represented by process blocks 342 and 343 for the positive and negative directions of travel, respectively. A check is then made as represented by decision blocks 344 and 345 to determine whether the distance to go is less than two increments from the move end point (FPOS). If there are less than two increments left, flags are set as represented by process block 346 to signal that the next output will be the last output and to set a flag for recognition during the slide stop sequence represented by block 295 of FIG. 28. The slide stop flag will cause the processor 100 to examine the next move for a GO command and to load the next move when it is needed for continuous motion. If the distance to go is greater than two increments a further check is made as represented by decision blocks 347 and 348 to see if the distance to go is less than six increments from the end point of the move. In this case an "axis done" flag is set for return to the master positioning I/O module. This flag will signal the master I/O positioning module 19 to formulate a GO command for a next move if continuous motion is desired upon completion of the RUN mode sequence. The axis processor then returns to the status loop (STAT LOOP) seen in FIG. 28, and after completion of blocks 299–301 in FIG. 28, the axis processor 100 returns from its interrupt routine to the MAIN LOOP background sequence of FIG. 27a.

From the above description it should now be apparent how the axis processor 100 controls the servomechanism 45 by reading feedback and generating servo velocity signals each 2.0 milliseconds. The axis processor 100 is responsive to programmed and actual velocities to calculate a point of deceleration and to apply to user-programmed deceleration factor so that moves can be blended without undesirable continuities in servo velocity.

The six sections of this detailed description have shown how various parameters and operating commands are processed as inputs from the control panel 33 and as user data and program instructions from the PC processor unit 11 to control the servomechanisms 45 and how status and position data is obtained from the servomechanisms 45 and returned to the PC processor unit 11 or control panel 33. This description has been given in great detail. There are of course, many other technical details that have not been included, and these are considered to be within the ordinary skill of hardware and software engineers in this art. The description herein is sufficiently detailed that a preferred embodiment can be made and used by those with skill and information typically possessed by those in the art. Many other embodiments might also be made which uses the inventive concepts, and therefore the scope of the inventive contribution has been expressed in the following claims.

APPENDIX A - COMPONENTS

| Reference No. | Circuit Element | Description of Components |
|---|---|---|
| 50 | communications processor | 8039 microprocessor manufactured by Intel Corp. |
| 51 | arithmetic processor | 8088 microprocessor manufactured by Intel Corp. |
| 52 | communications scratchpad memory | Two SY2114 1k × 4-bit random access memories manufactured by Signetics Corp. |
| 53 | master common memory | Two SY2114 1k × 4-bit random access memories manufactured by Signetics Corp. |
| 54 | control line logic circuit | SN74451 dual 2-input power AND gates, SN74LS27 quad three-input NOR gates, SN74LS04 hex inverters, two SN74LS08 quad two-input AND gates, two SN74LS74 dual D-type flip-flops, SN74LS02 quad two-input NOR gates and SN74LS00 quad two-input NAND gates, all manufactured by Texas Instruments, Inc. |
| 55 | communications firmware memory | One 2732 4k × 8-bit erasable, programmable read only memory (EPROM) manufactured by Intel Corp. |
| 57 | input latch | SN74LS374 octal D-type flip-flops with input enable, manufactured by Texas Instruments, Inc. |
| 58 | bus output latch | SN47LS273 octal D-type flip-flop with reset, manufactured by Texas Instruments, Inc. |
| 59 | module output latch | AM25S533 octal latch with outputs enable manufactured by Advanced Micro Devices |
| 61, 71, 87, 88, 110, 115 | two-way buffers | Six SN74LS245 octal bus transceivers manufactured by Texas Instruments, Inc. |
| 64, 66 | low-true OR gates | SN74LS32 quad two-input OR gates manufactured by Texas Instruments, Inc. |
| 67, 77, 79, 106 | address latches | Five SN74LS373 octal D-type flip-flops manufactured by Texas Instruments, Inc. |
| 69 | decoding and latching circuit | Unused portions of components cited above for control line logic circuit (54), and 74LS244 octal non-inverting 3-state drivers all manufactured by Texas Instruments, Inc. |
| 81 | chip select logic circuit | SN74LS139 3-to-8 line decoder, SN74LS367 hex bus drivers with non-inverted outputs, SN74LS32 quad two-input OR gates, SN74LS04 hex inverters, SN74LS00 quad 2-input NAND gates and SN74LS02 quad 2-input NOR gates, all manufactured by Texas Instruments, Inc. |
| 83, 117 | multiplexers | Six SN74LS157 quad 2-to-1 line multiplexers manufactured by Texas Instruments, Inc. |
| 85 | buffers | SN74LS244 octal line driver/buffers with noninverted outputs |
| 86 | Satellite I/O port | SN74LS374 octal D-type flip-flops, SN74LS74 dual D-type flip-flop, SN74LS32 quad two-input OR gates, |

APPENDIX A - COMPONENTS

| Reference No. | Circuit Element | Description of Components |
|---|---|---|
| | | SN74LS367 hex bus drivers, and SN74LS221 multivibrator, all manufactured by Texas Instruments, Inc., and one 8257 triple program timer/counter manufactured by Intel Corp. |
| 91, 121 | two-way buffers | Two DP8304 3-state octal bus transceivers manufactured by National Semiconductor |
| 89 | arithmetic firmware memory | Two 2764 8k × 8-bit EPROMs manufactured by Intel Corp. |
| 90 | arithmetic scratchpad memory | One HM6116 2k × 8-bit random access memory manufactured by Mostek |
| 100 | axis processor | 8088 microprocessor manufactured by Intel Corp. |
| 103 | control line logic circuit | SN74LS00 quad two-input NAND gates, SN74LS244 octal buffers/line drivers, SN74LS04 hex inverters, SN74LS240 octal buffers/line drivers with inverted outputs, SN74LS132 quad Schmitt trigger NAND gates and SN74LS08 quad 2-input AND gates |
| 105 | axis firmware memory | One 2764 and one 2732A 8k × 8-bit EPROM manufactured by Intel Corp. |
| 108 | decoding circuit | Two SN74LS138 3-to-8 line decoders manufactured by Texas Instruments, Inc. |
| 111 | axis scratchpad memory | HM6116 2k × 8-bit random access memory manufactured by Hitachi |
| 112 | master-satellite common memory | Two AM9111D 256-line × 4-bit random access memories manufactured by Advanced Micro Devices |
| 114 | buffers | SN74LS244 octal buffers/line drivers manufactured by Texas Instruments, Inc. |
| 118 | memory address generator | CD4520BE CMOS dual up counters manufactured by RCA and SN74L74 dual D-type flip-flops and SN74LS266 quad two-input XOR gates manufactured by Texas Instruments, Inc. |
| 119 | latch | SN74LS174 hex D-type flip-flops with reset manufactured by Texas Instruments, Inc. |
| 122 | encoder input circuits | Includes SN74LS240 3-state octal buffers/line drivers manufactured by Texas Instruments, Inc. |
| 123, 126 | latches | Three SN74LS374 octal D-type flip-flops manufactured by Texas Instruments, Inc. |
| 124 | decoding PROM | SNS287 256-line × 4-bit programmable read-only memory manufactured by Texas Instruments, Inc. |
| 125 | counters | Four SN74LS669 4-bit up/down counters manufactured by Texas Instruments, Inc. |
| 129 | buffers | SN74LS244 octal non-inverting buffers/line drivers manufactured by Texas Instruments, Inc. |
| 130 | latches | Three SN74LS175 quad D-type flip-flops manufactured by Texas Instruments, Inc. |
| 131 | D-to-A converter | AD DAC80 12-bit D/A converter manufactured by Analog Devices |
| 132, 136 | Sample and hold circuits | Two LF198 sample and hold circuits manufactured by National Semiconductor |
| 138 | axis control latch | SN74LS273 octal D-type flip-flops manufactured by Texas Instruments, Inc. |
| 139, 143 | inverters | SN74LS04 hex inverter manufactured by Texas Instruments, Inc. |
| 140, 142, 145 | NAND gates | SN74LS00 quad 2-input NAND gates manufactured by Texas Instruments, Inc. |
| 141 | NOR gate | SN74LS02 quad 2-input NOR gates manufactured by Texas Instruments, Inc. |
| 96 | marker reset circuit | SN74L500 quad 2-input NAND gates and SN74LS74 D-type flip-flop manufactured by Texas Instruments, Inc. |

Note:
In some cases not all of the gates or terminals of the components in the right-hand column are used in forming the circuit elements in the middle column.

APPENDIX B

```
************************
*  SRVO OUTPUT ROUTINE  *
************************

;THIS ROUTINE WILL SUBTRACT THE ACTUAL POSITION (SUMMATION
;OF FEEDBACK INCREMENTS) FROM THE COMMAND POSITION
;(SUMMATION OF COMMAND INCREMENTS) WHICH IS THE FOLLOWING
;ERROR.FOR THIS INTERVAL.  THE CORRSPONDING ANALOG VOLTAGE
;FOR THIS DIFFERENCE BECOMES THE D/A OUTPUT.  IN POSITION,
;GAIN BREAK POINT, FEEDRATE SUPPRESSION, AND EXCESS ERROR
;ARE CHECKED AND THE APPROPRIATE ACTION IS TAKEN.  IF LOSS
;OF FEEDBACK IS ENABLED THE THE D/A OUTPUTS ARE AVERAGED
;OVER THE SET NUMBER OF ITERATIONS SELECTED BY THE USER,
;% ERROR AND ERROR BAND ARE ADDED TO THE AVERAGE AND LOSS.
;OF FEEDBACK IS TESTED.  IF TACH CALIBRATION IS ENABLE,
;EACH D/A OUTPUT IS SCALED BY THE TACH CONVERSION FACTOR
;AND THIS VALUE IS OUTPUT TO THE TACH S/H. THIS VALUE IS
;COMPARED TO THE TACHOMETER INPUT TO THE MODULE SO THAT
;CALIBRATION CAN OCCUR.  ALSO DURING TACH CALIBRATION THE
;TACH CALIBRATION LED IS ENABLED. (DURING LOSS OF FEEDBACK
;THE TACH CALIBRATION LED IS DISABLED.

SERVOUT:  MOV    AX,FDBKIN          ;READ ENCODER INPUT
          MOV    RX,AX              ;SAVE FDBKIN
          CMP    AX,#0              ;IS FDBKIN NEG. ?
          JG     POS_DIR            ;N:
          JL     NEG_DIR            ;Y:
          TESTB  FDBKSAV+1,#80H     ;IS FDBKSAV NEG. ?
          JNZ    NEG_DIR            ;Y:
                                    ;N:
POS_DIR:  SUB    AX,FDBKSAV         ;TEMP = FDBKIN - FDBKSAV
          JGE    CALC_POS           ;IF RESULT IS POS., THEN INC_FDBK IS OK
                                    ;ELSE CHECK FOR WITHIN ERROR BAND
          CMP    AX,N_ERR           ;IS TEMP < NEG. FDBK ERROR BAND ?
          JG     CALC_POS           ;Y:
                                    ;N:
          TESTB  STATUS+2,#20H      ;HAS 1ST MARKER BEEN FOUND ?
          JZ     NO_MARK            ;N:
                                    ;Y:
          ADD    AX,CNTPREV         ;INC_FDBK = TEMP + COUNTS/REV.
          JMP    CALC_POS
          ;
NO_MARK:  MOV    AX,INC_FDBK        ;SET INC_FDBK = PREVIOUS VALUE
                                    ;WHEN FIRST MARKER IS FOUND
          ORB    STATUS+2,#20H      ;SET MARKER FOUND STATUS FLAG
          JMP    CALC_POS
          ;
NEG_DIR:  SUB    AX,FDBKSAV         ;TEMP = FDBKIN - FDBKSAV
          JLE    CALC_POS           ;IF RESULT IS NEG., THEN INC_FDBK IS OK
                                    ;ELSE CHECK FOR WITHIN ERROR BAND
          CMP    AX,P_ERR           ;IS TEMP < POS. FDBK ERROR BAND ?
          JL     CALC_POS           ;Y:
                                    ;N:
          TESTB  STATUS+2,#20H      ;HAS 1ST MARKER BEEN FOUND ?
```

```
SERVO OUTPUT ROUTINE
ESINTR.LIS
ERR LINE  ADDR  R1 R2 R3 R4
     166  00AC  74 E2
     167
     168  00AE  2A 06 00 00        CALC_POS:  SUB  NO_MARK              ;N:
     169                                                                ;Y:
     170  00B2  8B 0F              CALC_POS:  MOV  AX,CNTPREV           ;INC_FDBK = TEMP + COUNTS/REV
     171  00B6  89 0F 00 00                   MOV  CX,INC_FDBK          ;RCX = PREVIOUS VALUE OF INCR. FDBK
     172  00BA  A3 00 00                      MOV  TACH_SAV,CX          ;SAVE PREVIOUS INCR. FDBK FOR L.O.F.
     173  00BD  A9 1F 00 00                   MOV  INC_FDBK,AX          ;SAVE INCREMENTAL FEEDBACK
     174  00C1  99                            MOV  FDBKSAV,BX           ;SAVE NEW FDBKIN FOR NEXT OUTPUT
     175  00C2  01 06 00 00                   CWD
     176  00C6  11 16 02 00                   ADD  POSIT,AX             ;NEW POSITION = POSIT + FDBK
     177  00CA  C6 06 00 00                   ADC  POSIT+2,DX
     178  00CE  A1 02 00                      MOV  SIGN,#0
     179  00D1  8B D0                         MOV  AX,CAR+2
     180  00D3  A1 00 00                      MOV  AX,CAR
     181  00D6  2B 06 00 00                   SUB  AX,POSIT
     182  00DA  1B 16 02 00                   SBB  DX,POSIT+2
     183  00DE  A3 00 00                      MOV  FERR,AX              ;NEW FERR = COMM. POSITION -
     184  00E1  89 16 02 00                   MOV  FERR+2,DX            ; ACTUAL POSITION
     185  00E5  79 0F                         JNS  S_POS                ;STORE NEW FULL. ERROR
     186  00E7  C6 06 00 00                   MOVR SIGN,#1
     187  00EB  F7 D0                         NOT  AX                   ;IF FERR IS NEG, STORE SIGN AND
     188  00ED  F7 D2                         NOT  DX                   ;INVERT MAGNITUDE
     189  00EF  05 01 00                      ADD  AX,#1
     190  00F2  83 D2 00                      ADC  DX,#0
     191                         S_POS:
     192  00F5  81 26 00 00  E    S_POS:      AND  STATUS,#0FBFEH       ;CLEAR FLAGS
     193  00FB  83 FA 00                      CMP  DX,#0                ;IS MSW OF FERR = 0 ?
     194  00FE  75 14                         JNE  CK_MAX               ;N: THEN CHECK GAIN BRKPT
     195
     196  0100  3B 06 00 00  E                CMP  AX,GAINP             ;IS FERR < GAIN BRK. PT. ?
     197  0104  77 0E                         JA   CK_MAX               ;N:
     198                                                                ;Y:
     199  0106  3B 06 00 00  E                CMP  AX,INBAND            ;IS FERR < INBAND ?
     200  010A  77 05                         JA   SHORT_1              ;N:
     201  010C  80 0E 00 00                   ORB  STATUS,#1            ;Y: SET IN POSITION FLAG
     202  0110  E9 41 00                      JMP  NOBED
     203                         SHORT_1:
     204  0113  3B 16 02 00  E   CK_MAX:      CMP  DX,MAXFERR+2         ;IS FERR > MAXFERR ?
     205  0117  72 40                         JB   GAIN_ADJ             ;N:
     206  0119  77 06                         JA   CK_SUPPR             ;Y:
     207  011B  3B 06 00 00  E                CMP  AX,MAXFERR
     208  011F  72 38                         JB   GAIN_ADJ
     209
     210  0121  3B 16 02 00  E   CK_SUPPR:    CMP  DX,SUPPR_PT+2        ;IS FERR > FEED SUPPRESSION ?
     211  0125  72 0D                         JB   CK_EXERR             ;N:
     212  0127  77 06                         JA   SET_SUPP             ;Y:
     213  0129  3B 06 00 00  E                CMP  AX,SUPPR_PT
     214  012D  72 05                         JB   CK_EXERR
     215  012F  80 0F 01 00      SET_SUPP:    ORB  STATUS+1,#4          ;SET FEED SUPPRESSION FLAG
     216
     217  0133  3B 16 02 00  E   CK_EXERR:    CMP  DX,EXCESS+2          ;IS FERR > EXCESS ERROR ?
     218  0137  72 17                         JB   SET_MAX              ;N:
     219  0139  77 06                         JA   SET_ERR              ;Y:
     220  013B  3B 06 00 00  E                CMP  AX,EXCESS
     221  013F  72 0E                         JB   SET_MAX
```

```
SERVO OUTPUT ROUTINE
$INTR.LIS
ERR LINE  ADDR   B1 B2 B3 B4
 221      0145                                    ORB    STATUS+1,#81H   ;SET EMERGENCY STOP AND EXCESS
 222                                                                     ;ERROR STATUS FLAGS
 223      014A   80 0F 00 00         SET_ERR:     ORB    TMODE,#1
 224      014E   2B C0                            SUB    AX,AX
 225      0151   E9 50 00                         JMP    OUTPUT
 226      0154   A1 02 00            SET_MAX:     MOV    AX,MAXFERR+2    ;SET FERR = MAXFERR
 227      0157   8B D0                            MOV    DX,AX
 228      0159   A1 00 00                         MOV    AX,MAXFERR
 229      015C   8B 1F 00            GAIN_ADJ:    MOV    BX,GAINR
 230      015F   2B 16 00                         SUB    AX,GAINR
 231      0162   8B 0A 00                         MOV    CX,GAINP
 232      0165   8B CA                            MOV    DX,#0
 233      0167   8B D3                            MOV    CX,DX
 234      0169   8B CA                            SRR    RX
 235      016B   8B CA                            MOV    AX,CX
 236      016D   8B CA                            MOV    CX,DX
 237      016F   F7 E3                            MUL    BX
 238      0171   03 C1                            ADD    AX,CX           ;TEMP = [( FERR - GAINP ) / GAINR
 239      0173   03 06 00                         ADD    AX,GAINP        ;                         + GAINP
 240      0177   F6 06 00 00         NORED:       TESTR  SIGN,#1         ;IS OUTPUT NEG. ?
 241      017C   75 1A                            JNZ    NEG_OUT         ;Y:
                                                                         ;N:
 243      017E   F7 26 00 00                      MUL    PSCON1
 244      0182   F7 36 00 00                      DIV    SCON2           ;OUTPUT = ( TEMP / SCON2 ) * PSCON1
 245      0186   01 16 00                         ADD    ACCUM,DX        ;ADD REMAINDER TO ACCUM
 246      018A   71 01                            JNO    CK_PSAT         ;OVERFLOW FROM ACCUM ?
 247      018C   40                               INC    AX              ;Y:
                                                                         ;N:
 249      018D   3D FF 07            CK_PSAT:     CMP    AX,#DASAT       ;IS D/A OUTPUT > 7FFH ?
 250      0190   76 1F                            JBE    OUTPUT          ;N:
 251      0192   A8 FF 07                         MOV    AX,#DASAT       ;Y:
 252      0195   E9 19 00                         JMP    OUTPUT
 254      0198   F7 26 00 00         NEG_OUT:     MUL    NSCON1
 255      019C   F7 36 00 00                      DIV    SCON2           ;OUTPUT = ( TEMP / NSCON ) * NSCON1
 256      01A0   29 16 00                         SUB    ACCUM,DX        ;SUBTR. REM. FROM ACCUM
 257      01A4   71 01                            JNO    CK_NSAT         ;OVERFLOW FROM ACCUM ?
 258      01A6   40                               INC    AX              ;Y:
                                                                         ;N:
 260      01A7   3D FF 07            CK_NSAT:     CMP    AX,#DASAT       ;IS D/A OUTPUT > 7FFH ?
 261      01AA   76 03                            JBE    SET_NEG         ;N:
 262      01AC   A8 FF 07                         MOV    AX,#DASAT       ;Y:
 263      01AF   F7 D8               SET_NEG:     NEG    AX
 265      01B1   A3 00 00            OUTPUT:      MOV    DA_OUT,AX       ;OUTPUT VALUE TO DAC
 266                                                                     ;ALLOW DAC TO SETTLE
 267      01B4   A0 01 00                         MOVB   AL,CONTROL+1    ;SET DA_HOLD TO SAMPLE STATE AND
 268      01B7   24 FD                            ANDR   AL,#0FDH        ;OUTPUT VALUE TO OUTPUT PORT
 269      01B9   A2 01 00                         MOVR   STAT_OUT+1,AL
 270      01BC   0C 06                            ORB    AL,#6           ;FORCE DA_HOLD AND TACH_HOLD TO
 271      01BE   A2 01 00                         MOVR   CONTROL+1,AL    ;HOLD STATE IN INTERNAL MEMORY
 272      01C1   E8 26 01                         CALL   WAITLOOP        ;ALLOW S/H TO SETTLE
 273      01C4   A2 01 00                         MOVB   STAT_OUT+1,AL   ;THEN SET DA_HOLD TO HLOD STATE
```

APPENDIX C

```
****************************
*                          *
*    PROGRAM MODE ROUTINE  *
*                          *
****************************

;
;THIS IS THE PROGRAM MODE ROUTINE IN WHICH PROGRAM
;MOVES ARE EXECUTED. TRAVEL LIMIT DETECTION WILL BE
;ENFORCED UNLESS TRAVEL LIMIT OVERRIDE IS ACTIVE.
;A PROGRAM MOVE CONSIST OF A POSITION, RATE, ACCEL
;AND DECEL VALUE.  THE MOVE WILL PROCEED BY RAMPING
;TO THE DESIRED RATE (IF POSSIBLE) WHILE DETECTING
;PT. OF DECEL FOR A SMOOTH DECEL TO THE DESIRED END
;POSITION.
;MOTION CONTROL COMMANDS HANDLED BY THIS ROUTINE:
;   1. PROGRAM MOVES (BOTH HALT AND RUN MODE)
;   2. DWELL MOVES
;   3. PROGRAM PRESET
;   4. LOAD NEXT MOVE.
;
MODE3:   TESTB   STATUS,#10H      ;IS SLIDE STOP ACTIVE ?
         JZ      CK_DWELL         ;N:
         JMP     SLIDESTP         ;Y:
;
CK_DWELL: TESTB  PMCW+1,#2        ;IS DWELL BIT SET ?
          JNZ    DWELL            ;Y:
;                                 ;N:
         TESTB   TLIMIT,#1        ;IS LIMIT OVERRIDE ACTIVE ?
         JZ      CK_LIMIT         ;N:
         JMP     INTERP           ;Y:
;
CK_LIMIT: TESTB  TOFCEL,#1        ;IS DECEL IN PROGRESS ?
          JZ     CK_LIMOV         ;N:
          JMP    INTERP           ;Y:
;
CK_LIMOV: ANDB   STATUS+1,#0E7H   ;RESET TRAVEL LIMIT STATUS FLAGS
          TESTB  DIG+3,#80H       ;IS DTG NEG. ?
          JZ.    CK_PTRAV         ;N:
          MOV    AX,NTRAVL+2      ;Y:
          MOV    DX,AX
          MOV    AX,NTRAVL
          CMP    DX,#0
          JNE    CK_NLIM
          CMP    AX,#0
          JNE    CK_NLIM
          JMP    INTERP
;
HOP_1:   ADD    AX,CAR
         MOV    AX,DX
         ADC    AX,CAR+2         ;IS COMM. POSITION > - TRAVEL LIMIT ?
         JNS    HOP_1            ;N:
         OR     STATUS,#10H      ;Y: SET - TRAVEL LIMIT AND SLIDESTOP
         JMP    SLIDESTP         ;STATUS FLAGS
;
CK_NLIM:                         ;IS NEG. TRAVEL LIMIT = 0 ?
```

```
1771-FS: PROGRAM MODE ROUTINE
ESMODR3.LIS
ERR LINE  ADDR  B1 B2 B3 B4
      82  0054  B1 42 02 00    E   CK_PTRAVL: MOV  AX,PTRAVL+2     ;IS POS. TRAVEL LIMIT = 0 ?
      83  0058  A1 05 00           MOV  DX,AX
      84  005B  A1 00 00       E              MOV  AX,PTRAVL,
      85  0060  A3 FA 00                      CMP  DX,#0
      86  0064  75 0B              JNE  CK_PLIM
      87  0066  3D 00 00           CMP  AX,#0
      88  0069  75 03              JNE  CK_PLIM
      89  006D  E9 7F 02       E              JMP  INTERP
      90
      91  0070  2B 06 00 00    E   CK_PLIM:   SUB  AX,CAR          ;IS COMM. POSITION > + TRAVEL LIMIT ?
      92  0074  8B C2              MOV  AX,DX
      93  0076  1B 06 02 00    E              SBB  AX,CAR+2        ;N:
      94  007A  79 C7              JNS  HOP_1                      ;Y: SET + TRAVEL LIMIT AND SLIDESTOP
      95  007C  81 0F 00 00    E              OR   STATUS,#1010H   ;STATUS FLAGS
      96  0082  E9 2C 00       E              JMP  SLIDFSTP

1771-FS: PROGRAM MODE ROUTINE
ESMODR3.LIS
ERR LINE  ADDR  B1 B2 B3 B4
      98                            ;****************************
      99                            ;*   DWELL MOVE ROUTINE     *
     100                            ;****************************
     101
     102
     103  0085  2B C0              DWELL:    SUB  AX,AX
     104  0087  A3 07 00       E              MOV  ARATE,AX         ;FORCE ARATE = 0
     105  008A  A3 00 00       E              MOV  ARATE+2,AX
     106  008D  A3 C2 00       E              MOV  INTGRND,AX       ;FORCE INTGRND = 0
     107  0090  A3 2E 00       E              MOV  INTGRND+2,AX
     108  0093  83 1E 02 00    E              SUB  TIMER,#1         ;DECREMENT DWELL TIMER BY 1
     109  0098  83 1E 02 00    E              SBB  TIMER+2,#0
     110  009D  79 0F              JNS  NOT_DONE                   ;IF COUNT < 0, THEN DWELL IS COMPLETE
     111  009F  2B C0              SUB  AX,AX
     112  00A1  A2 00 00       E              MOV  TMODF,AL         ;SET TO NO MODE
     113  00A4  80 0F 00 00    E              ORB  STATUS,#2        ;SET "USER DONE" STATUS FLAG
     114  00A8  F9 0C 05       E              ORB  STATUS+2,#40H    ;SET "AXIS DONE" STATUS FLAG
     115                            JMP  EXIT_MD3
     116  00AE                     NOT_DONE:
     117
     118                            ;****************************
     119                            ;*   SLIDE STOP ROUTINE     *
     120                            ;****************************
     121  00B1  F7 06 00 00    E   SLIDFSTP: TEST PMCW,#204H        ;IS PRESENT MOVE A DWELL OR PRESET ?
     122  00B7  74 03              JZ   RATE_DEC                    ;N:
     123  00B9  E9 C1 00       E              JMP  SET_ZERO         ;Y:
     124
     125  00BC  A1 02 00       E   RATE_DEC: MOV  AX,ARATE+2
     126  00BF  BB D0 00           MOV  DX,AX
     127  00C1  A1 00 00       E              MOV  AX,ARATE
     128  00C4  F6 04 03 00    E              TESTB DTG+3,#80H      ;IS DTG NEG. ?
     129  00C9  75 5A              JNZ  NEG_RATE                    ;Y: ARATE = ARATE - DECEL
     130  00CB  2B 06 00 00    E              SUB  AX,DFCEL         ;N: ARATE = ARATE - DECEL
     131  00CF  1B 16 02 00    E              SBB  DX,DFCEL+2
     132  00D3  79 F4              JS   ZERO_RAT                    ;IF RESULT NEG., SET ARATE = 0
     133  00D5  75 05              JNZ  RET_RATE                    ;IF ARATE (MSW) > 0 ,THEN CONTINUE
     134  00D7  3D 00 00           CMP  AX,#0                       ;IS ARATE = 0 ?
```

```
135              00DA  74 DD                     JE    ZERO_RAT        ;Y: THEN SLIDE STOP IS COMPLETE
136                                                                   ;N:
137              00DC  A3 00 00         DET_RATE: MOV   ARATE,AX       ;STORE NEW ARATE
138              00DF  01 06 00 00     E        ADD    INTGRND,AX     ;NEW INTGRND = INTGRND + ARATE
139              00E3  8B C2                     MOV   AX,DX
140              00E5  A3 00 00                  MOV   ARATE+2,AX
141              00E8  15 00 00                  ADC   AX,#0
142              00EB  09                        CWD
143              00EC  01 06 00 00     E         ADD   CAP,AX         ;RAX = COMM. INCR.
144              00F0  8B C2                     MOV   AX,DX          ;RDX = SIGN EXTENSION
145              00F2  11 06 02 00     E         ADC   CAR+2,AX       ;COMM POSITION = CAR + COMM. INCR.
146                                              ;
147              00F6  F6 06 00 00     E         TESTB TSSW,#1         ;IS SAT, DOING A HALT MOVE ?
148              00FA  75 65                     JNZ   NO_RUNMD       ;Y:
149                                                                   ;N:
150              00FD  F6 06 00 00     E         TESTB TLOUT,#1       ;IS LAST OUTPUT TEST FLAG SET ?
151              0102  74 5F                     JZ    NO_RUNMD       ;N:
152                                                                   ;Y:
     1771-LES: PROGRAM MODE ROUTINE
     ESMODE1.LIS
     ERR LINE ADDR
153              0104  81 42 03 44              TESTB NMCW,#2          ;DOES NEXT MOVE HAVE A GO COMMAND ?
154              0109  74 57                     JZ    NO_RUNMD       ;N:
155                                                                   ;Y:
156              010B  A1 00 00                  MOV   AX,CAR         ;RAX = COMMAND ACCUMULATED POSITION
157              010E  2B 06 00 00     E         SUB   AX,NPOSIT      ;SUBTRACT DESIRED END POSITION FROM
158              0112  A1 02 00                  MOV   AX,CAR+2       ;COMMAND POSITION TO DETERMINE IF THE
159              0115  1B 06 02 00     E         SBB   AX,NPOSIT+2    ;NEXT MOVE IS IN THE SAME DIRECTION
160              0119  79 03                     JNS   SET_SLD        ;IF RESULT IS POS., DO A CONTROLLED
161                                                                   ;SLIDESTOP
162              011B  E9 4F 00                  JMP   LD_NEXTM
163                                              ;
164              011E  C6 06 00 00     E SET_SLD: MOVB  TSLIDE,#1     ;SET TSLIDE = 1
165              0123  E9 17 05                  JMP   EXIT_MD3
166                                              ;
167              0126  03 06 00 00     E NEG_RATE: ADD AX,DECEL
168              012A  13 16 02 00     E         ADC   DX,DECEL+2
169              012E  79 4D                     JNS   SET_ZERO       ;IF RESULT POS., SET ARATE = 0
170              0130  A3 00 00                  MOV   ARATE,AX       ;STORE NEW ARATE
171              0133  89 16 02 00     E         MOV   ARATE+2,DX
172              0137  2B 06 00 00     E         SUB   INTGRND,AX     ;NEW INTGRND = INTGRND - ARATE
173              013B  8B C2                     MOV   AX,DX          ;RAX = COMM. INCR.
174              013D  F7 DB                     NEG   AX             ;NEGATE COMM. INCR.
175              013F  99                        CWD                  ;RDX = SIGN EXTENSION
176              0140  F7 D8                     ADD   CAP,AX         ;COMM POSITION = CAR + COMM. INCR.
177              0142  01 06 00 00     E         MOV   AX,DX
178              0147  8B C2                     ADC   CAR+2,AX
179              0149  11 06 02 00     E         ;
180                                              ;
181              014D  F6 06 00 00     E         TESTB TSSW,#1         ;IS SAT. DOING A HALT MOVE ?
182              0152  75 0F                     JNZ   NO_RUNMD       ;Y:
183                                                                   ;N:
184              0154  F6 06 00 00     E         TESTB TLOUT,#1       ;IS LAST OUTPUT TEST FLAG SET ?
185              0158  74 07                     JZ    NO_RUNMD       ;N:
186                                                                   ;Y:
187              015A  F6 06 00 00     E         TESTB NMCW,#2        ;DOES NEXT MOVE HAVE A GO COMMAND ?
188              015F  75 03                     JNZ   CK4_DIR        ;Y:
189              0161  E9 DA 04                  JMP   EXIT_MD3       ;N:
190                                  NO_RUNMD:   ;
```

```
191  0165  A1 00 00        E               MOV     AX,NPOSIT       ;RAX = COMMAND ACCUMULATED POSITION
192  0168  2B 06 00 00     E               SUB     AX,CAR          ;SUBTRACT COMMAND POSITION FROM DESIRED
193  016C  A1 02 00        E               MOV     AX,NPOSIT+2     ;END POSITION TO DETERMINE IF THE
194  016F  1B 06 02 00     E               SBB     AX,CAR+2        ;NEXT MOVE IS IN THE SAME DIRECTION.
195  0173  78 57                           JS      LD_NEXTM        ;IF RESULT NEG., THEN LOAD NEXT MOVE
196                                                                ;ELSE DO A CONTROLLED SLIDESTOP THEN
197                                                                ;RETURN TO THE DESIRED ENDPOINT
198  0175  C6 06 00 00  01 E               MOVB    TSLIDE,#1       ;SET TSLIDE = 1
199  017A  E9 CC 04                        JMP     EXIT_MD3
200                                CK4_DIR:
201  017D  2B C0                           SUB     AX,AX
202  017F  A3 00 00        E               MOV     ARATE,AX        ;SET ARATE = 0
203  0182  A3 02 00        E               MOV     ARATE+2,AX
204  0185  A3 00 00        E               MOV     INTGRND,AX      ;SET INTERGRAND = 0
205  0188  A3 02 00        E               MOV     INTGRND+2,AX
206  018B  F6 06 00 00  01 E               TESTB   TSLIDE,#1       ;IS TSLIDE = 1 ?
207                                                                ;N:
208  0190  74 16                           JZ      CK_LDNXT        ;Y: IF TSLIDE WAS SET THEN THE LAST

1771-ES: PROGRAM MODE ROUTINE
ESMODE3.LIS
ERR LINE  ADDR   B1 B2 B3 B4
209                                                                ;PROGRAM POSITION WAS NEVER ACHIEVED.
210                                                                ;THEREFORE THE SERVO EXECUTED A
211                                                                ;CONTROLLED SLIDESTOP PAST THE DESIRED
212                                                                ;ENDPOINT, STOPPED, AND NOW WILL RETURN
213                                                                ;TO THE DESIRED ENDPOINT BEFORE EXECUT-
214                                                                ;ING ANY OTHER COMMAND
215  0192  F6 06 00 00  01 E               TESTB   STATUS,#1       ;IS SERVO WITHIN IN POSITION BAND ?
216  0197  74 29                           JZ      NOTINRND        ;N: THEN WAIT UNTIL SERVO STOPS
217                                                                ;Y:
218  0199  C6 06 00 00  00 E               MOVB    TSLIDF,#0       ;SET TSLIDF = 0 AND RE-EXECUTE LAST MOVE
219  019E  F6 06 00 00  01 E               TESTB   TLOUT,#1        ;IS TLOUT = 1 ?
220  01A3  75 27                           JNZ     LD_NFXTM        ;Y: THEN EXECUTE THE NEXT MOVE
221  01A5  E9 9B 00                        JMP     FIY_NXT         ;N:
222                                CK_LDNXT:
223  01A8  F6 06 00 00  01 E               TESTB   NMCW,#1         ;IS LOAD NEXT MOVE ACTIVE ?
224  01AD  75 16                           JNZ     CK_INPOS        ;Y:
225                                                                ;N:
226  01AF  A2 00 00        E               MOVB    TMODE,AL        ;SET TMODE TO NO MODE
227  01B2  A2 00 00        E               MOVB    TDFCEL,AL       ;RESET DFCEL FLAG
228  01B5  A2 00 00        E               MOVB    TLOUT,AL
229  01B8  C6 06 00 00  01 E               MOVB    TPRGSLD,#1      ;SET PROGRAM MODE SLIDESTOP FLAG
230  01BD  80 0F 04        E               ORB     STATUS,#2       ;SET "USER DONE" STATUS FLAG
231  01C2  E9 7B 04                        JMP     EXIT_MD3
232                                CK_INPOS:
233  01C5  F6 06 00 00  01 E               TESTB   STATUS,#1       ;IS SERVO WITHIN IN POSITION BAND ?
234  01CA  74 F6                           JZ      NOTINBND        ;N:
235                                                                ;Y: THEN LOAD NEXT MOVE
236                                ;
237                                ;*******************************
238                                ;*    LOAD NEXT MOVE ROUTINE   *
239                                ;*******************************
240                                ;
241  01CC  BE 00 00        E               MOV     SI,#NMCW
242  01CF  BF 00 00        E               MOV     DI,#PMCW
243  01D2  B9 0B 00                        MOV     CX,#0BH
244  01D5  F2                              REP
245  01D6  A5                              MOVS    PMCW,NMCW       ;TRANSFER NEXT MOVE DATA
                                                                   ;TO PRESENT MOVE BUFFER
```

```
246  01D7  2B CO              SUB    AX,AX
247  01D9  C6 06 00 00        MOVB   TSSM,#1
248  01DE  F6 06 00 01 08     TESTB  PMCW+1,#8        ;IS NEXT MOVE HALT MODE ?
249  01E3  74 03              JZ     REQ_NXT          ;Y:
250  01E5  A2 03              MOVB   TSSM,AL          ;N:
251  01E8  80 0F 02 10        ORR    STATUS+2,#10H    ;REQUEST NEXT MOVE
252
253  01EC  F6 06 01 00        REQ_NXT: TESTB PMCW+1,#2 ;IS THIS A DWELL MOVE ?
254  01F2  74 0F              JZ     CK4PPSFT         ;N:
255  01F4  A1 00 00           MOV    AX,FPOSIT        ;Y:
256  01F7  A3 00 00           MOV    TIMER,AX         ;SET TIMER = DWELL TIME
257  01FA  A1 02 00           MOV    AX,FPOSIT+2
258  01FD  A3 02 00           MOV    TIMER+2,AX
259  0200  E9 03 00           JMP    CLR_FLGS
260
261  0203  F6 06 00 00        CK4PPSFT: TESTB PMCW,#4 ;IS NEXT MOVE A PRESET ?
262  0208  74 36              JZ     FIX_NXT          ;N:
263  020A  A1 00 00           MOV    AX,FPOSIT        ;Y:
264  020D  A3 02 00           MOV    CAR,AX           ;SET CAR = PRESET VALUE

1771-FS: PROGRAM MODE ROUTINE
ESMODF1,LIS
ERR LINE ADDR    B1 B2 B3 B4
265  0210  2B C0 00           SUB    AX,FERR
266  0214  2B 06 00 00        MOV    POSIT,AX
267  0217  A1 02 00           MOV    AX,FPOSIT+2
268  021A  1B 06 02 00        SBB    CAP+2,AX
269  021E  A3 02 00           MOV    AX,FFRR+2
270  0221  A3 02 00           MOV    POSIT+2,AX
271  0224  2B C0              SUB    AX,AX
272  0226  A2 00 00           MOVB   TMODE,AL         ;SET TO NO MODE
273  0229  A2 00 00           MOVB   TDFCFL,AL        ;CLEAR TEST FLAGS
274  022C  A2 00 00           MOVB   TLOUT,AL
275  022F  A1 26 00           MOV    TPPGSLD,AL
276  0232  80 0E 02 00        AND    STATUS,#0E787H   ;CLEAR STATUS FLAGS
277  0236  80 0E 02 00        ORR    STATUS+2,#40H    ;SET "AXIS DONE" STATUS FLAG
278  023A  E9 FD 03           JMP    EXIT_MD3
279
280  023D  A1 00 00  FIX_NXT: MOV    AX,FPOSIT
281  0240  2B 06 00 00        SUB    AX,CAR
282  0243  A3 00 00           MOV    DTG,AX
283  0246  A1 02 00           MOV    AX,FPOSIT+2
284  024A  1B 06 02 00        SBB    AX,CAR+2
285  024D  A3 02 00           MOV    DTG+2,AX
286  0251  A1 00 00           MOV    AX,FDR_MULT
287  0254  8B 08              MOV    BX,AX
288  0257  F6 06 01 00        TESTB  PMCW+1,#10H      ;IS FEEDRATE MULTIPLIER
289  025C  75 03              JNZ    CK_RRATE         ;  OVERRIDE ENABLED ?
290  025E  8B 00 C8           MOV    BX,#0C800H       ;N: 100% FEEDRATE MULTIPLIER
291
292  0263  F6 06 00 00 CK_RRATE: TESTB TRAPID,#1     ;IS RAPID RATE SELECTED ?
293  0268  74 16              JZ     P_RATE           ;N:
294                                                    ;Y:
295  026A  A1 02 00           MOV    AX,RAPID+2       ;LOAD RAPID RATE
296  026D  8B C8              MOV    CX,AX            ;RCX = MSW
297  026F  A1 00 00           MOV    AX,RAPID         ;RAX = LSW
298  0272  E8 C8 03           CALL   FIX_RATE
299  0275  A1 02 00           MOV    AX,RAPID+2       ;LOAD RAPID RATE
300  0278  8B D0              MOV    DX,AX            ;RDX = MSW
```

```
301  027A                          MOV   AX,RAPID       ;RAX = LSW
302  027D                          JMP   LAR24
303
304  0280  A1 00 00          P_RATE: MOV   AX,PRATE+2
305  0283  8B CA                    MOV   CX,AX         ;LOAD PROGRAM RATE
306  0285  A1 00 00                 MOV   AX,PPATE      ;RDX = MSW
307  0288  E8 45 03                 CALL  FIX_PATE      ;RAX = LSW
308  028B  A1 02 00                 MOV   AX,PRATE+2
309  028E  8B C8                    MOV   DX,AX
310  0290  A1 00 00          LAR24:  MOV   AX,PRATE
311  0293  28 CB                    SUB   AX,BX
312  0295  89 0C                    MOV   CX,#0CH 314  0297  43                ADJ_RATE: INC   BX         ;SHIFT RATE LEFT UNTIL MSB
315  0298  D1 E0                    SHL   AX,1           ;IS SET AND STORE THE NUMBER
316  0299  D1 D2                    RCL   DX,1           ;OF SHIFTS
317  029C  70 02                    JO    LAR7           ;IF OFL = 1 THEN EXIT LOOP
318  029E  E2 F7                    LOOP  ADJ_RATE
319
320  02A1  D1 E3             LAR7:   SHL   BX,1          ;COUNT = RBX * 2 (MAX. = 24 DEC)

1771-FS: PROGRAM MODE ROUTINE
ESMODF3.LIS
ERR LINE ADDR  B1 B2 B3 B4

321
322
323  02A3  8B CA             ADJ_RAMP: MOV   CX,BX
324  02A5  8B DA                    MOV   BX,DX
325  02A7  2B CB                    SUB   CX,BX
326  02AA  2B D2                    SUB   DX,DX
327  02AC  A0 F0 00                 MOVB  AL,DECEL
328  02AF  8A E0                    MOVB  DH,AL
329  02B1  A1 01 00                 MOV   AX,DECEL+1
330
331  02B4  43                         INC   BX          ;ADJUST DECEL RAMP BY SHIFTING
332  02B5  D1 E0                    SHL   AX,1          ;THE NUMBER OF TIMES IN COUNT
333  02B7  D1 D0                    RCL   AX,1          ;OR UNTIL MSB IS SET
334  02B9  70 02                    JO    LAR8          ;IF OFL = 1 THEN EXIT LOOP
335  02BB  E2 F7                    LOOP  ADJ_RAMP
336
337  02BD  F6 C3 01          LAR8:   TESTB  BL,#1        ;WAS COUNT AN EVEN INTEGER ?
338  02C0  74 02                    JZ    CK_RAMP        ;Y:
339  02C2  D1 E8                    SHR   AX,1           ;N: SHIFT RIGHT DECEL VALUE
340
341  02C4  3D 00 00          CK_RAMP: CMP   AX,#0         ;IS ADJ. DECEL VALUE = 0 ?
342  02C7  75 03                    JNE   LD_RAMP        ;N:
343  02C9  B8 01 00                 MOV   AX,#1          ;Y: SET ADJ. DECEL VALUE = 1
344
345  02CC  A3 00 00          LD_RAMP: MOV   DCRAMP,AX     ;SAVE ADJ. DECEL VALUE
346  02CF  D1 EB                    SHR   BX,1           ;ADJUST COUNT = ( RBX / 2 )
347  02D1  8B C3                    MOV   AX,BX
348  02D3  A3 00 00                 MOV   ADJ_CNT,AX     ;SAVE COUNT
349
350  02D6  2B C0             CLR_FLGS: SUB   AX,AX
351  02D8  A2 00 00                 MOVB  TDFCEL,AL      ;CLEAR TFST FLAGS
352  02DB  A2 00 00                 MOVB  TLOUT,AL
353  02DE  A3 00 00                 MOVB  TPRGSLD,AL
354  02E1  81 26 00 00              AND   STATUS,#0E785H  ;CLEAR STATUS FLAGS
355  02E5  80 26 02 00              ANDB  STATUS+2,#0BFH  ;CLEAR "AXIS DONE" STATUS FLAG
356  02E9  E9 4F 03                 JMP   EXIT_MD3
```

```
1771-FS: PROGRAM MODE ROUTINE
FSMODER.LTS
ERR LINE  ADDR  B1 B2 B3 B4
     356
     357
     358                                    ;************************************
     359                                    ;*   PROGRAM MOVE COMMAND ROUTINE   *
     360                                    ;************************************
     361  02FF  80 26 00 00    TUTERP:  ANDB  CONTROL,#0FBH     ;CLEAR "AT HOME" LED BIT
     362  0304  80 26 00 00             ANDB  STATUS,#0FEH      ;CLEAR IN POSITION STATUS FLAG
     363  02F9  A1 00 00                MOV   AX,FPOSIT
     364  02FC  2B 06 00 00             SUB   AX,CAR            ;DTG = FPOSIT - CAR
     365  0300  A3 00 00                MOV   DTG,AX
     366  0303  A1 02 00                MOV   AX,FPOSIT+2
     367  0306  1B 06 02 00             SBB   AX,CAR+2
     368  030A  A3 02 00                MOV   DTG+2,AX          ;STORE NEW DTG
     369  030D  C6 06 00 00             MOVB  TRVDIR,#1         ;SET TRVDIR = 1
     370  0312  F6 06 00 02             TESTB TSSM,#1           ;IS THIS MOVE HALT MODE ?
     371  0317  75 07                   JNZ   DIFFSIGN          ;Y:
     372                                                        ;N:
     373  0319  F6 06 02 10   TESTB STATUS+2,#10H               ;IS SEND NEXT MOVE SET ?
     374  031E  74 03                   JZ    CK_RUNMD          ;N: THEN CHECK FOR BLENDING
     375  0320  E0 A4 00                JMP   CALC_DEC          ;Y: THEN NEXT MOVE HAS NOT BEEN SENT
     376                        DIFFSIGN:
     377  0323  F7 06 00 00   CK_RUNMD:  TEST  NMCH,#204H
     378  0329  75 F5                   JNZ   DIFFSIGN
     379
     380  032B  F6 C4 80                TESTB AH,#80H           ;IS DTG NEG. ?
     381  032E  75 31                   JNZ   NEG_MOV           ;Y:
     382                                                        ;N:
     383  0330  A1 00 00                MOV   AX,CAR
     384  0333  2B 06 00 00             SUB   AX,NPOSIT         ;SUBTRACT END POSITION OF NEXT MOVE
     385  0337  A1 02 00                MOV   AX,CAR+2          ;FROM THE PRESENT COMMAND POSITION
     386  033A  1B 06 02 00             SBB   AX,NPOSIT+2       ;TO DETERMINE IF BLENDING OF VELOCITIES
     387  033E  79 F0                   JNS   DIFFSIGN          ;SHOULD BE CHECKED.
     388  0340  C6 06 00 00             MOVB  TRVDIR,#0         ;IF RESULT IS POS., THEN NO BLENDING
     389  0345  F6 06 02 00             TESTB TRAPID,#1         ;SET TRVDIR = 0
     390  034A  75 12                   JNZ   SELRAPID          ;IS RAPID RATE SELECTED ?
     391  034C  A1 02 00                MOV   AX,NXT_RATE+2     ;Y:
     392  034F  8B 00                   MOV   DX,AX             ;N:
     393  0351  A1 00 00                MOV   AX,NXT_RATE
     394  0354  2B 06 00 00             SUB   AX,ARATE
     395  0358  1B 16 02 00             SBB   DX,ARATE+2        ;VEL DIFF = NXT_RATE - ARATE
     396  035C  78 31                   JS    CAL_VDIF
     397  035E  F0 35 00                JMP   NO_DFC            ;IF VEL DIFF IS NEG., THEN CHECK DECEL
     398                        SELRAPID:
     399  0361  A1 00 00     NEG_MOV:  MOV   AX,NPOSIT
     400  0364  2B 06 00 00             SUB   AX,CAR            ;SUBTRACT COMMAND POSITION FROM DESIRED
     401  0368  A1 02 00                MOV   AX,NPOSIT+2       ;END POSITION OF THE NEXT MOVE TO
     402  036B  1B 06 02 00             SBB   AX,CAR+2          ;DETERMINE IF BLENDING OF VELOCITIES
     403  036F  79 56                   JNS   CALC_DEC          ;SHOULD BE CHECKED.
     404  0371  C6 06 00 00             MOVB  TRVDIR,#0         ;IF RESULT IS POS., THEN NO BLENDING
     405  0376  F6 06 02 00             TESTB TRAPID,#1         ;SET TRVDIR = 0
     406  037B  75 51                   JNZ   SELRAPID          ;IS RAPID RATE SELECTED ?
     407  037D  A1 02 00                MOV   AX,ARATE+2        ;Y:
     408  0380  8B 00                   MOV   DX,AX             ;N:
     409  0382  A1 00 00                MOV   AX,ARATE
     410  0385  03 06 00 00             ADD   AX,NXT_RATE       ;VEL DIFF = ARATE - NXT_RATE
```

1771-FS: PROGRAM MODE ROUTINE
FSMODF3.LIS

```
ERP TIME  ADDR                                                                                    
411       0300    41 E2 R3 R4                                                                     
412       0304    13 14 02 00              ADC    DX,NXT_RATE+2                                   
413       0308    70 CF                    JNS    SELRAPID      ;IF VEL DIFF IS POS., THEN NO DECEL
414                                                                                               
415       03DF                  CAL_VDIF:                                                         
416       03DF    A1 02 00      MOV    AX,ARATE+2                                                 
417       03F2    8B D0         MOV    DX,AX                                                      
418       03F4    A1 00 00      MOV    AX,ARATE                                                   
419       03F7    8B 0E C6 00   MOV    CX,ADJ_CNT                                                 
420       03FB    F6 C6 80      TESTB  DH,#80H                                                    
421       03FE    74 0A         JZ     ADJ_ARAT      ;IS ARATE NEG. ?
422       0300    F7 DC         NOT    AX            ;N:
423       0302    F7 D2         NOT    DX            ;Y: NEGATE RATE VALUE
424       0304    05 01 00      ADD    AX,#1
425       0307    83 02 00      ADC    DX,#0
426                  ADJ_ARAT:
427       030A    D1 E0         SHL    AX,1
428       030C    D1 D2         RCL    DX,1
429       030E    E2 FA         LOOP   ADJ_ARAT
430
431       03E0    8B C2         MOV    AX,DX
432       03E2    F7 E0         MUL    AX            ;RAX = (ADJ. ARATE)**2 LSW
433       03E4    2B C6 00 00   SUB    AX,NADJRATE
434       03E8    A3 00 00      MOV    PTDEC,AX      ;PTDEC = ARATE**2 - NXT_RATE**2
435       03EB    8B C2         MOV    AX,DX
436       03ED    1A 06 02 00   SBB    AX,NADJRATE+2
437       03F1    A3 02 00      MOV    PTDEC+2,AX
438       03F4    E9 2D 00      JMP    CK4_DEC
439                  CALC_DEC:
440       03F7    A1 02 00      MOV    AX,ARATE+2
441       03FA    8B D0         MOV    DX,AX
442       03FC    A1 00 00      MOV    AX,ARATE
443       03FF    8B 0E C6 00   MOV    CX,ADJ_CNT    ;VELOCITY ADJUSTMENT COUNT
444       0403    F6 C6 80      TESTB  DH,#80H       ;IS VEL DIFF NEG. ?
445       0406    74 0A         JZ     SHIFTL
446       0408    F7 DC         NOT    AX            ;N:
447       040A    F7 D2         NOT    DX            ;Y:
448       040C    05 01 00      ADD    AX,#1
449       040F    83 02 00      ADC    DX,#0
450                  SHIFTL:
451       0412    D1 E0         SHL    AX,1          ;SHIFT RATE BY ADJUSTMENT COUNT
452       0414    D1 D2         RCL    DX,1          ;TO OBTAIN THE PT. OF DECEL
453       0416    E2 FA         LOOP   SHIFTL
454
455       0418    8B C2         MOV    AX,DX
456       041A    F7 E0         MUL    AX            ;PT. OF DECEL = (ADJUSTED RATE)**2
457       041C    A3 00 00      MOV    PTDEC,AX      ;STORE PT. OF DECEL
458       041F    8B C2         MOV    AX,DX
459       0421    A3 02 00      MOV    PTDEC+2,AX
460                  CK4_DEC:
461       0424    A1 02 00      MOV    AX,DTG+2
462       0427    8B D8         MOV    RX,AX         ;RBX = DTG (MSW)
463       0429    A1 00 00      MOV    AX,DTG        ;RCX = DTG (LSW)
464       042C    8B C8         MOV    CX,AX         ;RAX = VEL. STEP
465       042E    A1 02 00      MOV    AX,ARATE+2
466       0431    99            CWD                  ;RDX = SIGN EXTENSION OF VEL. STEP
467       0432    F6 C7 80      TESTB  BH,#80H       ;IS DTG NEG. ?
468       0435    75 12         JNZ    N_DECEL       ;Y:
```

```
1771-FS: PROGRAM MODE ROUTINE
ESMODE3.LIS
ERR LINE ADDR   B1 B2 B3 B4
    467  0407   2B CB          SUB   CX,AX        ;N: TEMP = ( DTG - VEL. STEP )
    468  0409   7B DA          SBB   RX,DX        ;IF RESULT IS NEG., THEN DECEL
    469  040B   78 54          JS    DEC_RAMP
    470  040D   8B C1          MOV   AX,CX        ;RAX = TEMP (LSW), RRX = TEMP (MSW)
    471  040F   75 1A          JNZ   P_DTG        ;IF MSW NON ZERO THEN NO DECEL
    472  0411   3D 00 00       CMP   AX,#0        ;IS TEMP = 0 ?
    473  0414   75 15          JNE   P_DTG        ;N:
    474  0416   E9 48 00       JMP   DEC_PAMP     ;Y:
    475                        ;
    476  0419   7B CA   N_DECEL: SUB CX,AX        ;TEMP = ( DTG - VEL. STEP )
    477  041B   7B DA          SBB   RX,DX
    478  041D   79 42          JNS   DEC_RAMP     ;IF RESULT IS POS., THEN DECEL
    479  041F   8B C1          MOV   AX,CX
    480  0421   F7 D0          NOT   AX
    481  0423   F7 D3          NOT   RX
    482  0425   05 01 00       ADD   AX,#1        ;RAX = TEMP (LSW)
    483  0428   83 D3 00       ADC   BX,#0        ;RRX = TEMP (MSW)
    484  042B   D1 E0          SHL   AX,1
    485  042D   D1 D3          RCL   BX,1
    486  042F   F7 26 00 00  P_DTG: MUL DCRAMP    ;TEMP = ( DTG - VEL. STEP ) * 2
    487  0433   8B CB          MOV   CX,DX        ;LSW * ( ADJ. DECEL )
    488  0435   87 03          XCHG  AX,BX
    489  0437   F7 26 00 00    MUL   DCRAMP       ;MSW * ( ADJ. DECEL )
    490  043B   03 C1          ADD   AX,CX        ;TEMP = ( DTG - ARATE )*2*DECEL
    491  043D   83 D2 00       ADC   DX,#0
    492  0441   75 05          JNZ   NO_DFC       ;IF MSW IS NONZERO, THEN NO DECEL
    493  0443   3B 06 02 00    CMP   AX,PTDEC+2   ;Y: IS TEMP < PT. OF DECEL ?
    494  0447   72 1A          JB    DEC_RAMP     ;Y:
    495  0449   3B 06 00 00    CMP   AX,PTDEC     ;N:
    496  044D   76 14          JBE   DEC_RAMP
    497                        ;
    498  044F   F6 06 00 00 E CK_DEC: TESTB TDFCFL,#1  ;IS DECEL FLAG SET ?
    499  0454   74 40          JZ    NO_DFC       ;N:
    500  0456   A1 07 00       MOV   AX,ARATE+2   ;Y:
    501  0459   8B 00          MOV   DX,AX
    502  045B   A1 00 00       MOV   AX,ARATE
    503  045E   E9 AE 00       JMP   SAMERATE     ;DECEL MODE: NO RATE CHANGE
    504                        ;
    505  0461   C6 06 00 00 E DEC_PAMP: MOVB TDECFL,#1  ;SET DECFL FLAG
    506  0466   81 07 00       MOV   AX,ARATE+2
    507  0469   8B 00          MOV   DX,AX
    508  046B   81 00 00       MOV   AX,ARATE
    509  046E   F6 06 03 00 E  TESTB DTG+3,#80H
    510  0473   75 14          JNZ   NEG_DEC      ;IS DTG NEG. ?
    511  0475   2B 06 02 00    SUB   AX,DFCEL+2   ;Y:
    512  0479   1B 16 00 00    SBB   DX,DFCEL     ;N:
    513  047D   78 07          JS    LAR_2        ;NEW ARATE = ARATE - DECEL RAMP
    514  047F   75 12          JNZ   LAR_10       ;IF RESULT NEG. SET ARATE = 0
    515  0481   3D 00 00       CMP   AX,#0        ;IF RESULT POSITIVE, CHECK DTG
    516  0484   75 00          JNE   LAR_10       ;IS RESULT = 0 ?
    517  0486   E9 0B 01       JMP   LD_DTG       ;N:
    518                        ;                  ;Y: CLEAR ARATE (MSW)
    519                        ;
    520  0489   03 06 00 00  NEG_DEC: ADD AX,DFCEL
    521  048D   13 16 02 00    ADC   DX,DFCEL+2
    522  0491   70 63          JNS   LAR_2
```

```
1771-FS: PROGRAM MODE ROUTINE
ESMODE3.LIS
ERR LINE  ADDR   R1 R2 R3 R4
      523  0493  E9 72 00                           JMP    CK_DTG
      524
      525  0496  C6 06 00 00                MD_DFC: MOVB   TDFCFL,#0
      526  049B  A1 02 00           1AR_10:         MOV    AX,DRATE+2
      527  049E  8B C8                              MOV    CX,AX
      528  04A0  A1 00 00                           MOV    AX,DRATE
      529  04A3  8B D8                              MOV    BX,AX
      530  04A5  A1 00 00                           MOV    AX,ARATE+2
      531  04A8  8B D0                              MOV    DX,AX
      532  04AA  A1 00 00                           MOV    AX,ARATE
      533  04AD  F6 06 03 00                        TESTB  DTG+3,#80H      ;IS SIGN OF DTG NEG. ?
      534  04B2  75 26                              JNZ    N_DRATE         ;Y:
      535  04B4  2B D8                              SUB    BX,AX           ;N: TEMP = DRATE - ARATE
      536  04B6  1B CA                              SBB    CX,DX
      537  04B8  78 30                              JS     SUB_RAMP        ;IF DRATE < ARATE THEN SUBTR. RAMP
      538  04BA  75 05                              JNZ    ADD_RAMP        ;IF TEMP POSITIVE, THEN ADD RAMP
      539  04BC  83 FB 00                           CMP    BX,#0           ;IS DIFF. = 0?
      540  04BF  74 4E                              JE     SAMERATE        ;Y:
      541  04C1  03 06 00 00           ADD_RAMP:    ADD    AX,ACCEL        ;NEW ARATE = ARATE + ACCEL RAMP
      542  04C5  13 16 02 00                        ADC    DX,ACCEL+2
      543  04C9  3B 16 02 00                        CMP    DX,DRATE+2      ;IS ARATE < DRATE ?
      544  04CD  7C 39                              JL     CK_DTG          ;Y:
      545  04CF  7F 2F                              JG     LD_DRATE        ;N:
      546  04D1  3B 06 00 00                        CMP    AX,DRATE
      547  04D5  76 31                              JBE    CK_DTG
      548  04D7  E9 26 00                           JMP    LD_DRATE
      549
      550  04DA  2B D8             N_DRATE:         SUB    BX,AX           ;TEMP = DRATE - ARATE
      551  04DC  1B CA                              SBB    CX,DX
      552  04DE  78 0A                              JS     SUB_RAMP        ;IF DRATE < ARATE THEN SUBTR. RAMP
      553  04E0  75 0F                              JNZ    ADD_RAMP        ;IF TEMP POSITIVE, THEN ADD RAMP
      554  04E2  83 FB 00                           CMP    BX,#0           ;IS DIFF. = 0?
      555  04E5  75 0A                              JNE    ADD_RAMP        ;N:
      556  04E7  F9 25 00                           JMP    SAMERATE        ;Y:
      557
      558  04EA  2B 06 00 00       SUB_RAMP:        SUB    AX,ACCEL        ;NEW ARATE = ARATE + ACCEL RAMP
      559  04EE  1B 16 02 00                        SBB    DX,ACCEL+2
      560  04F2  3B 16 02 00                        CMP    DX,DRATE+2      ;IS ARATE < DRATE ?
      561  04F6  7F 16                              JG     CK_DTG          ;Y:
      562  04F8  7C 06                              JL     LD_DRATE        ;N:
      563  04FA  3B 06 00 00                        CMP    AX,DRATE
      564  04FE  73 09                              JAE    CK_DTG
      565
      566  0500  A1 00 00          LD_DRATE:        MOV    AX,DRATE        ;STORE NEW RATE
      567  0503  8B D0                              MOV    DX,AX
      568  0505  A3 00 00                           MOV    AX,ARATE
      569  0508  89 16 02 00                       MOV    ARATE+2,DX
      570  050C  8B 1F 00 00                       MOV    BX,DTG
      571  0510  8B 0F 02 00                       MOV    CX,DTG+2
      572  0513  F6 06 00 00       SAMERATE:       TESTB  TSSM,#1         ;HALT MODE ?
      573  0517  75 0A                              JNZ    HALT_MD         ;Y:
      574
      575  0519  F6 06 03 00       CK_DTG:          TESTB  TRFVDIR,#1      ;DIRECTION REVERSAL ?
      576  051D  75 03                              JNZ    HALT_MD         ;Y: THEN DECEL TO ZERO AT END OF MOVE
      577  051F  E9 00 00                           JMP    RUN_MD          ;N:
      578
```

```
1771-ES: PROGRAM MODE ROUTINE
ESMODF3.LIB
ERR LINE ADDR    B1 B2 B3 B4
     579                            HALT_MD:
     580 052B   F6 C5 80                     TESTB   CH,#80H         ;IS DTG NEG.?
     581 052D   75 30                        JNZ     NEG_DTG         ;Y:
     582 052F   01 06 00 00                  ADD     INTGRND,AX      ;N: NEW INTGRND = INTGRND + ARATE
     583 0533   8B C2                        MOV     AX,DX
     584 0535   15 00 00                     ADC     AX,#0
     585 0538   99                           CWD                     ;RAX = COMM. INCR.
     586 0539   01 06 00 00                  ADD     CAR,AX          ;RDX = SIGN EXTENSION
     587 053B   11 16 02 00                  ADC     CAR+2,DX        ;COMM POSIT = CAR + COMM. INCR.
     588 0541   3B CA                        CMP     CX,DX
     589 0543   75 17                        JNE     LD_COMM         ;IS DTG (MSW) = 0 ?
     590 0545   3B C3                        CMP     AX,BX           ;N:
     591 0547   72 13                        JB      LD_COMM         ;Y: IS COMM. INCR. > DTG ?
     592                                                             ;N:
     593                                                             ;Y:
     594                                                             ;THIS IS A SPECIAL TEST TO GUARANTEE
     595                                                             ;THAT THE VELOCITY IS ZERO AT THE END
     596                                                             ;OF THE COMMANDED MOVE. IF THE VELOCITY
     597                                                             ;IS NOT WITHIN ONE DECEL STEP FROM ZERO
     598                                                             ;THE SERVO WILL DO A CONTROLLED SLIDE
     599                                                             ;STOP PAST THE DESIRED ENDPOINT. ONCE
     600                                                             ;THE SERVO MOTOR HAS COME TO A COMPLETE
     601                                                             ;STOP THE SERVO WILL REVERSE DIRECTION
     602                                                             ;AND RETURN TO THE PROGRAMMED POSITION.
     603 0547   A1 02 00                     MOV     AX,DECEL+2
     604 054A   2B 06 00 00                  SUB     AX,ARATE+2      ;TEMP = DECEL (MSW) - ARATE (MSW)
     605 054E   79 44                        JNS     LD_DTG          ;IF THE RESULT OF TEMP IS NEG. THEN
     606 0550   C6 06 00 00                  MOVB    TSLIDE,#1       ;SET TSLIDE = 1
     607 0555   80 0F 10                     ORB     STATUS,#10H     ;SET THE SLIDE STOP FLAG AND DO A
     608                                                             ;CONTROLLED SLIDE STOP.
     609 055A   E9 E0 00                     JMP     EXIT_MD3
     610                            LD_COMM:
     611 055D   29 06 00 00                  SUB     INTGRND,AX      ;NEW INTGRND = INTGRND - ARATE
     612                            NEG_DTG:
     613 0561   8B C0                        MOV     AX,#0
     614 0564   1B C2                        SBB     AX,DX
     615 0566   F7 D8                        NEG     AX
     616 0568   99                           CWD                     ;RAX = COMM. INCR.
     617 0569   01 06 00 00                  ADD     CAR,AX          ;NEGATE COMM. INCR.
     618 056D   11 16 02 00                  ADC     CAR+2,DX        ;RDX = SIGN EXTENSION
     619 0571   3B CA                        CMP     CX,DX           ;COMM POSIT = CAR + COMM. INCR.
     620 0573   75 E5                        JNE     LD_COMM
     621 0575   3B C3                        CMP     AX,BX           ;IS DTG (MSW) = 0 ?
     622 0577   77 E1                        JA      LD_COMM         ;N:
     623                                                             ;Y: IS COMM. INCR. > DTG ?
     624                                                             ;N:
     625                                                             ;Y:
     626                                                             ;THIS IS A SPECIAL TEST TO GUARANTEE
     627                                                             ;THAT THE VELOCITY IS ZERO AT THE END
     628                                                             ;OF THE COMMANDED MOVE. IF THE VELOCITY
     629                                                             ;IS NOT WITHIN ONE DECEL STEP FROM ZERO
     630                                                             ;THE SERVO WILL DO A CONTROLLED SLIDE
     631                                                             ;STOP PAST THE DESIRED ENDPOINT. ONCE
     632                                                             ;THE SERVO MOTOR HAS COME TO A COMPLETE
     633                                                             ;STOP THE SERVO WILL REVERSE DIRECTION
     634                                                             ;AND RETURN TO THE PROGRAMMED POSITION.
     635 0579   A1 02 00                     MOV     AX,ARATE+2
     636 057C   3D FF FF                     CMP     AX,#0FFFFH      ;IS ARATE (MSW) = 0FFFFH ?
     637 057F   74 12                        JE      LD_DTG          ;Y: THEN LOAD_DTG
     638                                                             ;N: THEN DO CHECK
     639 0581   03 06 02 00                  ADD     AX,DECEL+2      ;TEMP = ARATE (MSW) - DECEL (MSW)
```

```
1771-ES: PROGRAM MODE ROUTINE
ESMODE3.LIS
ERR LINE  ADDR   R1 R2 R3 R4
635   05B5   79 00                                JNS    LD_DTG            ;IF THE RESULT OF TEMP IS NEG, THEN
636   05B7   C6 06 00 00                          MOVB   TSLIDE,#1         ;SET TSLIDE = 1
637   05BC   80 0F 00 00                          ORB    STATUS,#10H       ;SET THE SLIDE STOP FLAG AND DO A
638                                                                        ;CONTROLLED SLIDE STOP.
639
640   05C1   E9 A9 00                             JMP    EXIT_MD3
641                                        LD_DTG:
641   05C4   A1 00 00                             MOV    AX,FPOSIT         ;SET CAR = FPOSIT
642   05C7   A3 00 00                             MOV    CAR,AX
643   05CA   A1 02 00                             MOV    AX,FPOSIT+2
644   05CD   A3 02 00                             MOV    CAR+2,AX
645   05D0   2B C0                                SUB    AX,AX
646   05D2   A3 00 00                             MOV    ARATE,AX          ;SET ARATE = 0
647   05D5   A3 02 00                             MOV    ARATE+2,AX
648   05D8   A3 00 00                             MOV    INTGRND,AX        ;SET INTGRND = 0
649   05DB   A3 02 00                             MOV    INTGRND+2,AX
650   05DE   A2 00 00                             MOV    TDFCFL,AL         ;RESET TEST FLAGS
651   05E1   A2 00 00                             MOV    TMODE,AL          ;SET TO NO MODE
652   05E4   80 0F 00 00                          ORB    STATUS,#2         ;SET "USER DONE" FLAG
653   05E8   80 0F 02 00                          ORB    STATUS+2,#40H     ;SET "AXIS DONE" STATUS FLAG
654   05EC   E9 7C 00                             JMP    EXIT_MD3
655
656                                        RUN_MD:
656   05C1   F6 C5 80                             TESTB  CH,#80H           ;IS DTG NEG. ?
657   05C4   75 46                                JNZ    N_DTG             ;Y:
658   05C6   01 06 00 00                          ADD    INTGRND,AX        ;N: NEW INTGRND = INTGRND + ARATE
659   05CA   8B C2                                MOV    AX,DX
660   05CC   15 00 00                             ADC    AX,#0
661   05CF   99                                   CWD                      ;RAX = COMM. INCR.
                                                                           ;RDX = SIGN EXTENSION
662   05D0   01 06 00 00                          ADD    CAR,AX            ;COMM POSIT = CAR + COMM. INCR.
663   05D4   11 16 02 00                          ADC    CAR+2,DX
664   05D8   D1 E0                                SHL    AX,1              ;RAX, RDX = 2*COMM. INCR.
665   05DA   D1 D2                                RCL    DX,1
666   05DC   2B D8                                SUB    BX,AX             ;RAX, RCX = DTG - (2*COMM. INCR.)
667   05DE   1B CA                                SBB    CX,DX
668   05E0   78 18                                JS     SET_LOUT          ;IF RESULT IS NEG., THEN SET TLOUT
669   05E2   75 05                                JNZ    CK4_DONE          ;IF MSW IS NONZERO, THEN NOT LAST OUTPUT
670   05E4   83 FB 00                             CMP    BX,#0             ;IS LSW = 0 ?
671   05E7   74 11                                JE     SET_LOUT          ;Y:
672                                                                        ;N:
673                                                                        ;IF RESULT IS NEG, THEN THIS IS THE
674                                                                        ;LAST OUTPUT FOR THE PRESENT MOVE.
675                                                                        ;IF THE NEXT MOVE HAS A GO COMMAND,
676                                                                        ;THEN GO AHEAD AND PROCESS IT, ELSE
677                                                                        ;DO A CONTROLLED SLIDE STOP TO BRING
678                                                                        ;THE SERVO TO A HALT.
679
680                                        CK4_DONE:
680   05E9   D1 E0                                SHL    AX,1              ;RAX, RDX WILL CONTAIN 4*COMM. INCR.
681   05EB   D1 D2                                RCL    DX,1              ;AFTER MULTIPLYING RAX, RDX BY 2.
682                                                                        ;THEN COMPARE (DTG - 2*COMM. INCR) TO
683                                                                        ;4*COMM. INCR. TO DETERMINE IF THERE
684                                                                        ;ARE LESS THAN SIX INTERVALS UNTIL THIS
685                                                                        ;MOVE IS COMPLETED. IF THERE ARE LESS
686                                                                        ;THAN 6 INTERVALS LEFT IN THE PRESENT
687                                                                        ;MOVE, SET THE "AXIS DONE" FLAG FOR THE
688                                                                        ;MASTER TO PROCESS A NEW GO COMMAND
689
690   05F0   3B D1                                CMP    DX,CX             ;IS 4*COMM INCR > DTG - 2*COMM. INCR. ?
```

```
1771-ES: PROGRAM MODE ROUTINE
ESMODE3.LIS
FRB LINE  ADDR                                                          
601       05EE  01 47 R3 R4                      JL    EXIT_MD3           ;N:
602       05F1  7C 4C                            JG    SET_DONE           ;Y:
603       05F3  7E 45                            CMP   AX,AX
604       05F5  7A CB                            JP    EXIT_MD3
605       05F7  72 46                            JMP   SET_DONE
606       05F9  E9 3F 00                         ;
607       05FA  C4 06 00 00        SET_LOUT:     MOVB  TLOUT,#1           ;SET LAST OUTPUT TEST FLAG
608       05FF  20 0F 00 00                      ORB   STATUS,#10H        ;SET SLIDE STOP STATUS FLAG
609       0604  00 0F 02 00                      ORB   STATUS+2,#40H      ;SET "AXIS DONE" FLAG
610       0608  E9 31 00                         JMP   EXIT_MD3           ;AT THIS POINT THE PRESENT MOVE HAS
701                                                                      ;BEEN COMPLETED AND A GO COMMAND
702                                                                      ;HAS NOT BEEN RECEIVED, THE SERVO
703                                                                      ;WILL DO A CONTROLLED SLIDE STOP
704                                                                      ;TO ZERO.
705                                              ;
706       060C  29 06 00 00        N_DTG:        SUB   INTGRND,AX         ;NEW INTGRND = INTGRND - ARATE
707       0610  8B 00 00                         MOV   AX,#0
708       0613  1B C2                            SBB   AX,DX
709       0615  F7 DR                            NEG   AX                 ;NEGATE COMM. INCR.
710       0617  99                               CWD                      ;RDX = SIGN EXTENSION
711       0618  01 06 00 00                      ADD   CAP,AX             ;COMM POSIT = CAP + COMM. INCR.
712       061C  11 16 02 00                      ADC   CAP+2,DX
713       0620  D1 E0                            SHL   AX,1
714       0622  D1 D2                            RCL   DX,1               ;RAX, RDX = 2*COMM. INCR.
715       0624  2B DR                            SUB   BX,AX
716       0626  1B CA                            SBB   CX,DX              ;RBX, RCX = DTG - 2*COMM. INCR.
717       0628  79 00                            JNS   SET_LOUT
718                                                                      ;IF RESULT IS POS, THEN THIS IS THE
719                                                                      ;LAST OUTPUT FOR THE PRESENT MOVE.
720                                                                      ;IF THE NEXT MOVE HAS A GO COMMAND,
721                                                                      ;THEN GO AHEAD AND PROCESS IT. ELSE
722                                                                      ;DO A CONTROLLED SLIDE STOP TO BRING
723                                                                      ;THE SERVO TO A HALT.
724                                              ;
725       062A  D1 E0                            SHL   AX,1
726       062C  D1 D2                            RCL   DX,1               ;RAX, RDX WILL CONTAIN 4*COMM. INCR.
727                                                                      ;AFTER MULTIPLYING RAX, RDX BY 2.
728                                                                      ;THEN COMPARE (DTG - 2*COMM. INCR.) TO
729                                                                      ;4*COMM. INCR. TO DETERMINE IF THERE
730                                                                      ;ARE LESS THAN SIX INTERVALS UNTIL THIS
731                                                                      ;MOVE IS COMPLETED. IF THERE ARE LESS
732                                                                      ;THAN 6 INTERVALS LEFT IN THE PRESENT
733                                                                      ;MOVE, SET THE "AXIS DONE" FLAG FOR THE
734                                                                      ;MASTER TO PROCESS A NEW GO COMMAND
735       062E  3B D1                            CMP   DX,CX
736       0630  7F 0B                            JG    EXIT_MD3           ;IS 4*COMM INCR > DTG - 2*COMM. INCR. ?
737       0632  7C 04                            JL    SET_DONE           ;N:
738       0634  3B C3                            CMP   AX,BX              ;Y:
739       0636  77 05                            JA    EXIT_MD3
740       0638  80 0F 02 00        SET_DONE:     ORB   STATUS+2,#40H      ;SET "AXIS DONE" FLAG
741                                              ;
742       063D  E9 00 00           EXIT_MD3:     JMP   STATLOOP
743                                              ;
744                                              ;*** SUBROUTINE TO MODIFY FEEDRATE VALUE ***
745                                              ;
746                                              ;
```

I claim:

1. An electrical controller for controlling machine motion through a plurality of electromechanical I/O positioning devices, the controller comprising:
a plurality of I/O circuits each connectable to a respective I/O positioning device to generate output drive signals thereto in response to move data, and to transmit a move request signal when move data is needed;
main processing means for storing and transmitting (i) user-selectable parameter data, including a user-selected mode of axis coupling designating coupled I/O circuits and independent I/O circuits and (ii) user-selectable move data, including coupled move data applicable to coupled I/O circuits and independent move data applicable to independent I/O circuits; and
master I/O processing means coupled to the main processing means for receiving the parameter data and the move data, and coupled to the I/O circuits for receiving move request signals, the master I/O processing means being responsive to the parameter data from the main processing means and to move request signals from any coupled I/O circuits to receive coupled move data in a single transmission from the main processing means and to distribute portions of the coupled move data to each of the coupled I/O circuits, the master I/O processing means also being responsive to the parameter data from the main processing means and to move request signals from any independent I/O circuits to receive independent move data in a separate transmission from the main processing means and to couple the independent move data to the independent I/O circuit associated with that separate transmission.

2. The controller of claim 1, wherein two coupled I/O circuits and one independent I/O circuit are controlled, wherein move data is coupled in two blocks from the main processing means to the master I/O processing means, one block of move data including coupled move data for the two coupled I/O circuits and the other block of move data including independent move data for the independent I/O circuit, and wherein the master I/O processing means distributes portions of the coupled move data to each of the coupled I/O circuits and distributes the independent move data to the independent I/O circuit.

3. The controller of claim 1, wherein the main processing means transmits a block of coupled move data that includes data for a plurality of coupled moves that are distributed by the master I/O positioning means to any coupled I/O circuits, and wherein the main processing means transmits a block of independent move data that includes data for a plurality of independent moves that are coupled by the master I/O processing means to any independent I/O circuit.

4. The controller of claim 3, wherein the block of coupled move data and the block of independent move data each contain a control word directing a plurality of moves to be executed in a continuous sequence, and wherein the master I/O processing means and the I/O circuits are responsive to the control words to execute the move data in a continuous sequence.

5. The controller of claim 1, wherein the main processing means also stores a motion control block of data representing manual input motion commands and also stores a pointer to the motion control block as part of the parameter data, wherein the master I/O processing means, in absence of move request signals from the I/O circuits, gives priority to the inclusion of the pointer to the motion control block of data within a status block of data that is returned to the main processing means, wherein the main processing means transmits the motion control block of data in response to receiving its corresponding pointer, and wherein the master I/O processing means is responsive to the receipt of the motion control block of data to couple manual input motion command data to the I/O circuits which execute the manual input motion commands.

6. The controller of claim 1, wherein the master I/O processing means is coupled to the main processing means through an I/O interconnect cable, and wherein the master I/O processing means and the I/O circuits are formed in respective circuit modules that are mounted in a rack and electrically connected through a backplane circuit board.

7. The controller of claim 1, wherein the I/O circuits read position input signals from the I/O positioning devices and generate output drive signals thereto that are responsive to the difference between a command position determined from the move data and an actual position determined from the position input signals, thereby providing closed-loop positioning control of the I/O positioning devices.

8. An electrical controller for controlling machine motion through a plurality of electromechanical I/O positioning devices, the controller comprising:

a plurality of satellite I/O modules each connectable to a respective I/O positioning device to generate output drive signals thereto in response to move data, wherein each satellite I/O module requests move data, when needed, by transmitting a move request signal;

a main processing unit that transmits parameter data and move data and receives status data during I/O operations, the main processing unit including memory means for storing the parameter data, which includes data indicating the number of satellite I/O modules, which includes data that selects one of the two modes of axis coupling, at least two of the satellite I/O modules being coupled for directing coordinated motion along respective axes in the first mode of axis coupling, and one or more independent satellite I/O modules directing motion independently along respective axes in the second mode of axis coupling, the parameter data also including data pointers to the locations of the move data, the memory means also storing move data as coupled moves applicable to coupled satellite I/O modules and as individual moves applicable to independent satellite I/O modules, and processing means coupled to the memory means for transmitting the parameter data and for receiving status data including a data pointer, and in response to the status data, for transmitting move data in one transmission for each plurality of coupled satellite I/O modules and for transmitting move data in a separate transmission for each independent satellite I/O module; and master I/O processing means electrically coupled to the processing means in the main processing unit to receive the parameter data and electrically coupled to the satellite I/O modules to receive move request signals, the master I/O processing means including means responsive to move request signals from any of the coupled I/O satellite modules and from any independent satellite I/O module for transmitting status data to the main processing means that includes a pointer to the move data for the requesting satellite I/O module, and means for receiving the move data in response to the transmission of the status data, and in response to the parameter data received previously, distributing the move data received in coupled moves to the respective coupled satellite I/O modules and distributing the move data in independent moves to its associated independent satellite I/O module.

9. The controller of claim 8, wherein one of the modes of axis coupling provides for two coupled satellite I/O modules and one independent satellite I/O module, wherein the move data is stored in two blocks that are coupled through the processing means in the main processing unit to the master I/O processing means, one block of move data including coupled move data for the two coupled satellite I/O modules, and the other block of move data including independent move data for the independent satellite I/O modules, and wherein the master I/O processing means distributes portions of the coupled move data to each of the coupled satellite I/O modules and distributes the independent move data to the independent satellite I/O module.

10. The controller of claim 8, wherein the processing means in the main processor unit transmits a block of coupled move data that includes data for a plurality of coupled moves that are transmitted by the master I/O processing means to any coupled satellite I/O modules, and wherein the processing means in the main processor unit transmits a block of independent move data that includes a plurality of independent moves that are transmitted by the master I/O processing means to any independent satellite I/O modules.

11. The controller of claim 10, wherein any block of coupled move data and any block of independent move data each contain a control word for directing the execution of the moves therein in a continuous sequence, and wherein the master I/O processing means and the satellite I/O modules are responsive to the control words to execute the moves in a continuous sequence.

12. The controller of claim 8, wherein the memory means in the main processing unit also stores a motion control block of data representing manual input motion commands and also stores a pointer to the motion control block of data as part of the parameter data, wherein the master I/O processing means, in the absence of move request signals from the satellite I/O modules, gives priority to the inclusion of the pointer to the motion control block of data within a status block of data that is returned to the processing means in the main processor unit, wherein the processing means in the main processor unit couples the motion control block of data from its associated memory means to the master I/O processing means in response to receiving the pointer for the motion control block of data, wherein the master I/O processing means is responsive to the receipt of the motion control block of data to couple motion command data to the satellite I/O modules, and wherein the satellite I/O modules are responsive to the motion command data to execute the manual input motion commands.

13. The controller of claim 8, wherein the master I/O processing means is coupled to the main processing unit through an I/O interconnect cable, and wherein the master I/O processing means is formed as a master I/O positioning module, is mounted in a rack with the satellite I/O modules, and is electrically connected to the satellite I/O modules through a backplane circuit board.

14. The controller of claim 8, wherein the satellite I/O modules read position input signals from the I/O positioning devices and generate output drive signals thereto that are responsive to the difference between a command position determined from the move command data and an actual position determined from the position input signals, thereby providing closed-loop positioning control of the I/O positioning devices.

15. A programmable controller for closed-loop positioning control of machine motion through an I/O positioning device, which moves in response to velocity signals and which generates position feedback signals, the controller comprising:
- a main processor that stores and transmits userprogrammable move data including a programmed position, a programmed velocity and a programmed deceleration for each of a plurality of successive moves; and
- a satellite I/O module coupled to the main processor, and coupled to the I/O positioning device to read the feedback signals therefrom and to generate velocity output signals thereto, the satellite I/O module including
  - first memory means for storing move data received from the main processor,
  - an axis processor coupled to the main processor to receive the move data for successive moves, coupled to the first memory means to transfer the move data thereto, and coupled to the I/O positioning device to receive the position feedback signals and to transmit the velocity output signals, and
  - second memory means for storing machine instructions for the axis processor,
  - wherein the axis processor is operable to compute the actual velocity for the present move and to detect a programmed velocity for a next move that is less than the actual velocity of the present move, and
  - wherein the axis processor is further operable to detect a point of deceleration before reaching the end of the present move and to then apply the programmed deceleration to the actual velocity, so that the next move can be initiated at its programmed velocity.

16. An intelligent positioning I/O module for real-time closed-loop positioning control of one axis of machine motion, the I/O module being insertable into a rack structure, the I/O module being connectable for communication with a programmable controller main processor, and the I/O module being connectable to a servomechanism controlling motion along the axis, the I/O module comprising:
- memory means for receiving user-selected move data for a present move and user-selected data for a next move from the programmable controller main processor, the user-selected move data for each move including a programmed destination, a programmed velocity and a programmed deceleration;
- input circuit means connectable to a position sensing portion of the servomechanism to receive position feedback signals and to convert such signals to position feedback data;
- output circuit means connectable to drive a servo motor portion of the servomechanism by coupling servo velocity output signals thereto, the output circuit means converting servo velocity output data to the servo velocity output signals that are coupled to the servo motor portion;
- programmed axis processor means coupled to the memory means to obtain the user-selected move data therefrom, coupled to the input circuit means to receive position feedback data and coupled to the output circuit means to generate servo velocity output data thereto to control axis motion;
- wherein the programmed axis processor means is operable to compute servo output velocity data for the present move and to detect a programmed velocity for the next move that is less than the servo output velocity of the present move; and
- wherein the programmed axis processor means is further operable to detect a point of deceleration before reaching the end of the present move to then apply the programmed deceleration to reduce the servo output velocity data before it is coupled to the output circuit means, so that the next move can be initiated at its programmed velocity.

17. An intelligent positioning I/O module for real-time closed-loop positioning control of one axis of machine motion, the I/O module being insertable into a rack structure, the I/O module being connectable for communication with a programmable controller main processor, and the I/O module being connectable to a servomechanism controlling motion along the axis, the I/O module comprising:
- first memory means for receiving user-selected move data for a present move and a next move from the programmable controller main processor, the user-selected move data for each move including a programmed destination, a programmed velocity and a programmed acceleration and deceleration;
- input circuit means connectable to a position sensing portion of the servomechanism to receive position feedback signals and to convert such signals to position feedback data;
- output circuit means connectable to drive a servo motor portion of the servomechanism by coupling servo velocity output signals thereto, the output circuit means converting servo velocity output data to the servo velocity output signals that are coupled to the servo motor portion;
- second memory means for storing a first sequence of axis processor instructions to generate servo velocity output data to the output circuit means to drive the servomechanism in response to the difference between an accumulation of command position increments, and an accumulation of position feedback data received from the input circuit means, the second memory means also storing a second sequence of axis processor instructions to calculate command position increments for the present move based on the programmed destination to be reached at the end of the present move, the accumulation of position feedback data, the programmed velocity for the next move, and the programmed acceleration or deceleration;
- timing means for providing a periodic signal on a preselected time base; and
- an axis processor coupled to the timing means, coupled to the first and second memory means and coupled to the input circuit means and output circuit means, the axis processor being responsive to each periodic signal from the timing means to read and execute the first and second sequences of axis processor instructions to generate servo output velocity signals to the servomechanism through the output circuit means and to read position feedback signals from the servomechanism through the input circuit means to provide real-time closed-loop positioning control on the preselected time base, such control including the application of the programmed acceleration or deceleration to change from the velocity of the present move to the programmed velocity of the next move.

18. A programmable controller for controlling machine motion through a plurality of electromechanical I/O positioning devices, the controller comprising:

a plurality of I/O circuits each connectable to a respective I/O positioning device to generate output drive signals thereto in response to move data, and to transmit a move request signal when data is needed;

main processing means for storing and transmitting (i) user-selected parameter data, which includes a pointer to a motion control block of data, (ii) the motion control block of data, which represents manual input motion commands, and (iii) user-selected move data;

master I/O processing means coupled to the main processing means for receiving the parameter data and the move data and for transmitting a status block of data, and coupled to the I/O circuits for receiving move request signals, the master I/O processing means transmitting the status block of data with a pointer to the motion control block of data in the absence of move request signals from the I/O circuits;

wherein the main processing means transmits the motion control block of data in response to receiving its corresponding pointer; and wherein the master I/O processing means is responsive to the receipt of the motion control block of data to coupled manual input motion commands to the I/O circuits, which execute these commands.

* * * * *

UNITED STATES PATENT AND TRADEMARK OFFICE
CERTIFICATE OF CORRECTION

PATENT NO. : 4,510,565

DATED : April 9, 1985

INVENTOR(S) : Dummermuth

It is certified that error appears in the above-identified patent and that said Letters Patent is hereby corrected as shown below:

Column 1, lines 21 and 22, "positionin-g" should be --positioning--.

Column 3, line 23, after "structures" a comma should be inserted.

Column 11, line 46, Table 2 should appear as follows:

TABLE 2

| PARAMETER CONTROL WORD | | | | |
|---|---|---|---|---|
| 17 16 15 14 13 12 11 10 | 7 | 6 5 4 | 3 | 2 1 0 |
| 0 1 0 0 0 0 0 0 IDENTIFIER | | MODE | | NO. AXES |

INCH/METRIC SELECTION (bit 7)

NOT USED (bit 3)

Column 41, line 65, "mastersatellite" should be --master-satellite--.

Column 47, lines 58 and 60, "(8)" should appear on line 58 rather than line 60.

Column 88, line 15, "slgnals" should be --signals--.

UNITED STATES PATENT AND TRADEMARK OFFICE
CERTIFICATE OF CORRECTION

PATENT NO. : 4,510,565

DATED : April 9, 1985

INVENTOR(S) : Dummermuth

It is certified that error appears in the above-identified patent and that said Letters Patent is hereby corrected as shown below:

Column 91, line 14, "userprogrammable" should be --user-programmable--.

Signed and Sealed this

Eighth Day of October 1985

[SEAL]

Attest:

Attesting Officer

DONALD J. QUIGG

Commissioner of Patents and Trademarks—Designate